MAGNETIC DRUM TRANSLATOR

Filed Sept. 16, 1963 45 Sheets-Sheet 2

INVENTORS.
Evangelos P. Kostogiannis
BY Michael A. Langowski
C. A. Gulbrandsen
Atty.

Nov. 8, 1966 E. P. KOSTOGIANNIS ET AL 3,284,574

MAGNETIC DRUM TRANSLATOR

Filed Sept. 16, 1963 45 Sheets-Sheet 3

MAGNETIC DRUM TRANSLATOR

Nov. 8, 1966 E. P. KOSTOGIANNIS ET AL 3,284,574

MAGNETIC DRUM TRANSLATOR

Filed Sept. 16, 1963 45 Sheets-Sheet 21

Nov. 8, 1966 E. P. KOSTOGIANNIS ET AL 3,284,574

MAGNETIC DRUM TRANSLATOR

Filed Sept. 16, 1963 45 Sheets-Sheet 22

Nov. 8, 1966 E. P. KOSTOGIANNIS ET AL 3,284,574

MAGNETIC DRUM TRANSLATOR

Filed Sept. 16, 1963 45 Sheets-Sheet 23

Nov. 8, 1966 E. P. KOSTOGIANNIS ET AL 3,284,574

MAGNETIC DRUM TRANSLATOR

Filed Sept. 16, 1963 45 Sheets-Sheet 24

Nov. 8, 1966 E. P. KOSTOGIANNIS ET AL 3,284,574

MAGNETIC DRUM TRANSLATOR

Filed Sept. 16, 1963 45 Sheets-Sheet 25

Nov. 8, 1966 E. P. KOSTOGIANNIS ET AL 3,284,574

MAGNETIC DRUM TRANSLATOR

Filed Sept. 16, 1963 45 Sheets-Sheet 26

Nov. 8, 1966 E. P. KOSTOGIANNIS ET AL 3,284,574

MAGNETIC DRUM TRANSLATOR

Filed Sept. 16, 1963 45 Sheets-Sheet 30

| DIALED PATTERN | TRANSLATOR ACCESS NO. | | DESTINATION | TRANSLATION REQUIRED | POINT OF ORIGIN | PROCESSING DIGITS | | | | | SENDER INSTRUCTION | | | | CODE OR SWITCHING INSTRUCTION | | | | | | | | |
|---|---|---|---|---|---|---|---|---|---|---|---|---|---|---|---|---|---|---|---|---|---|---|---|
| | | | | | | TA 16 | TA 15 | TA 14 | | TA 13 | TA 12 | TA 11 | | TA 10 | TA 9 | TA 8 | TA 7 | TA 6 | TA 5 | TA 4 | TA 3 | TA 2 | TA 1 |
| | | | | | | IN | DE | AD | | TL | MD | ES | | SK | TA | TB | TC | TD | TE | TF | TG | TH | TI |
| 112 AX' X" $A_1A_2N_0N_1N_2N_3N_4$ TRANSLATOR ACCESS FROM REGISTER-SENDER GROUP | 1 | → | OUT GOING | PT | LOCAL | — | — | X | 1 | 3 | — | — | - | — | $K_L$ | — | — | — | — | — | 2 | 1 | 1 |
| | | ← | | | | — | 3 | — | 1 | 3 | — | — | - | — | — | — | — | — | — | — | — | — | — |
| | 2 | → | | PT | | — | — | X | 1 | 3 | — | — | - | — | $K_L$ | — | — | — | — | — | X" | X' | A |
| | | ← | | | | — | — | — | 1 | 6 | — | — | - | — | — | — | — | — | — | — | — | — | — |
| | 3 | → | | CT | | — | — | X | 1 | 6 | — | — | - | — | $K_L$ | — | — | N | A | A | X" | X' | A |
| | | ← | | | | 2 | — | — | - | 10 | MD | ES | 1 | SK | — | P | U | T | H | D | C | B (IT) | A (IT) |
| | 4 | → | | LN | | 2 | — | AX | - | 10 | — | — | - | — | $K_L$ | — | — | $P_L$ | $U_L$ | $T_L$ | $H_L$ | $D_L$ | $C_L$ |
| | | ← | | | | — | 12 | — | - | — | — | — | - | — | $K_L$ | $Y_L$ | $N_L$ | $N_L$ | $N_L$ | $N_L$ | $N_L$ | $A_L$ | $A_L$ |
| | | → | | DN | | 4/14 | 0 | $A_X$ | 0 | 7 | — | — | - | — | K | Y | $N_4$ | $N_3$ | $N_2$ | $N_1$ | $N_0$ | $A_2$ | $A_1$ |
| | | ← | | | | 0 | 0 | 0 | 0 | TL | MD | ES | - | SK | 0 | P | U | T | H | D | C | — | — |

FIG. 34

FIG.37A CODE TRANSLATION = SINGLE LOAD READOUT

FIG.37B CODE TRANSLATION = DOUBLE LOAD READOUT

Nov. 8, 1966 E. P. KOSTOGIANNIS ET AL 3,284,574
MAGNETIC DRUM TRANSLATOR
Filed Sept. 16, 1963 45 Sheets-Sheet 45
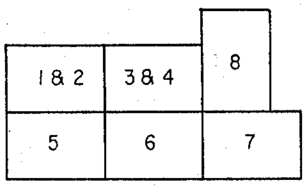
FIG. 46
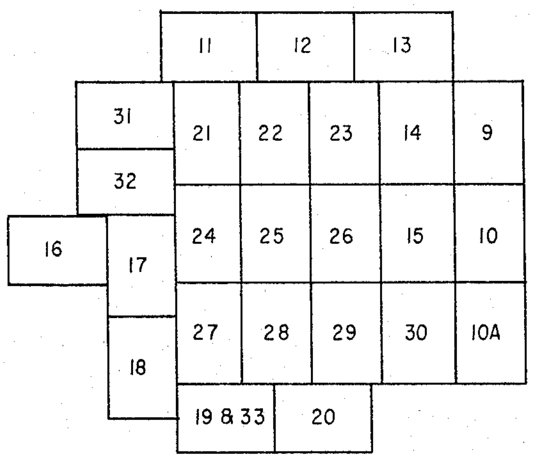
FIG. 47
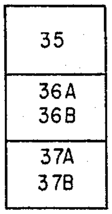
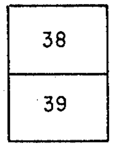
FIG. 49
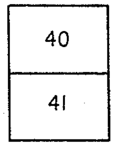
FIG. 50
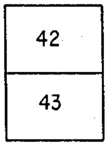
FIG. 51
FIG. 48

United States Patent Office 3,284,574
Patented Nov. 8, 1966

3,284,574

MAGNETIC DRUM TRANSLATOR

Evangelos P. Kostogiannis and Michael A. Langowski, Chicago, Ill., assignors to Automatic Electric Laboratories, Inc., Northlake, Ill., a corporation of Delaware Filed Sept. 16, 1963, Ser. No. 309,093
14 Claims. (Cl. 179—18)

The present invention relates to automatic tele-communication exchange systems generally and more particularly to electronic translator arrangements for use in such systems.

The invention is particularly but not exclusively adapted for use in automatic crosspoint telephone switching systems of the type disclosed in the copending application of Ronald E. Schauer, Kenneth E. Prescher, John G. Van Bosse, and Alfred C. Lange, entitled, "Register Sender Arrangement for a Communication Switching System," filed March 27, 1963, Serial No. 268,385. It is an improvement over the translator of the copending application of John R. Maneschi, Joseph E. Meschi, Verner K. Rice, John G. Van Bosse, and Lawrence W. Amiot filed March 27, 1963, Serial No. 268,384 directed to a translator using magnetic drum techniques.

The system disclosed in the present application may be considered as a direct improvement on the copending application Serial No. 272,608, filed April 12, 1963 of Maneschi et al. titled, Magnetic Drum Translator.

The disclosure of the foregoing two patents is hereby made a part of the present application as if fully set forth herein.

The present invention provides additional features and modifications to the previously described translator to render it more reliable, while decreasing the circuit complexity.

In accordance with an object of the present invention a greatly improved simplified and more versatile translator is provided.

A feature of this invention is the manner of using a single counter to indicate the instruction address during a directory number translation, reuse it for line number translation and by delaying the counter a certain number of steps utilize it for writing onto the drum.

Another feature of this invention is the means whereby a saving of drum surface may be achieved by the grouping of all the codes on the drum that receive the same directive.

Another feature is the ability to recognize the type of call from only the first three received digits, and instruct the register-sender accordingly.

Another feature of this invention is the selective use of a single group of coincidence gates to compare only those of the received digits required for a particular operation.

Still another feature of this invention is the plurality of self monitor, self timing, and self analysis of operational failures.

The above mentioned and other objects and features of this invention and the manner of attaining them will become more apparent, and the invention itself will be best understood by reference to the following description of an embodiment of the invention taken in conjunction with the accompanying drawings comprising FIGS. 1A and 1–51 wherein:

FIG. 1A is a general block diagram of the switching system incorporating the translator of the present disclosure.

FIGS. 1–8 comprise a more detailed block diagram of the switching system incorporating the translator of the present disclosure.

FIG. 11 is a schematic of the register identifier (RI) circuit.

FIGS. 12 and 13 comprise the schematic of the access register circuit (AS).

FIGS. 9, 10, 10A, 14 and 15 comprise the schematic of the readout processor circuit (RP).

FIGS. 16–19 comprise the schematic of the memory address counter and pulse generator circuit (AP).

FIG. 20 discloses the magnetic drum, the read (RA) and write (WA) amplifiers and the memory readout buffers (MR).

FIGS. 21–30 comprise the schematic of the process controller circuit (CL).

FIGS. 31 and 32 comprise the schematic of the address comparator or coincidence circuit (CN).

FIG. 34 is a table showing information transfer patterns between the register-sender and the translator.

FIGS. 35, 36A, 36B, 37A and 37B comprise a table showing operational timing for code translations.

Figures 1, 2:
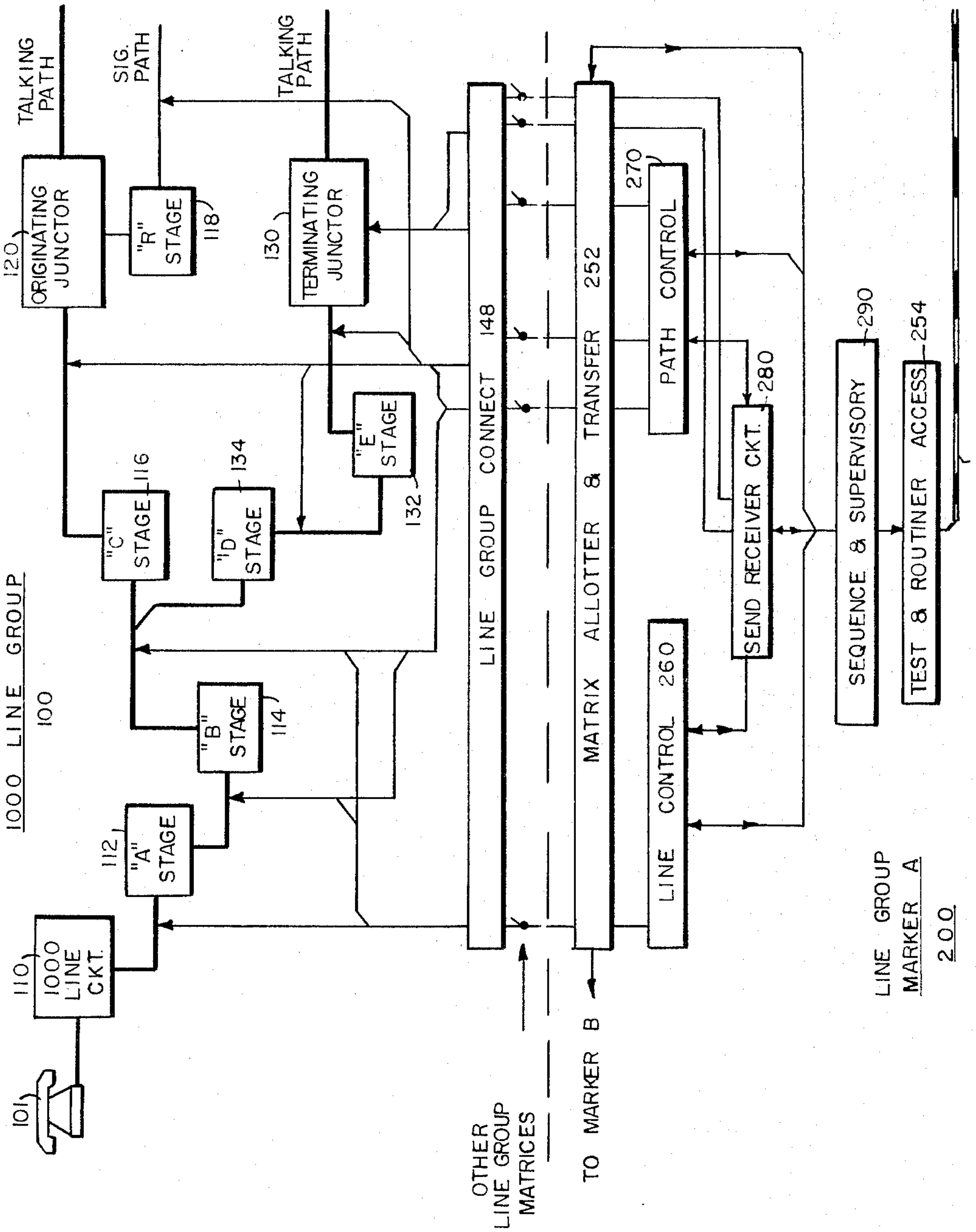
Figure 1A:
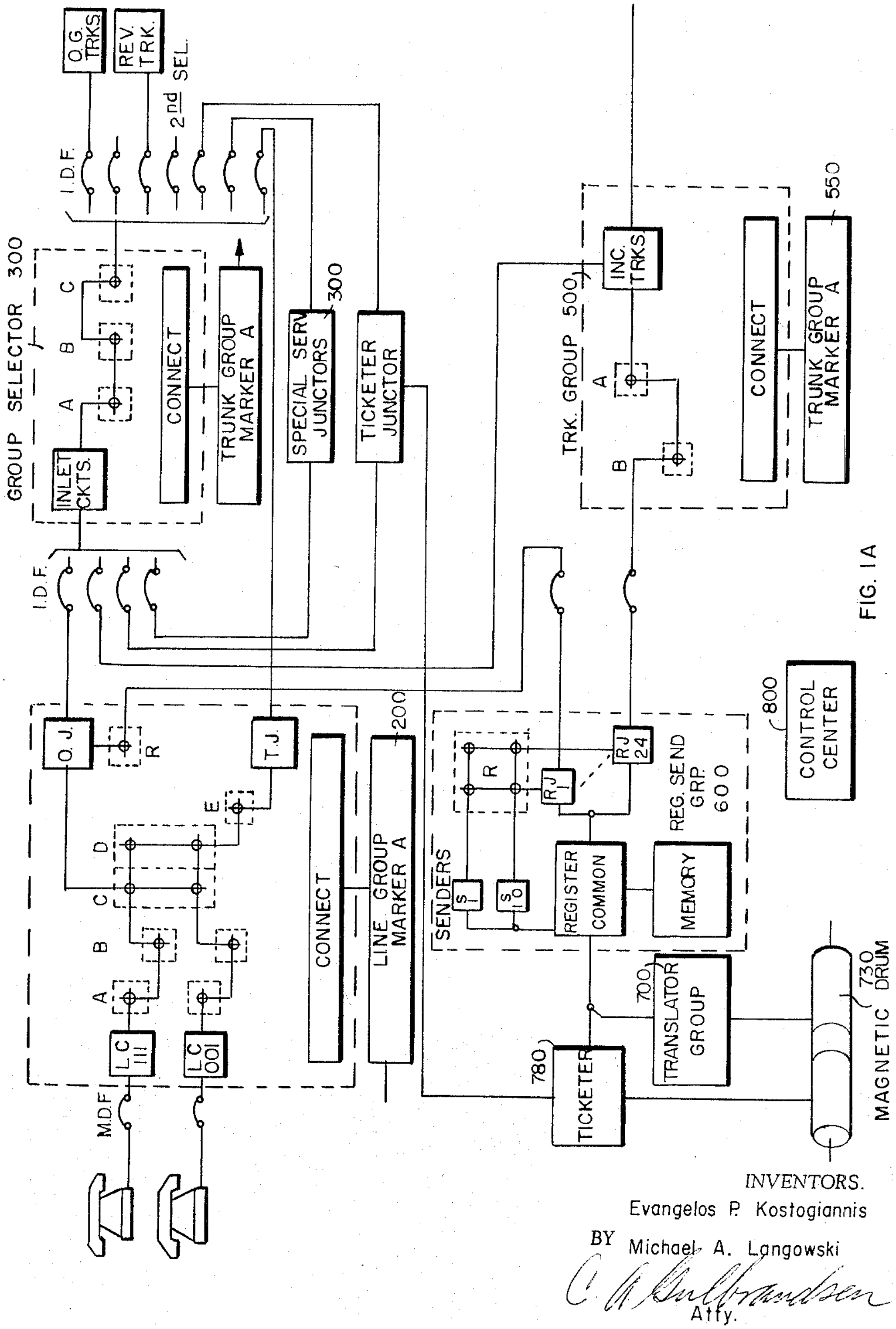
Figures 3, 4:
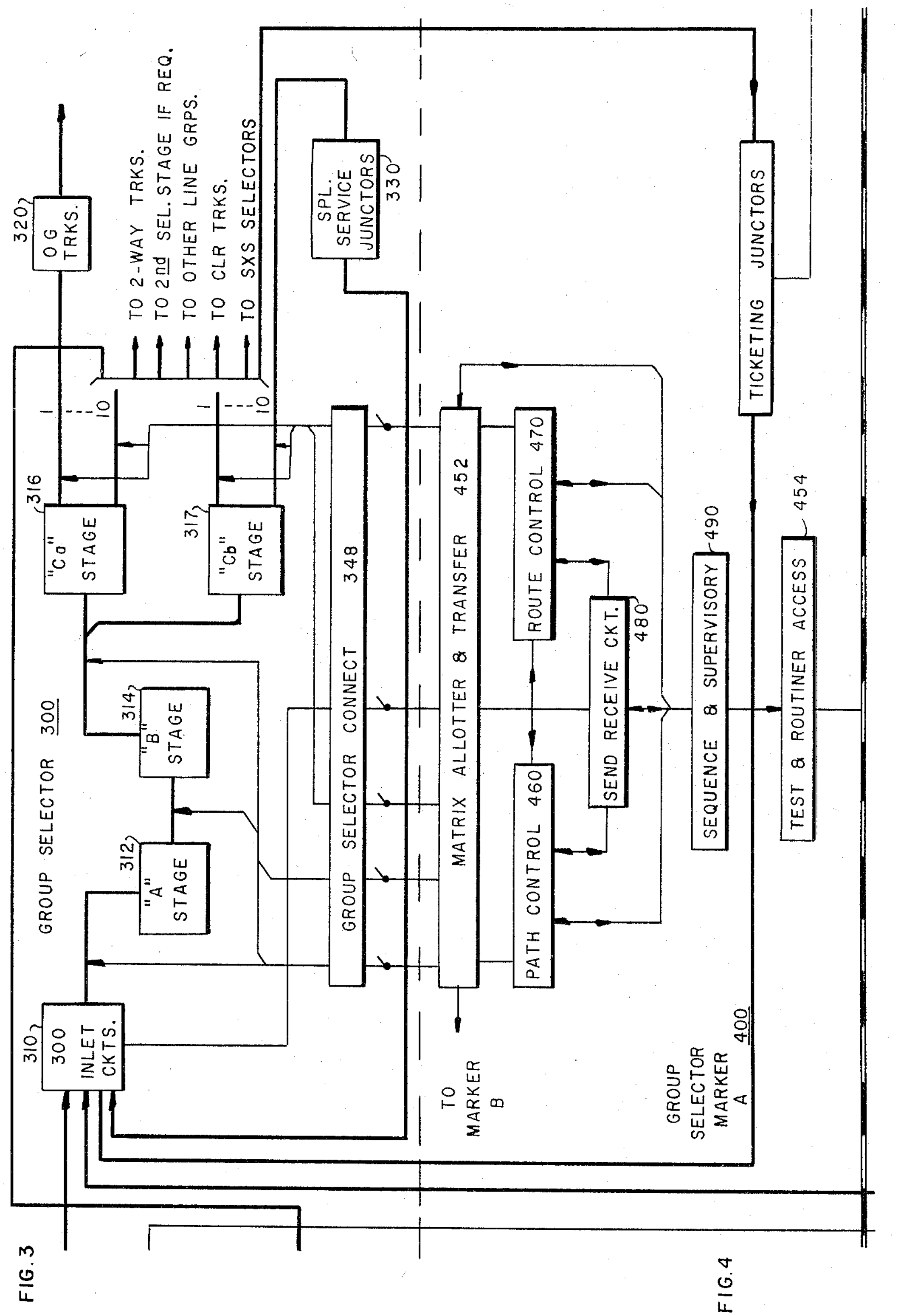
Figure 5:
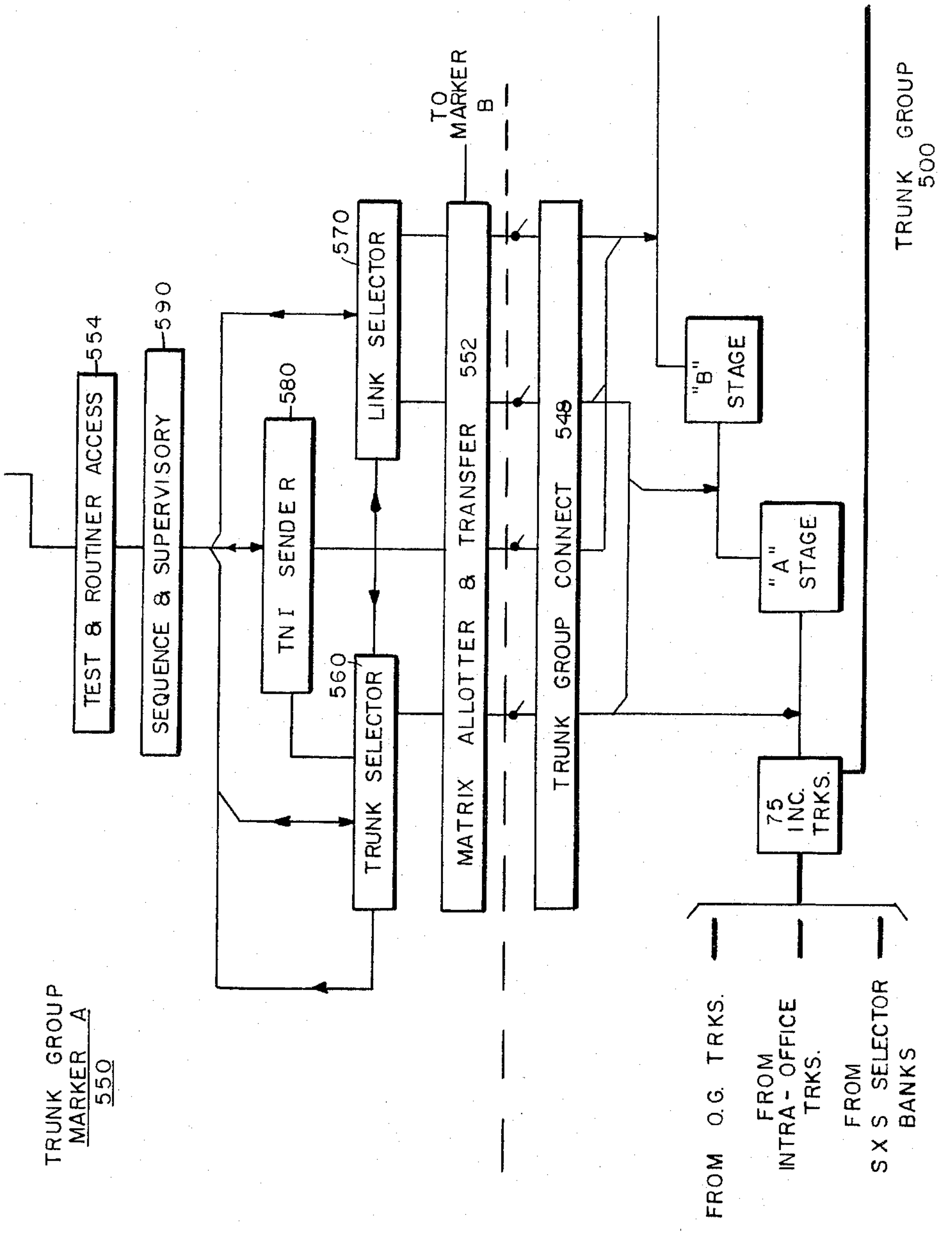
Figure 6:
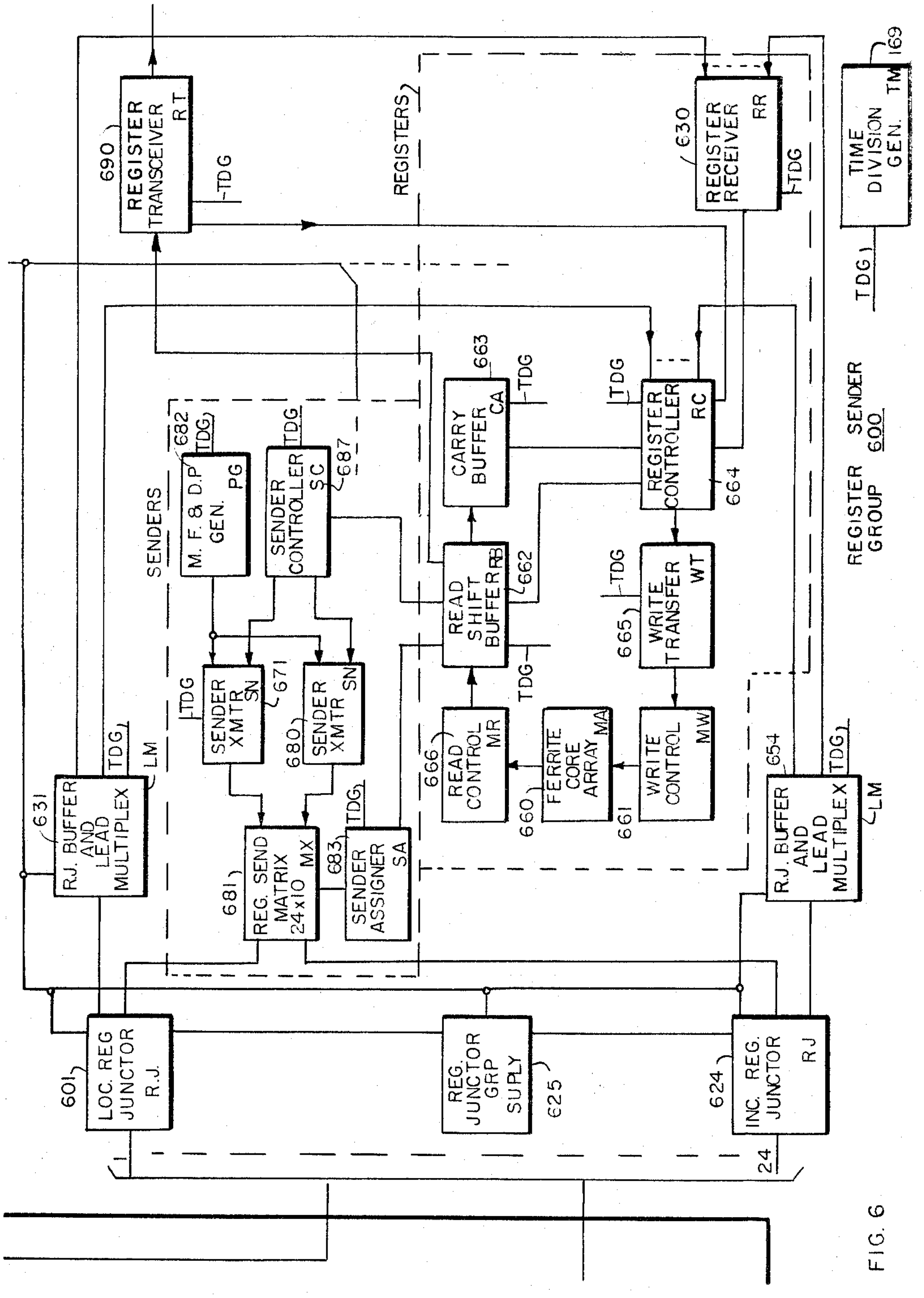
Figure 7:
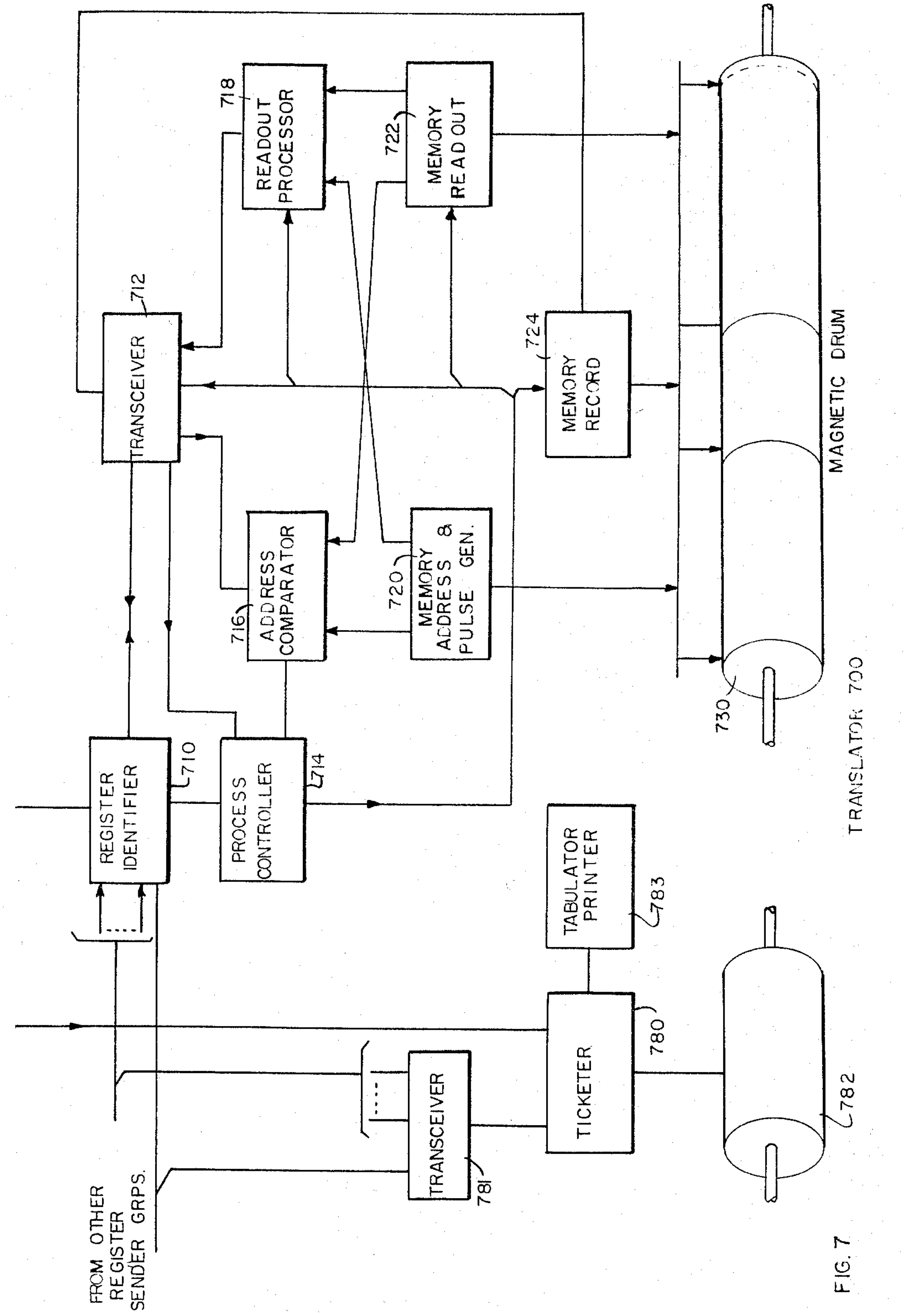
Figure 8:
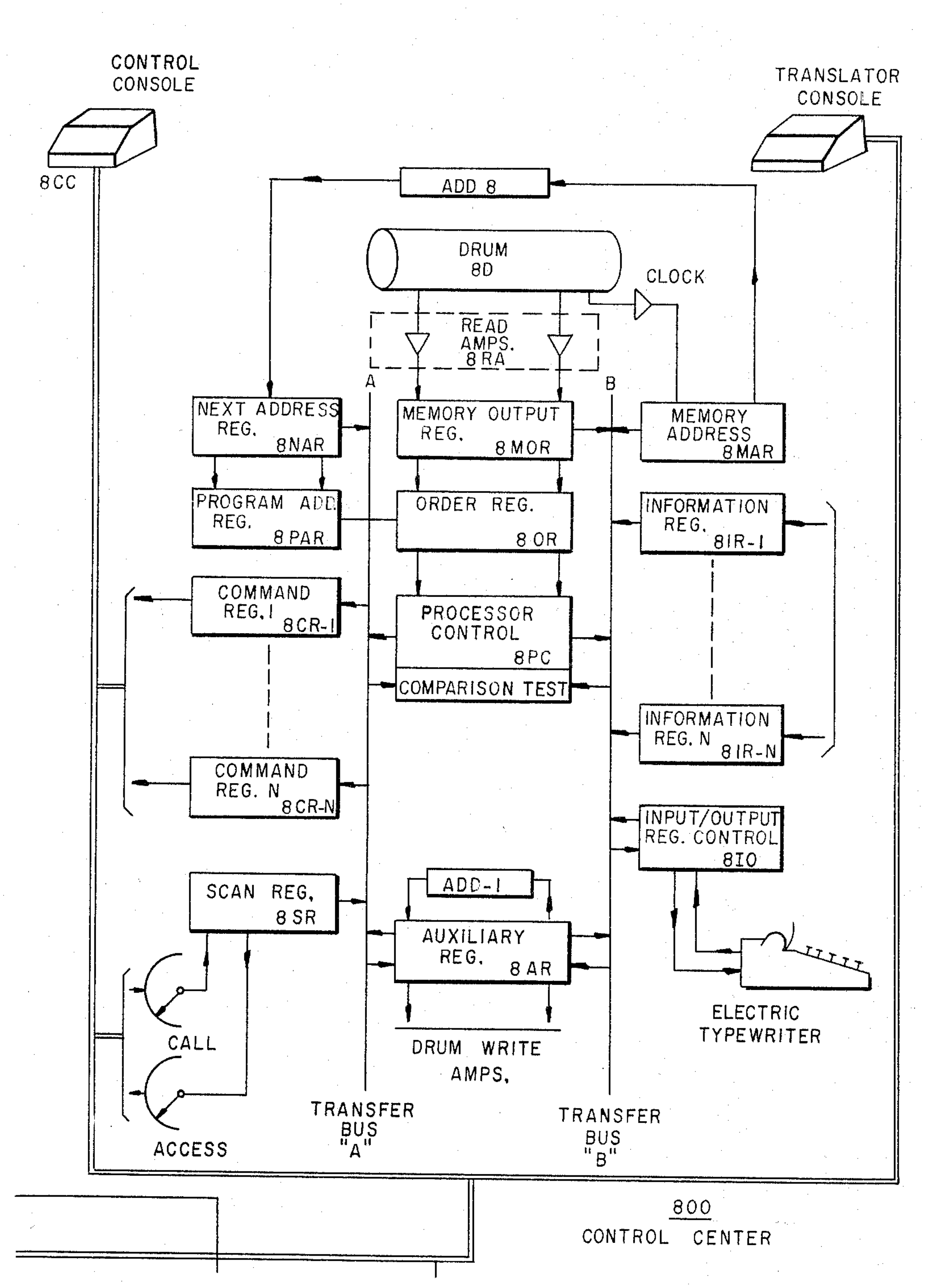
Figure 9:
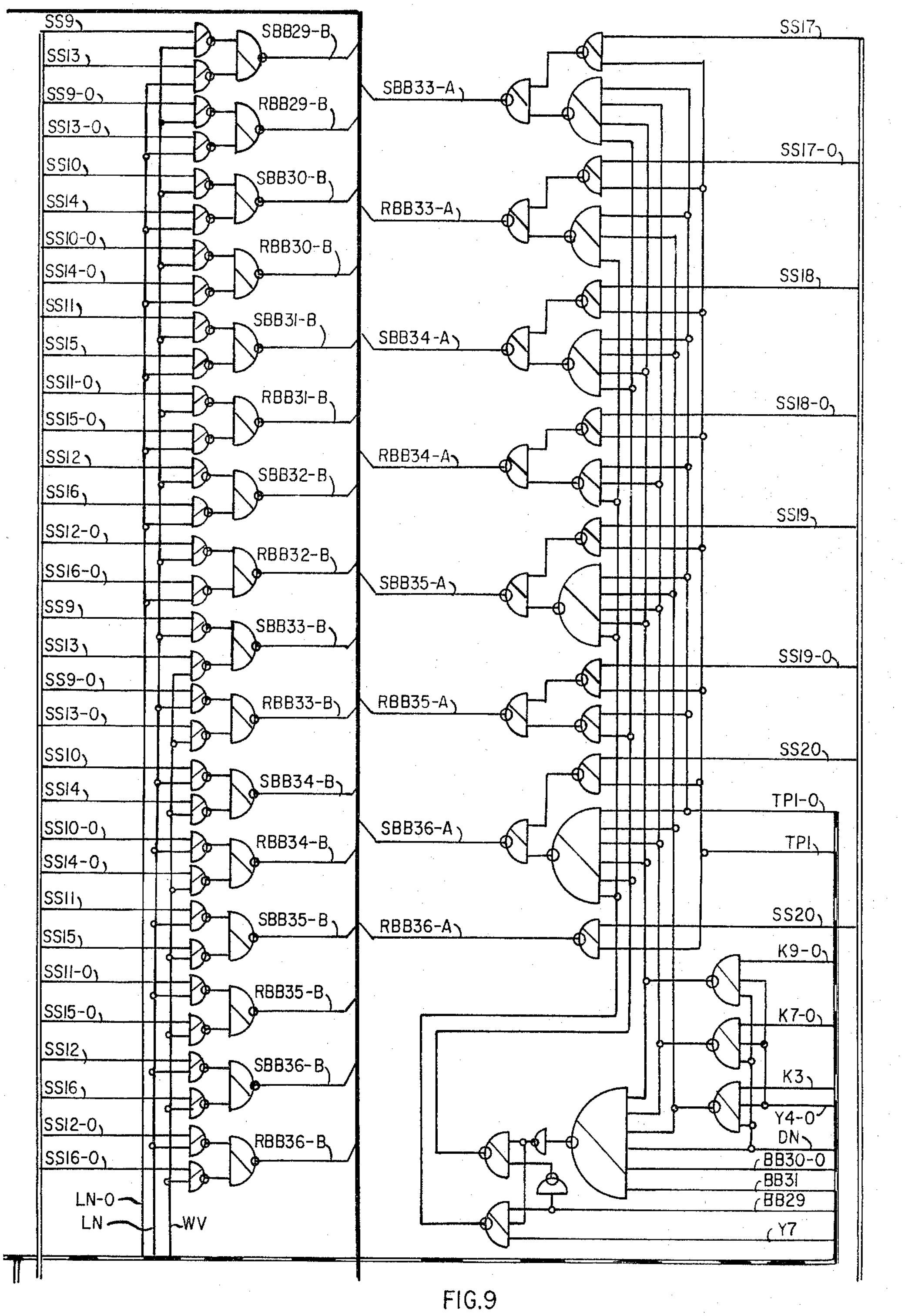
Figure 10:
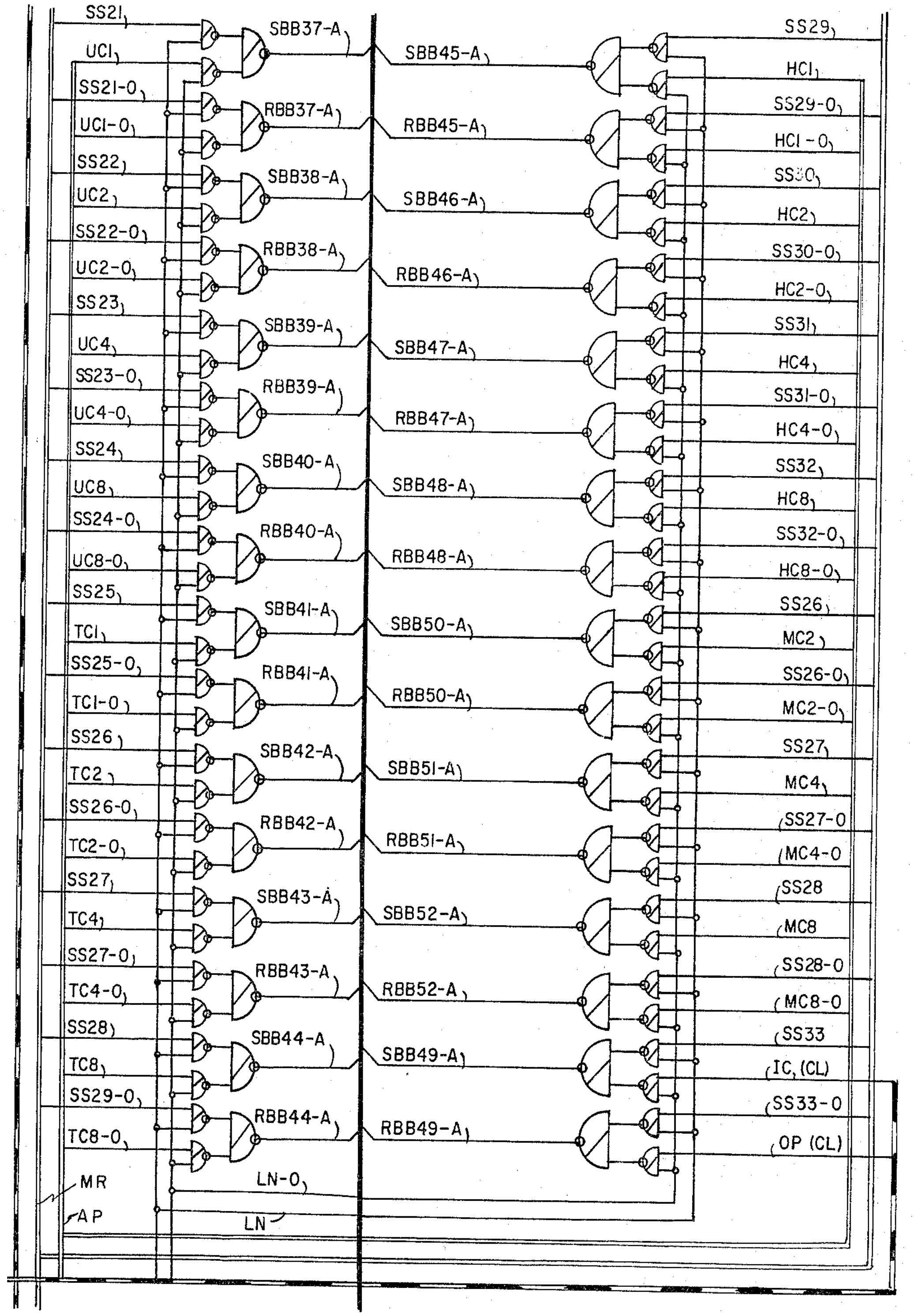
Figure 10A:
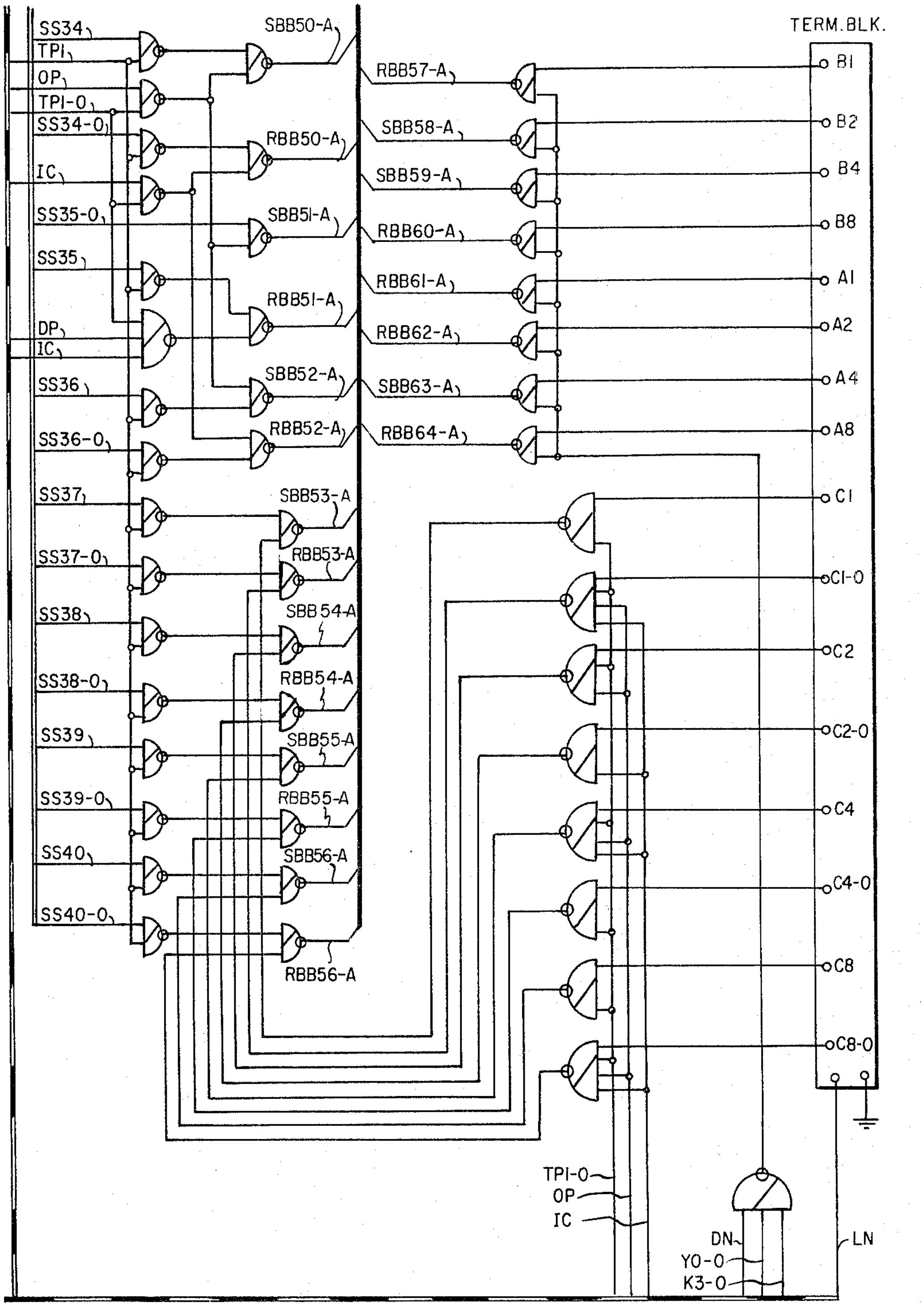
Figure 11:
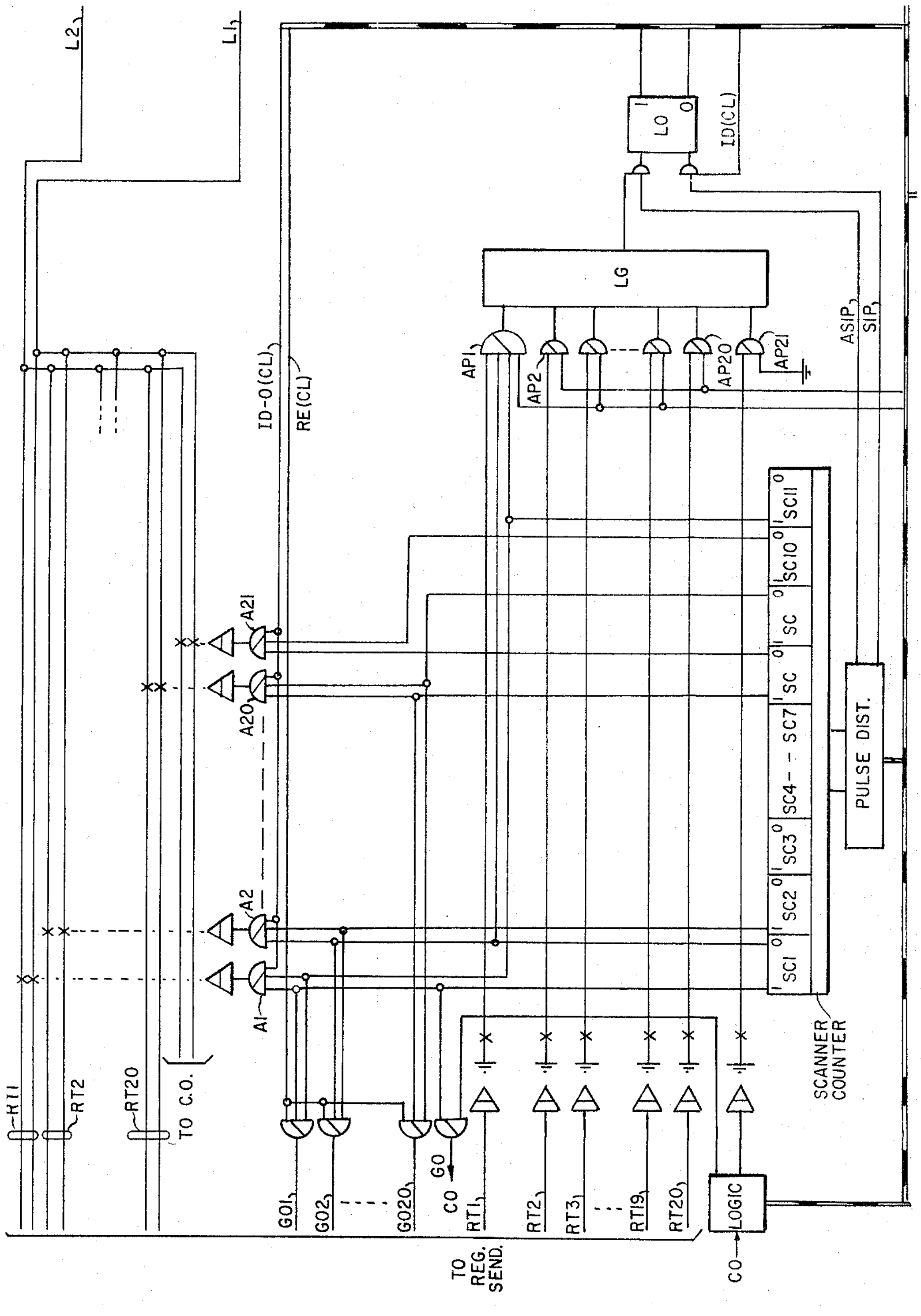
Figure 12:
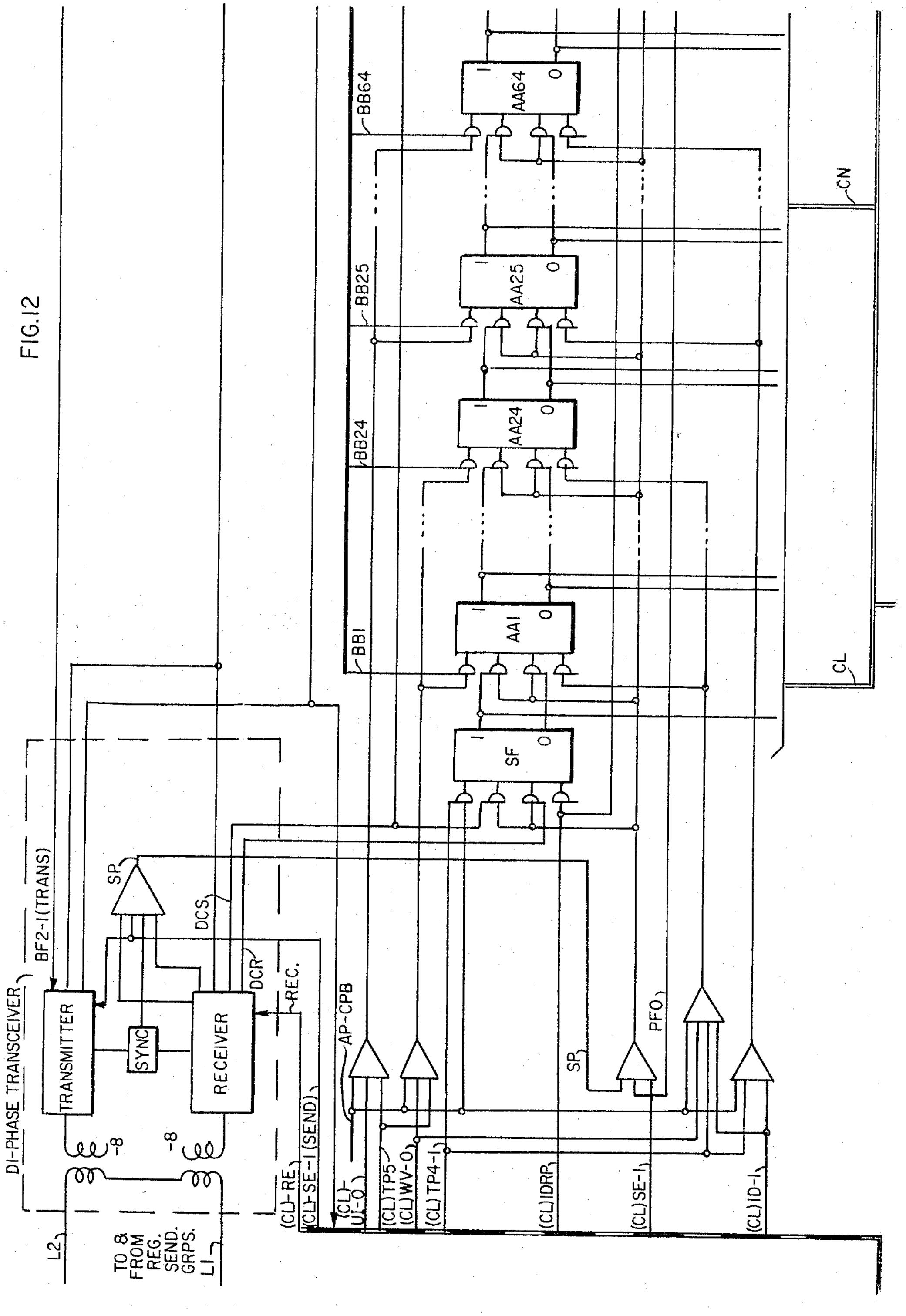
Figure 13:
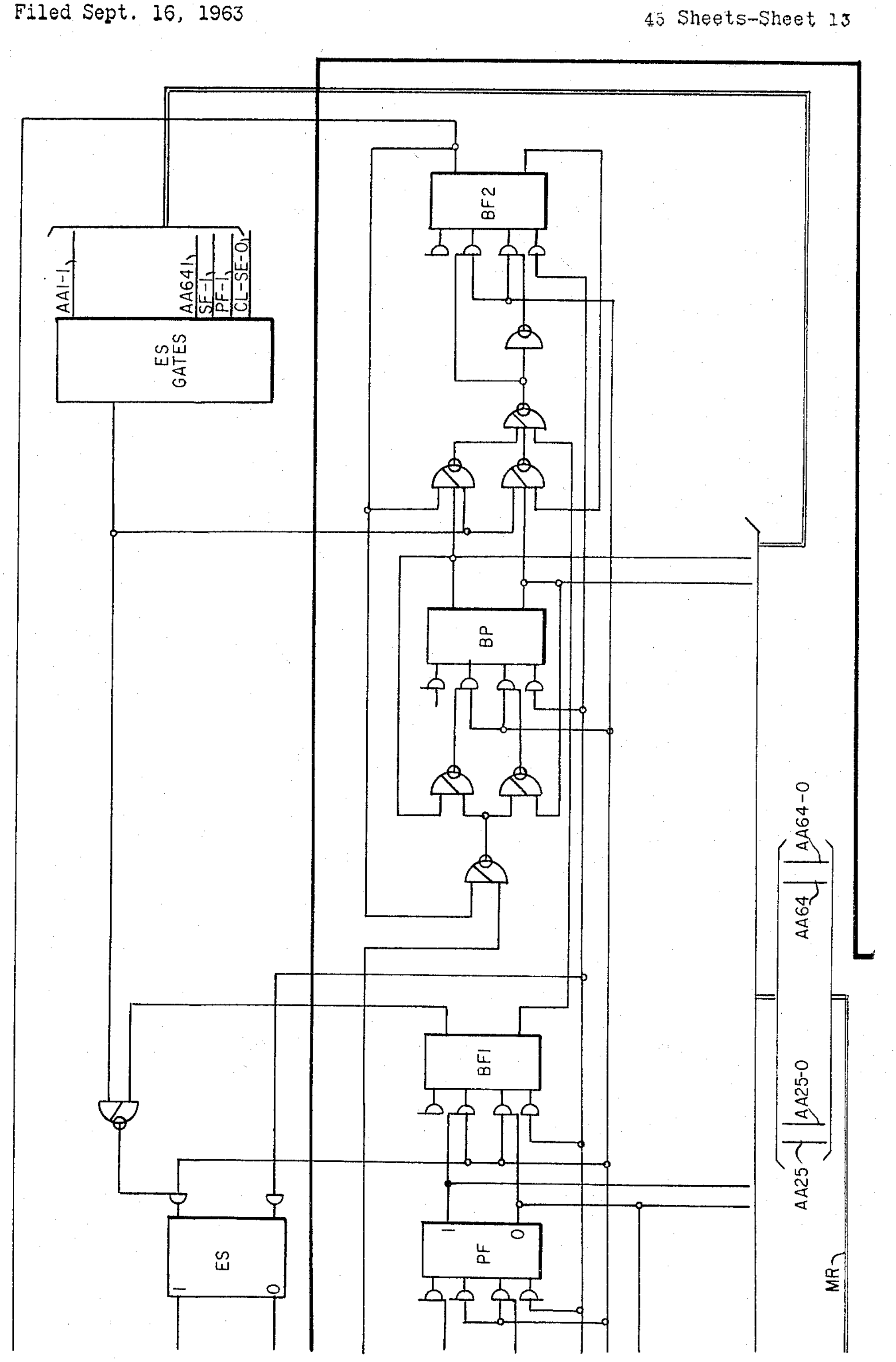
Figure 14:
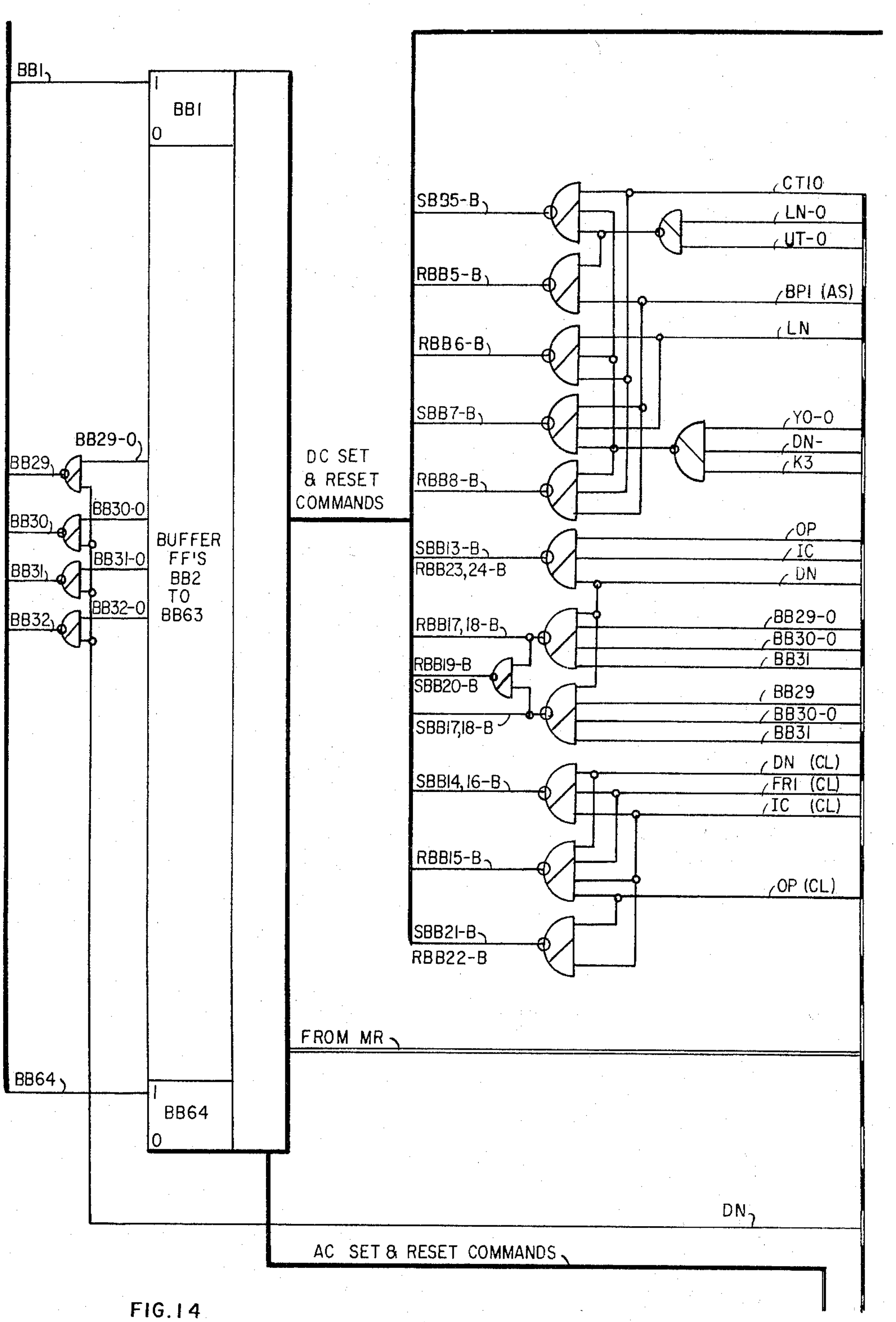
Figure 15:
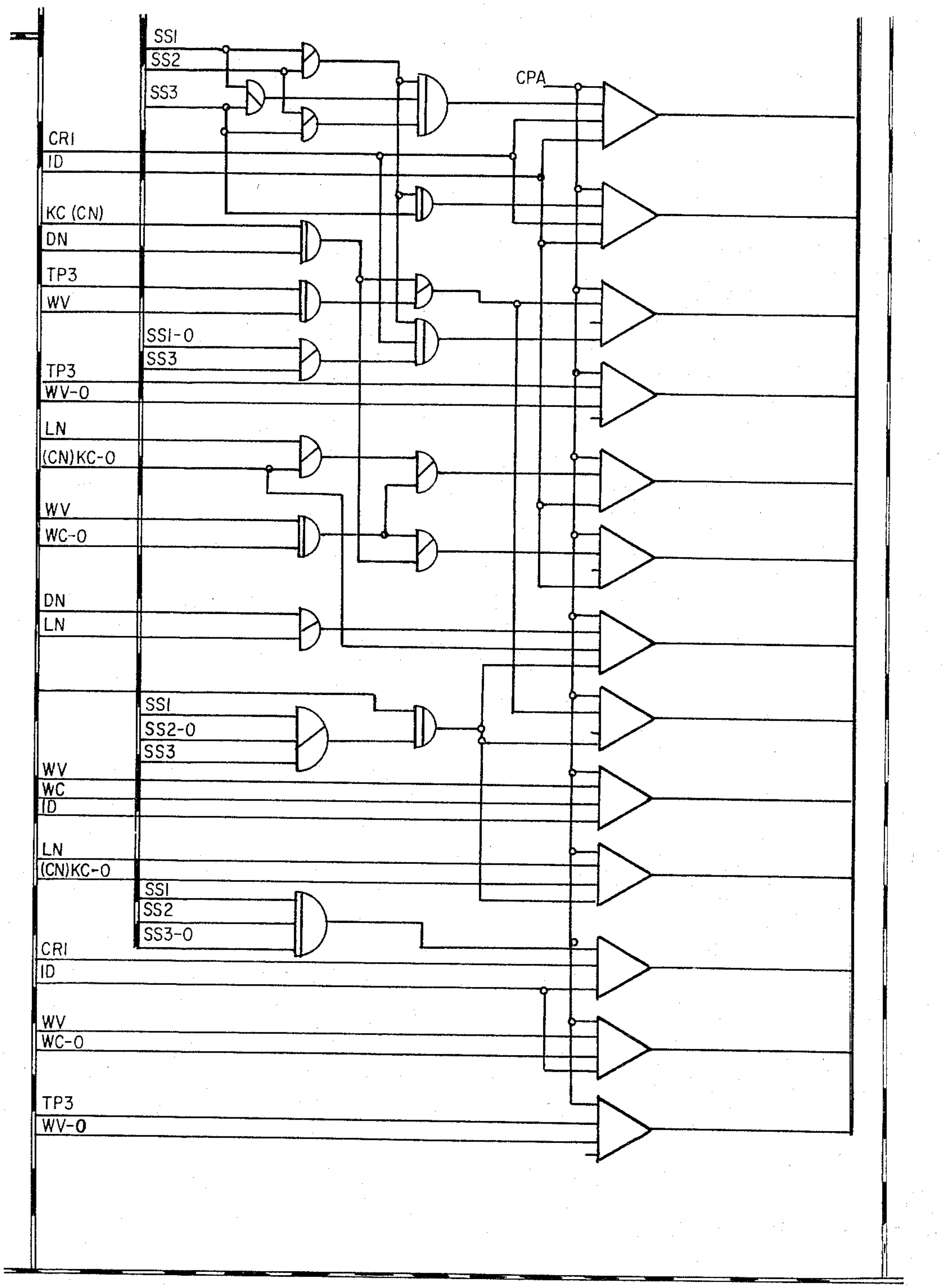
Figure 16:
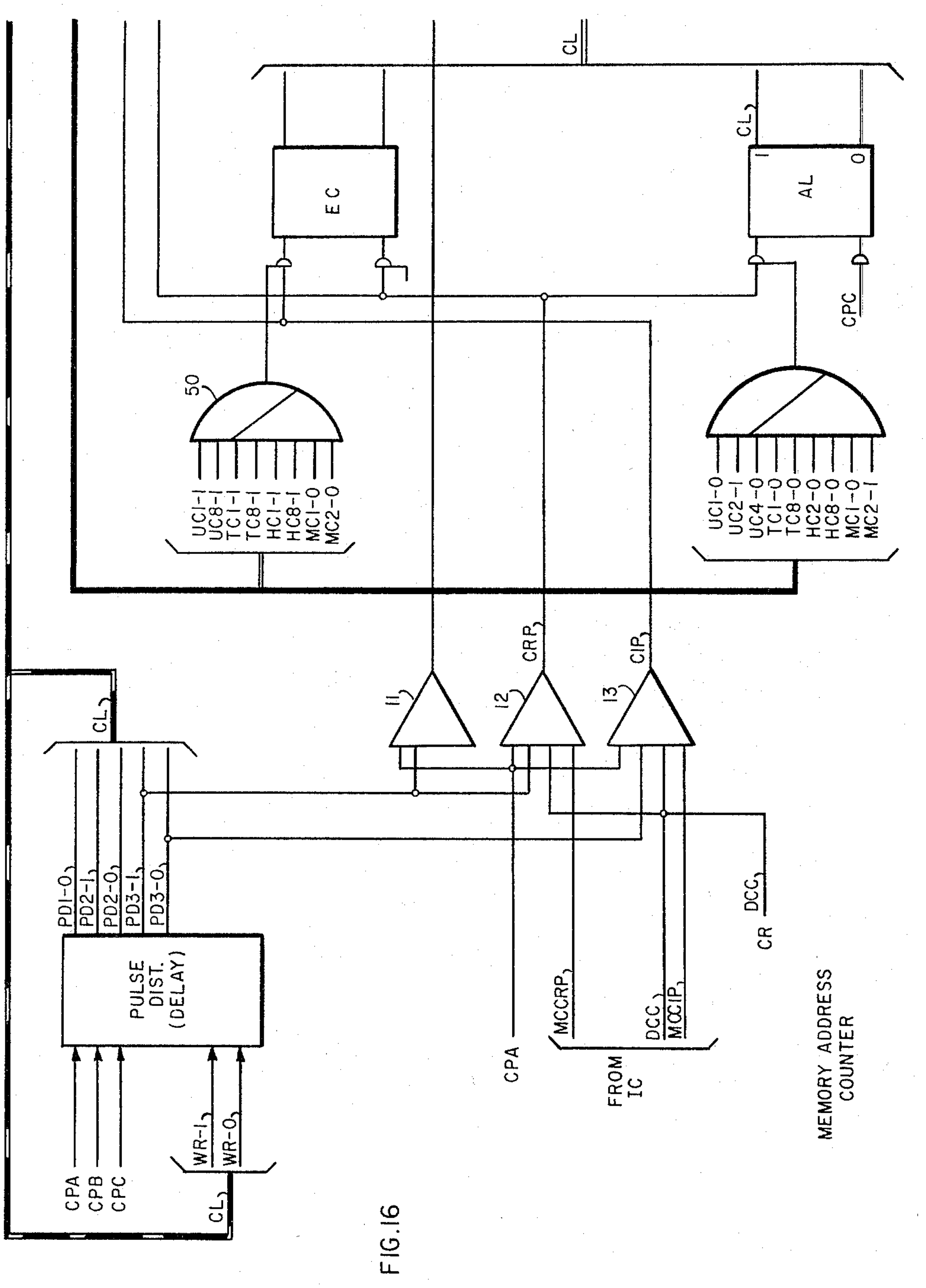
Figure 17:
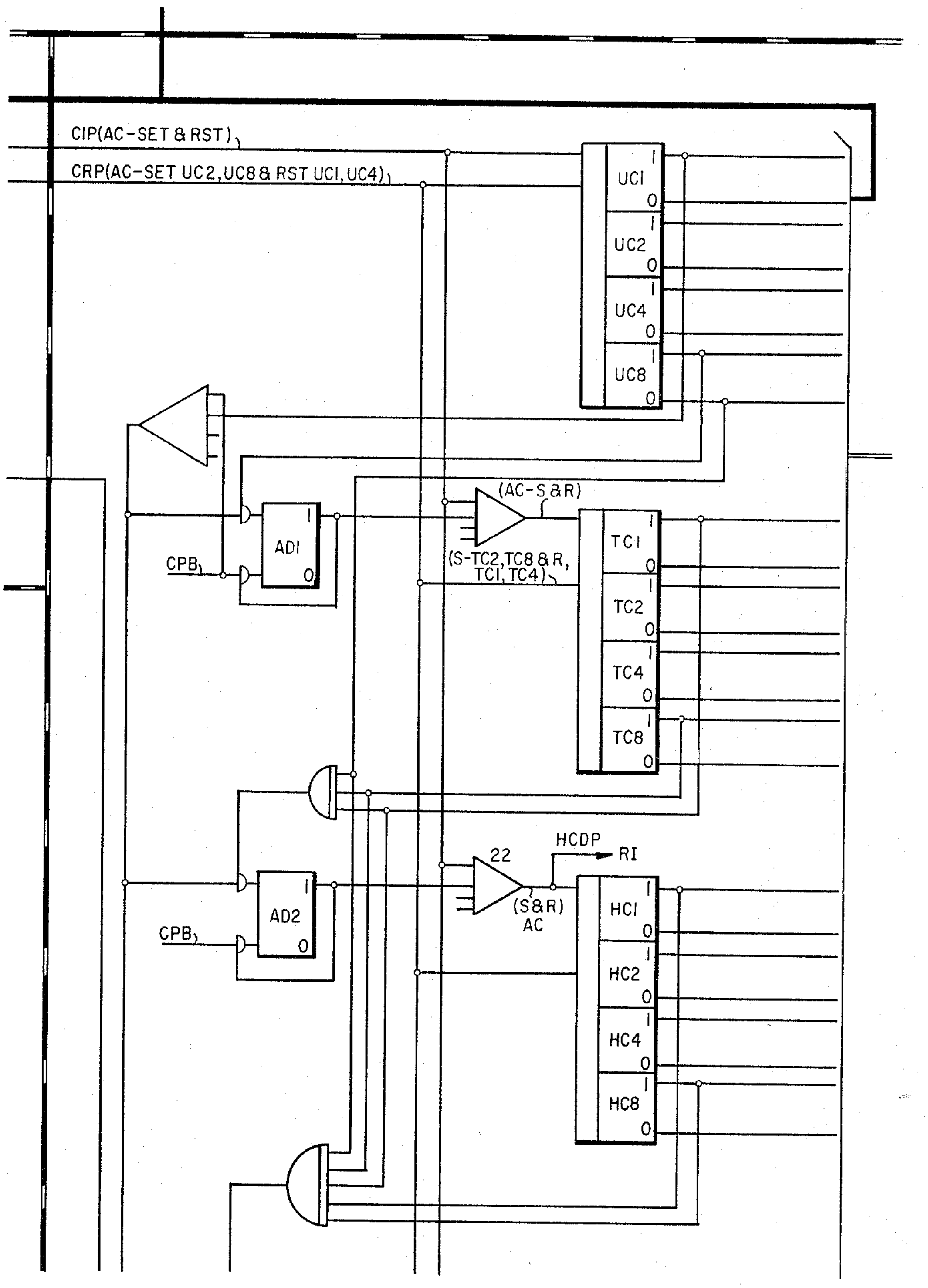
Figure 18:
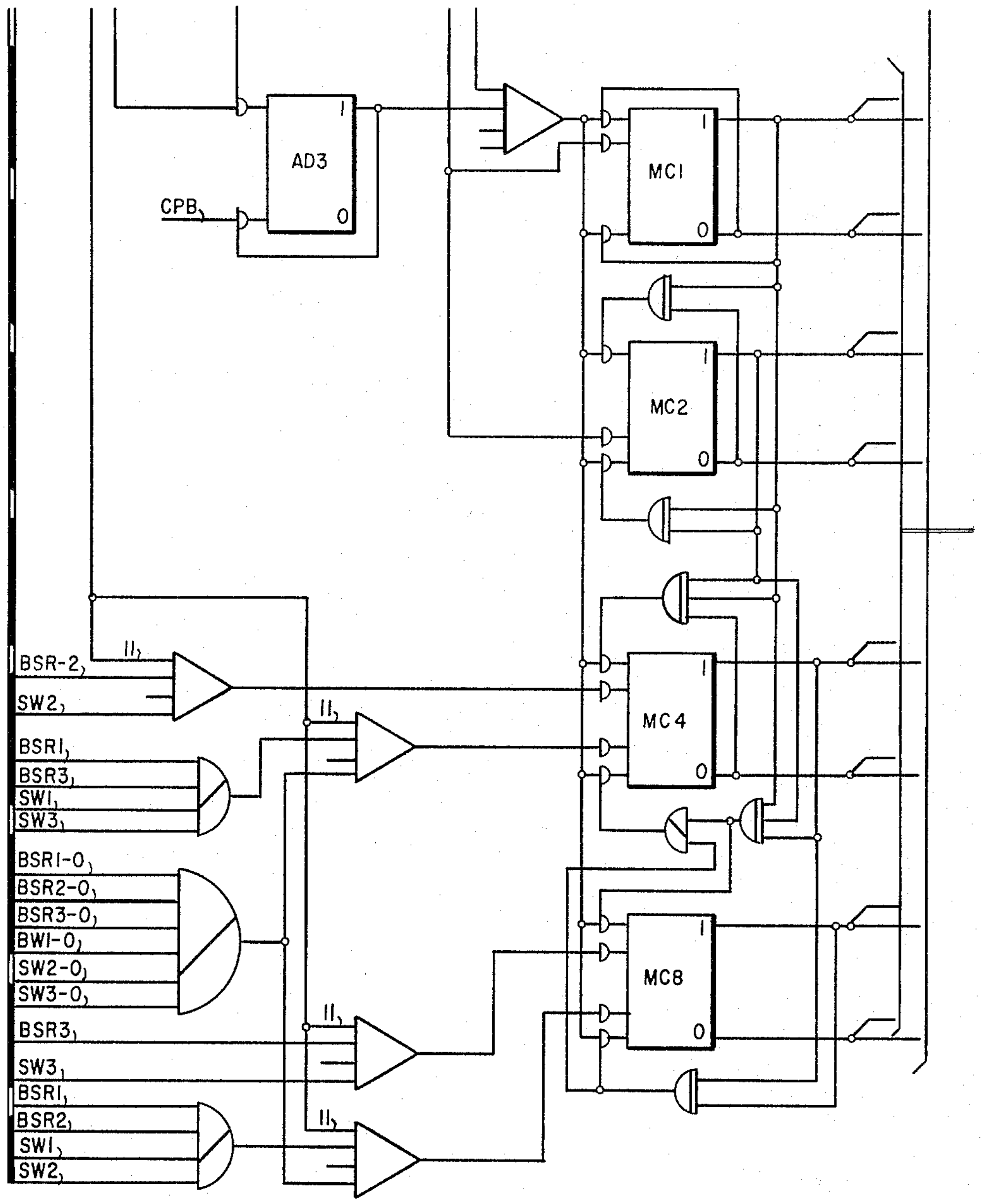
Figure 19:
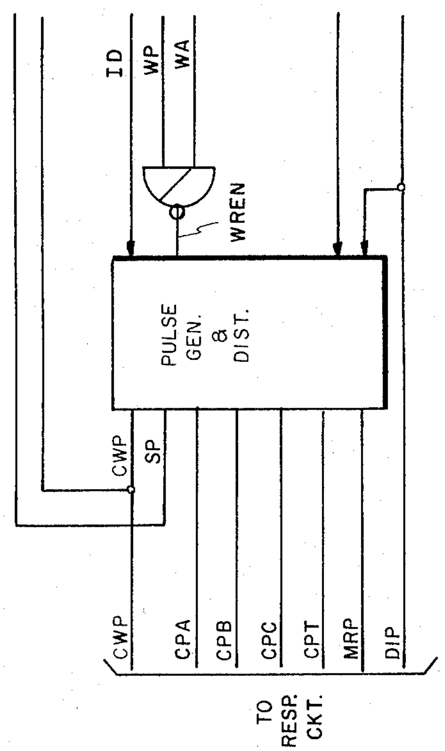
Figure 33:
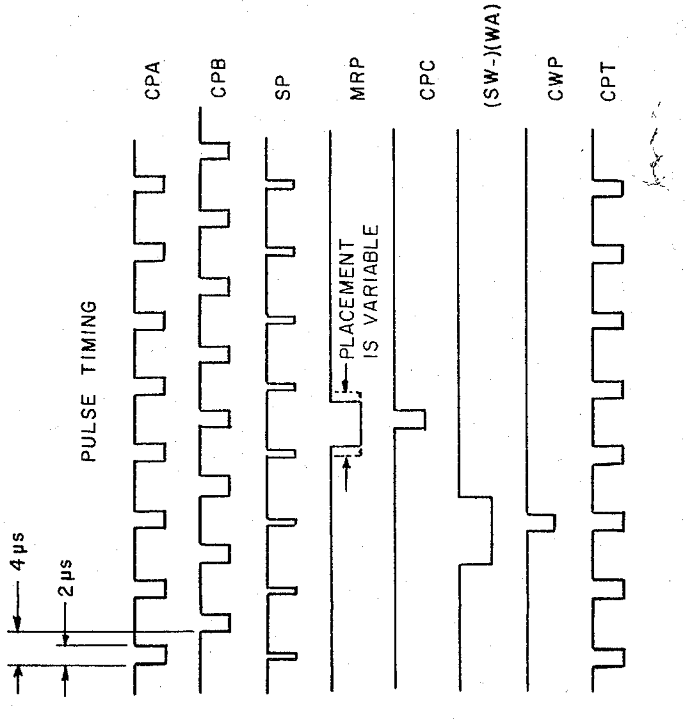
FIG. 33 is a table showing the relative pulse timing.
Figure 20:
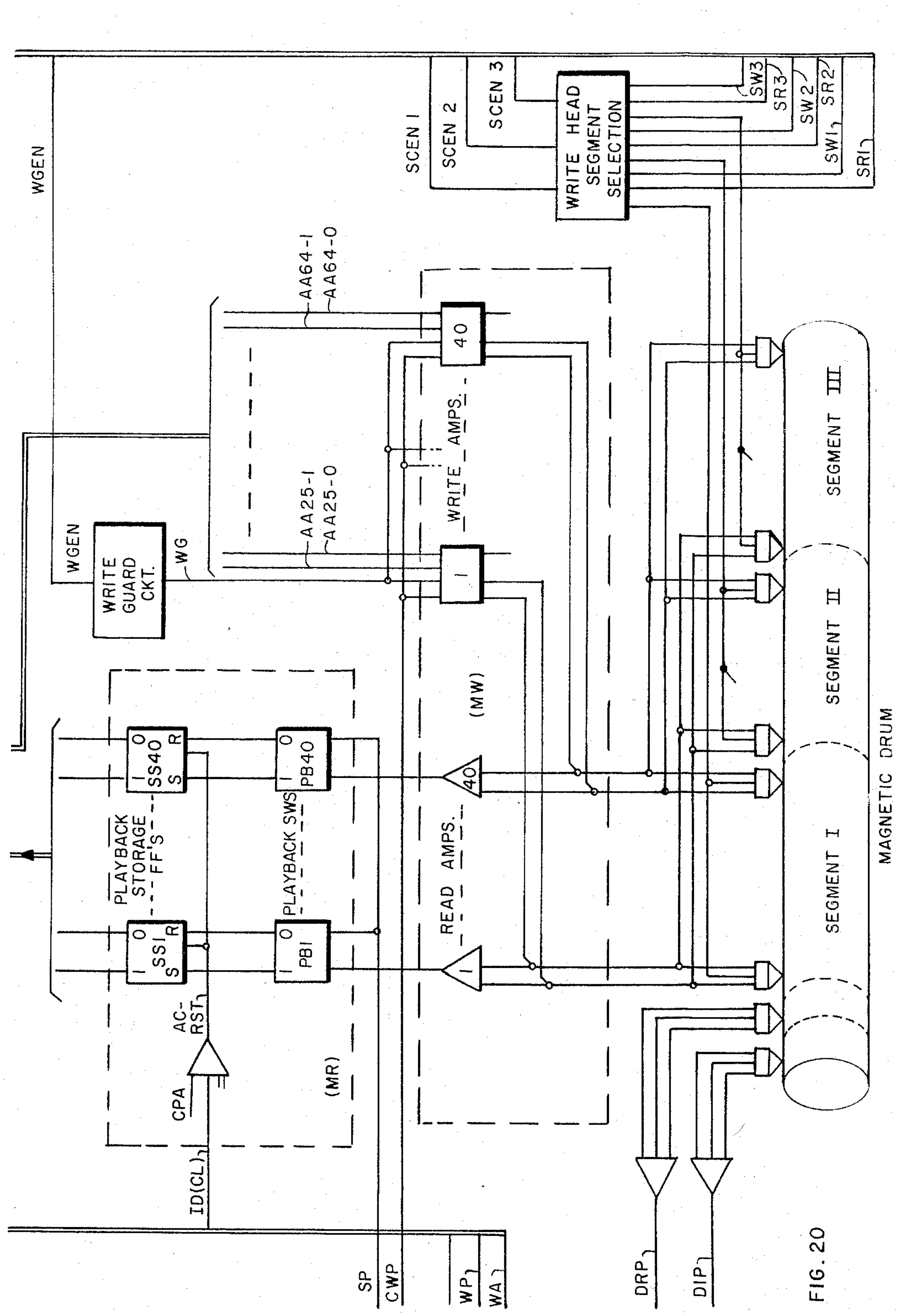
Figure 21:
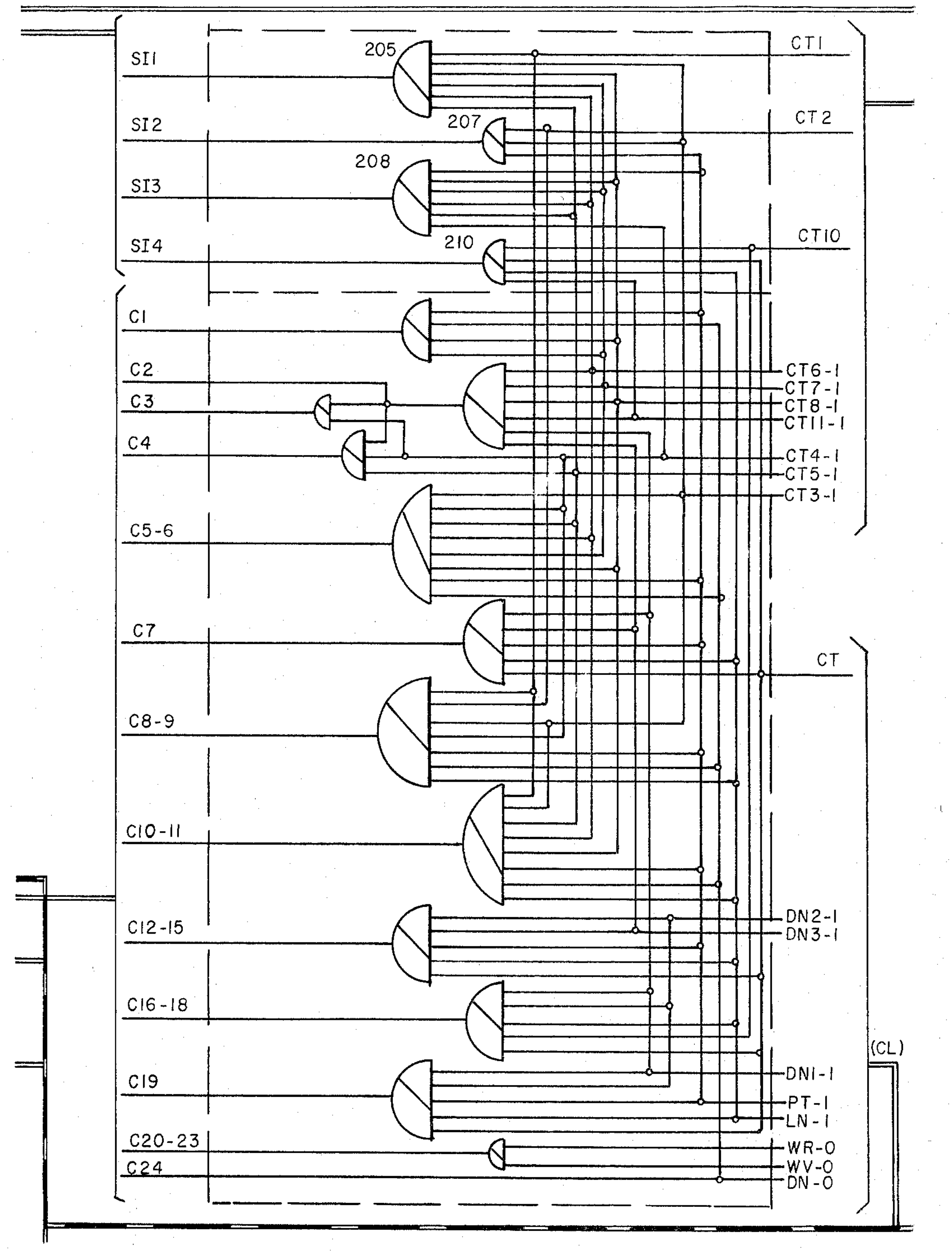
Figure 22:
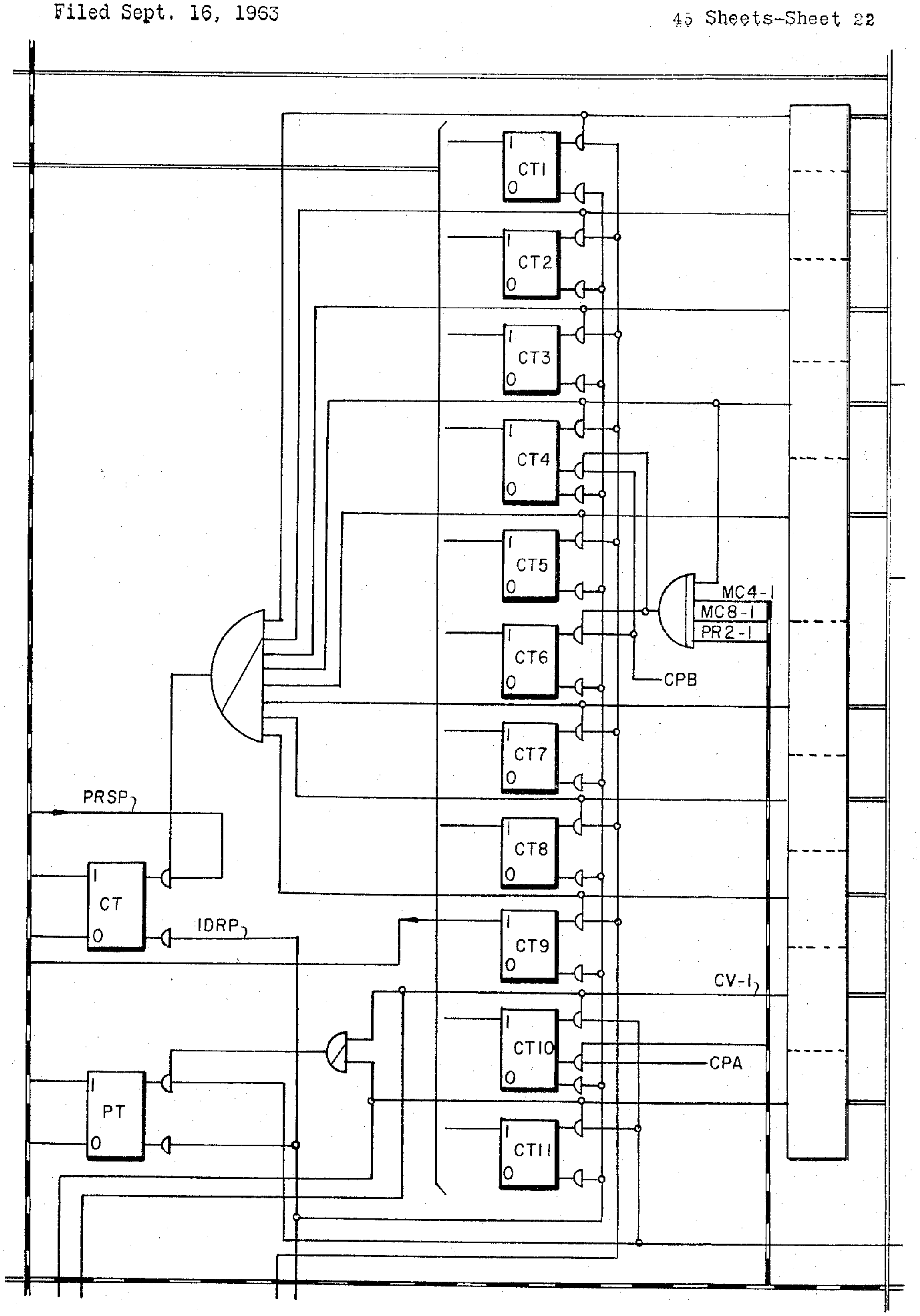
Figure 23:
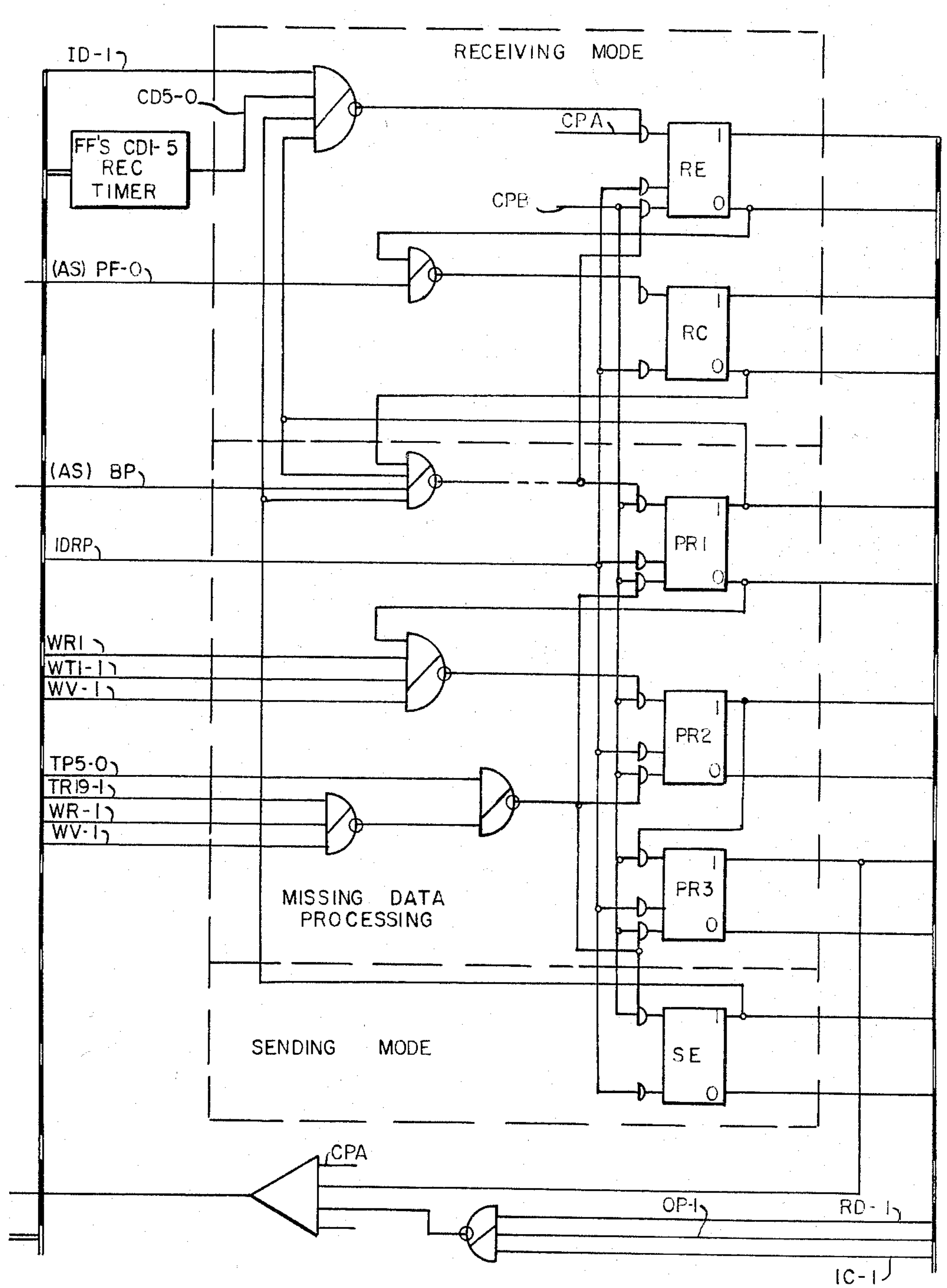
Figure 24:
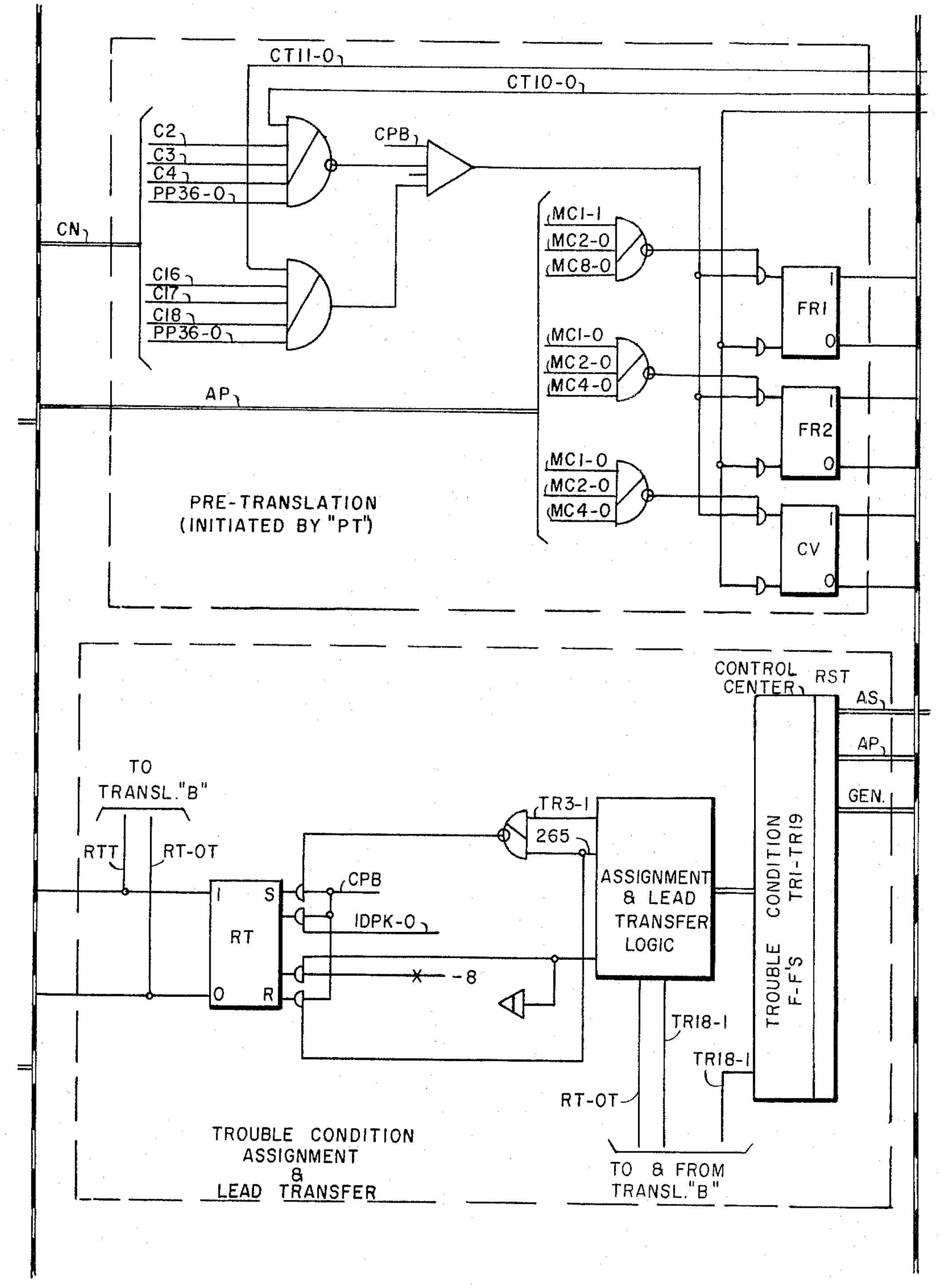
Figure 25:
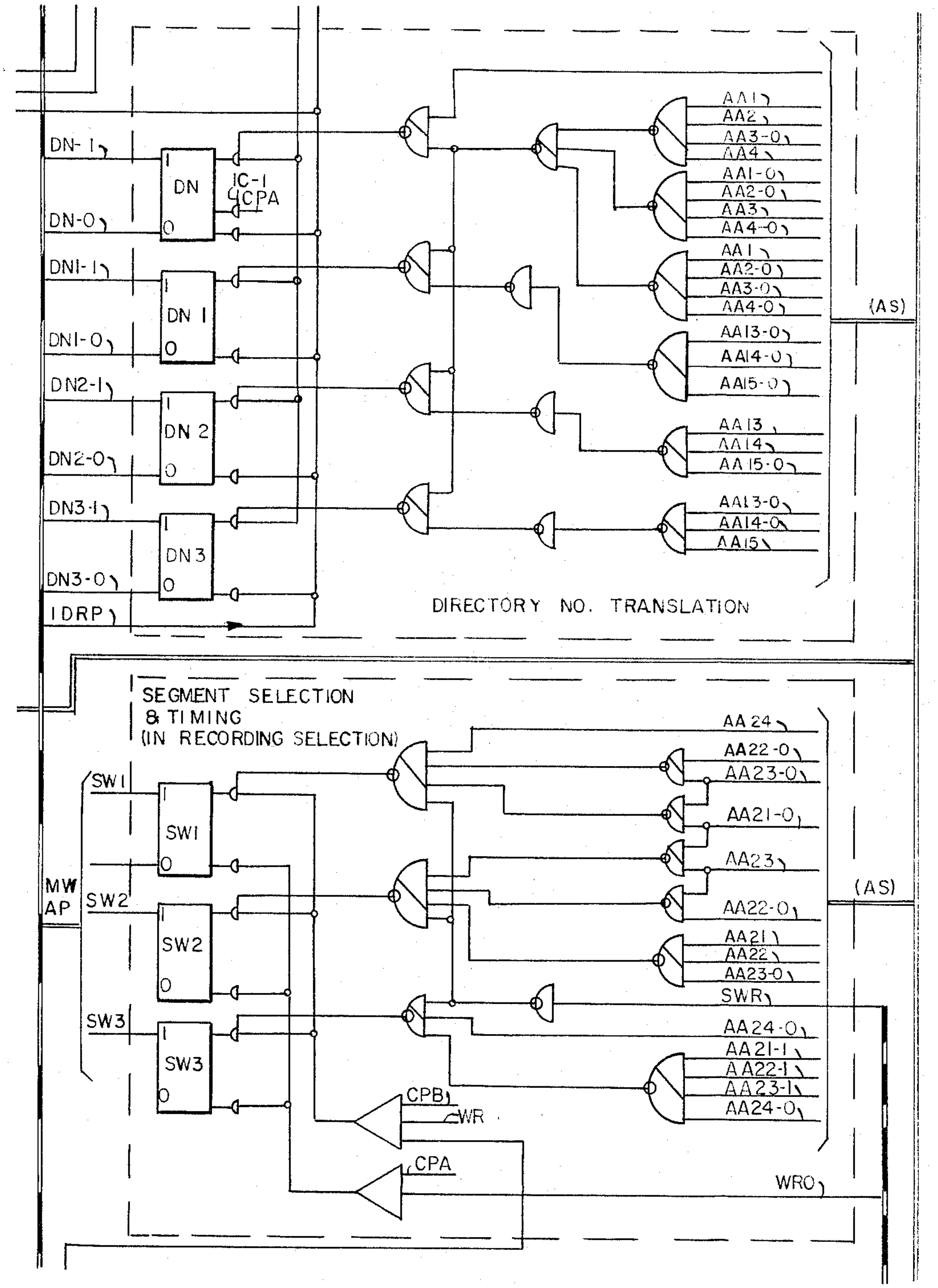
Figure 26:
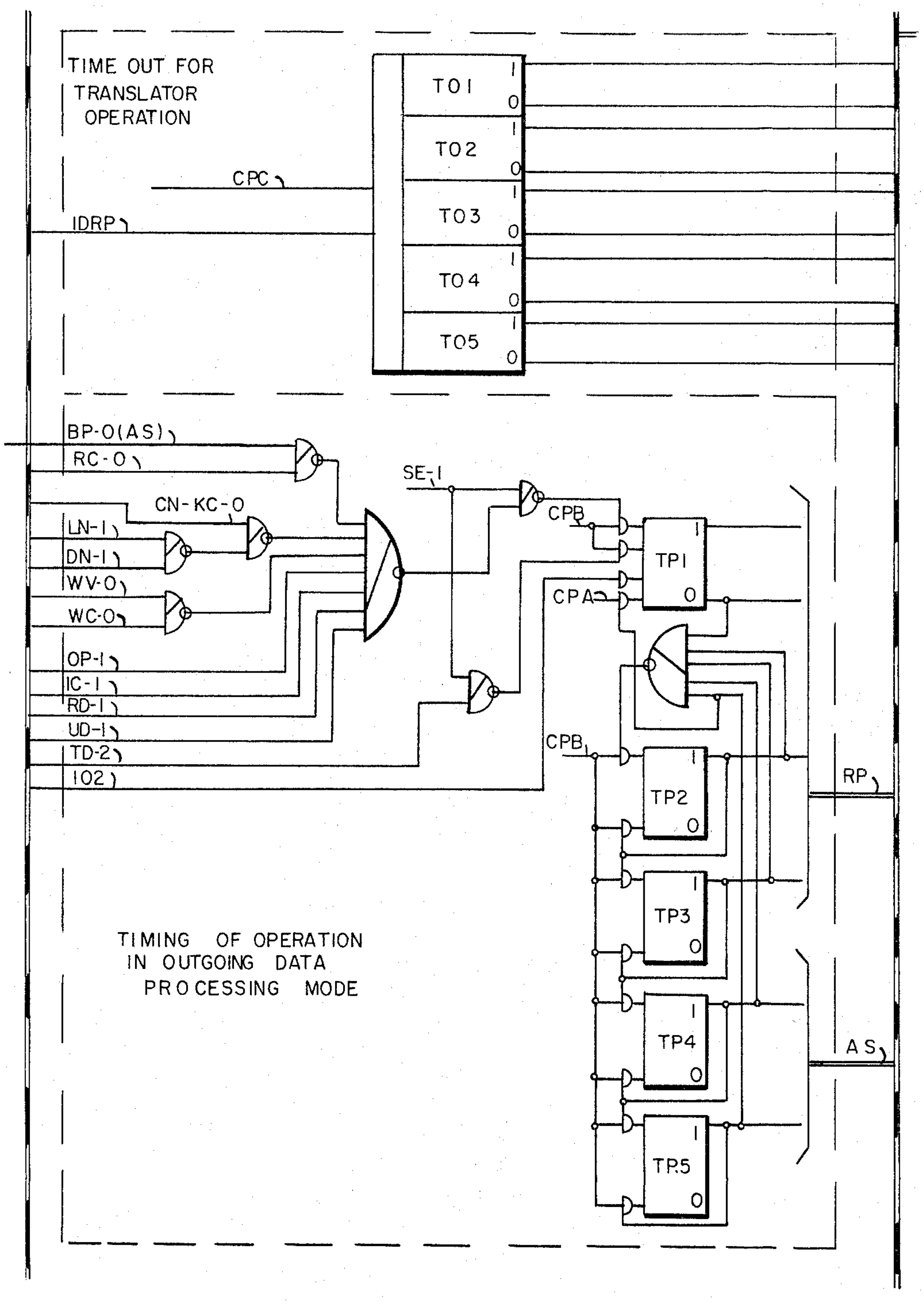
Figure 27:
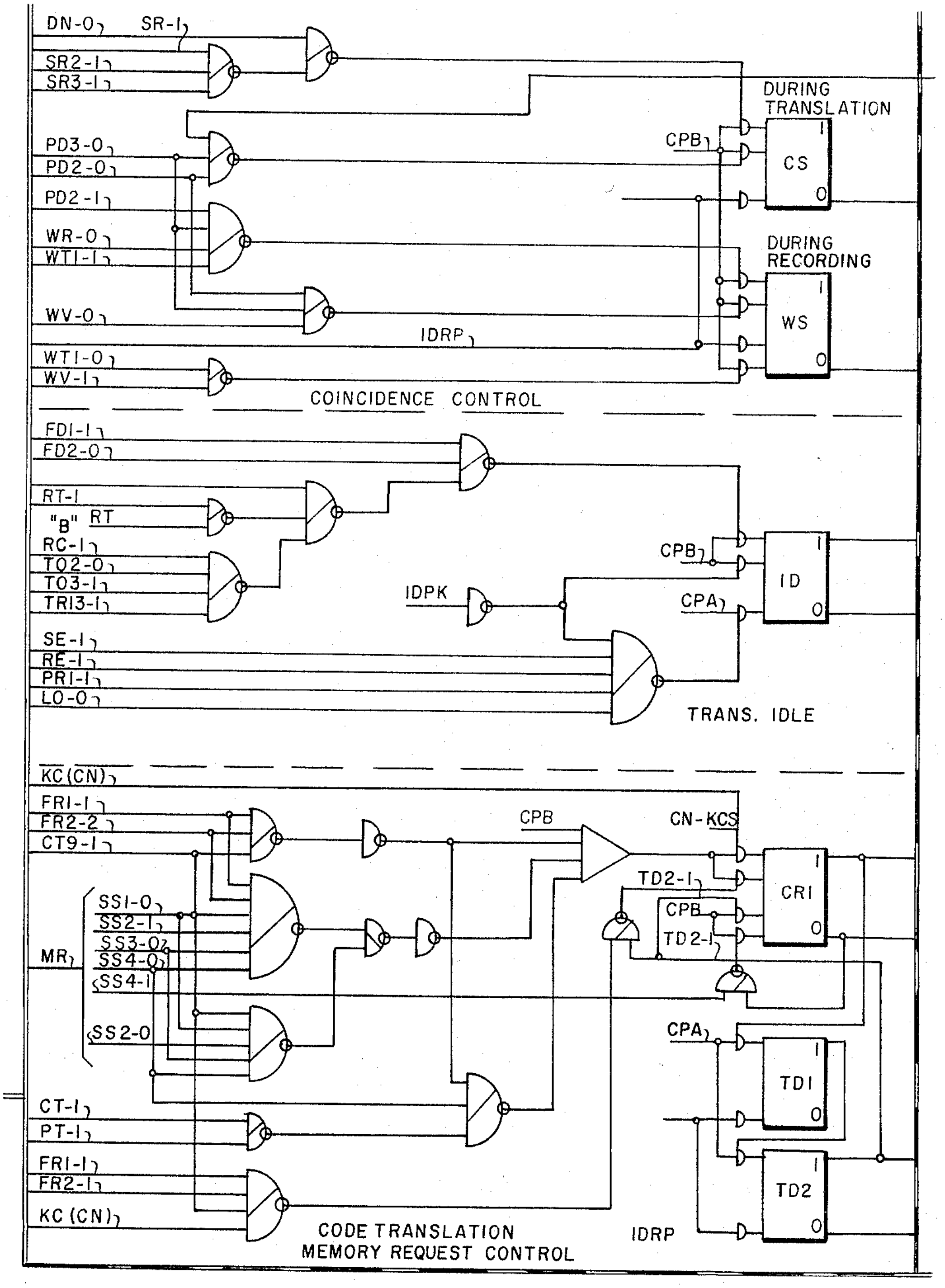
Figure 28:
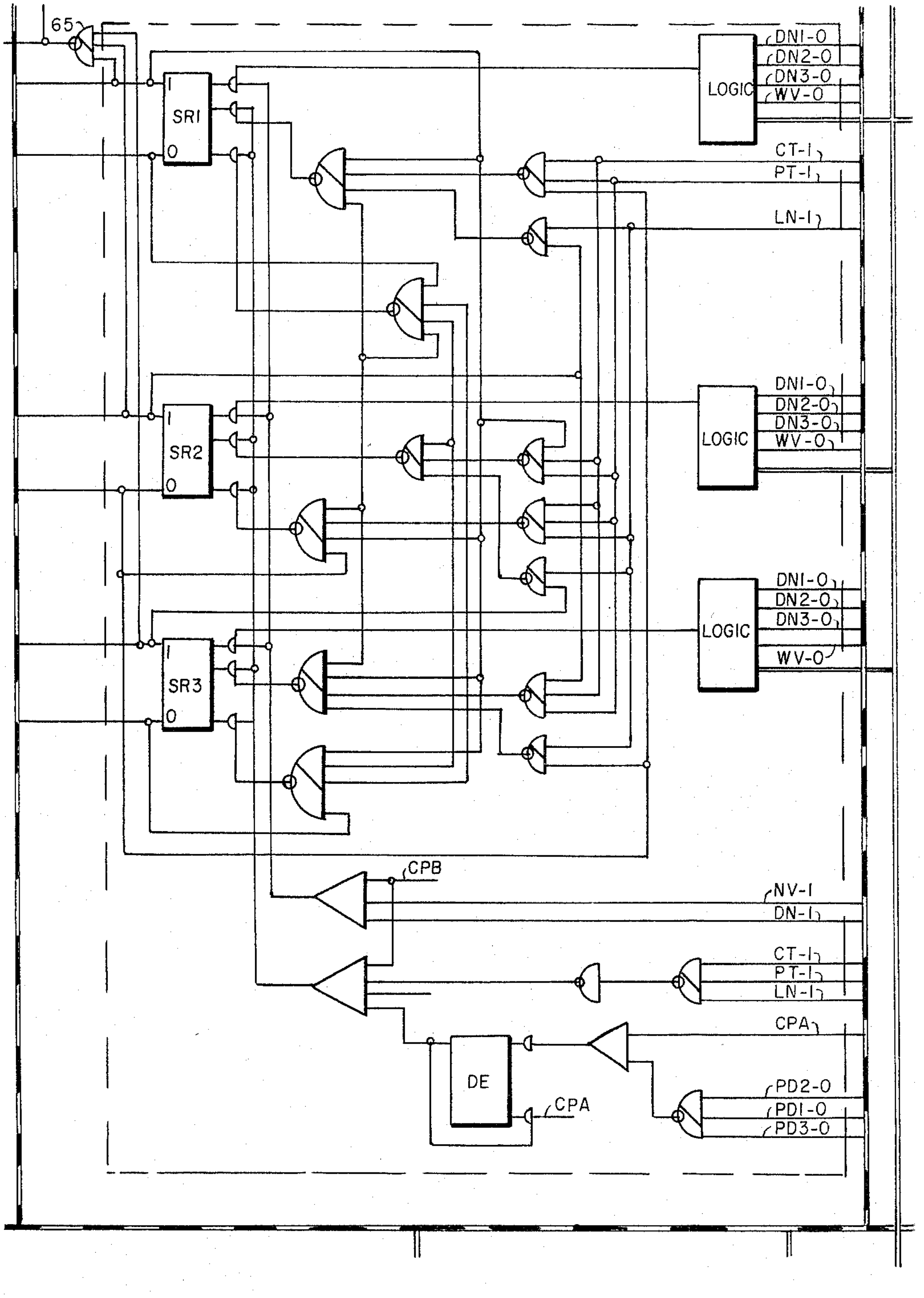
Figure 29:
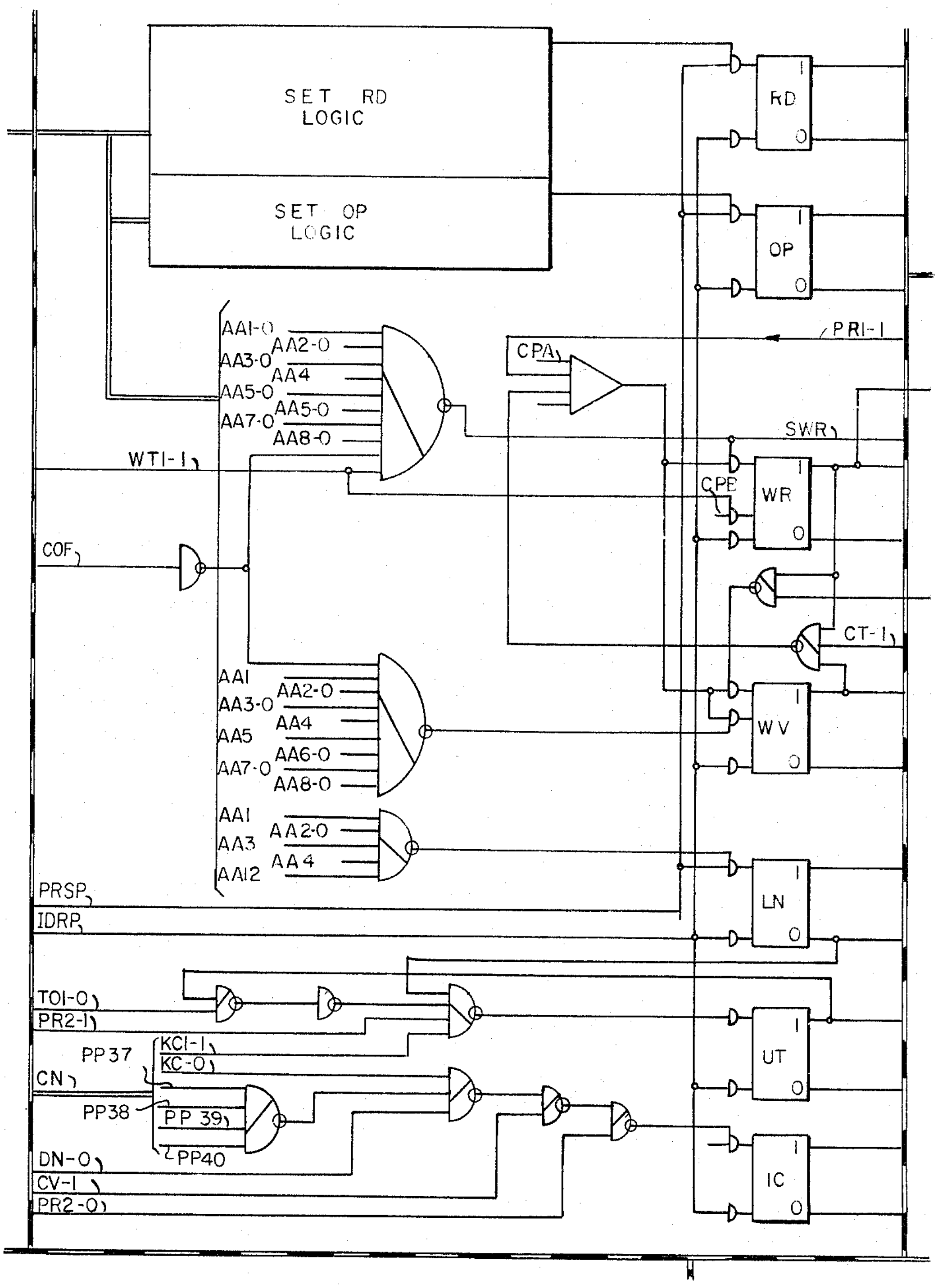
Figure 30:
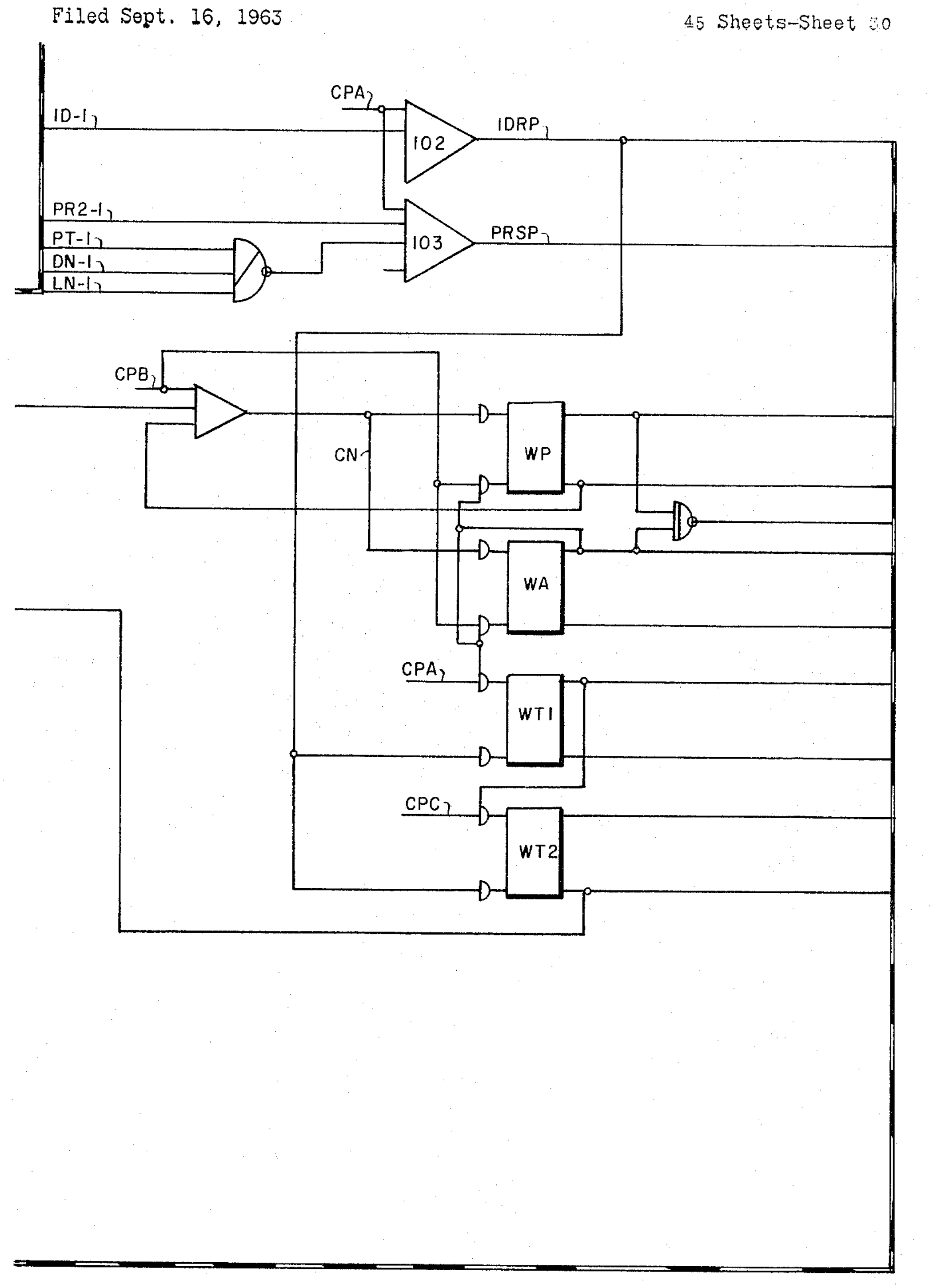
Figure 31:
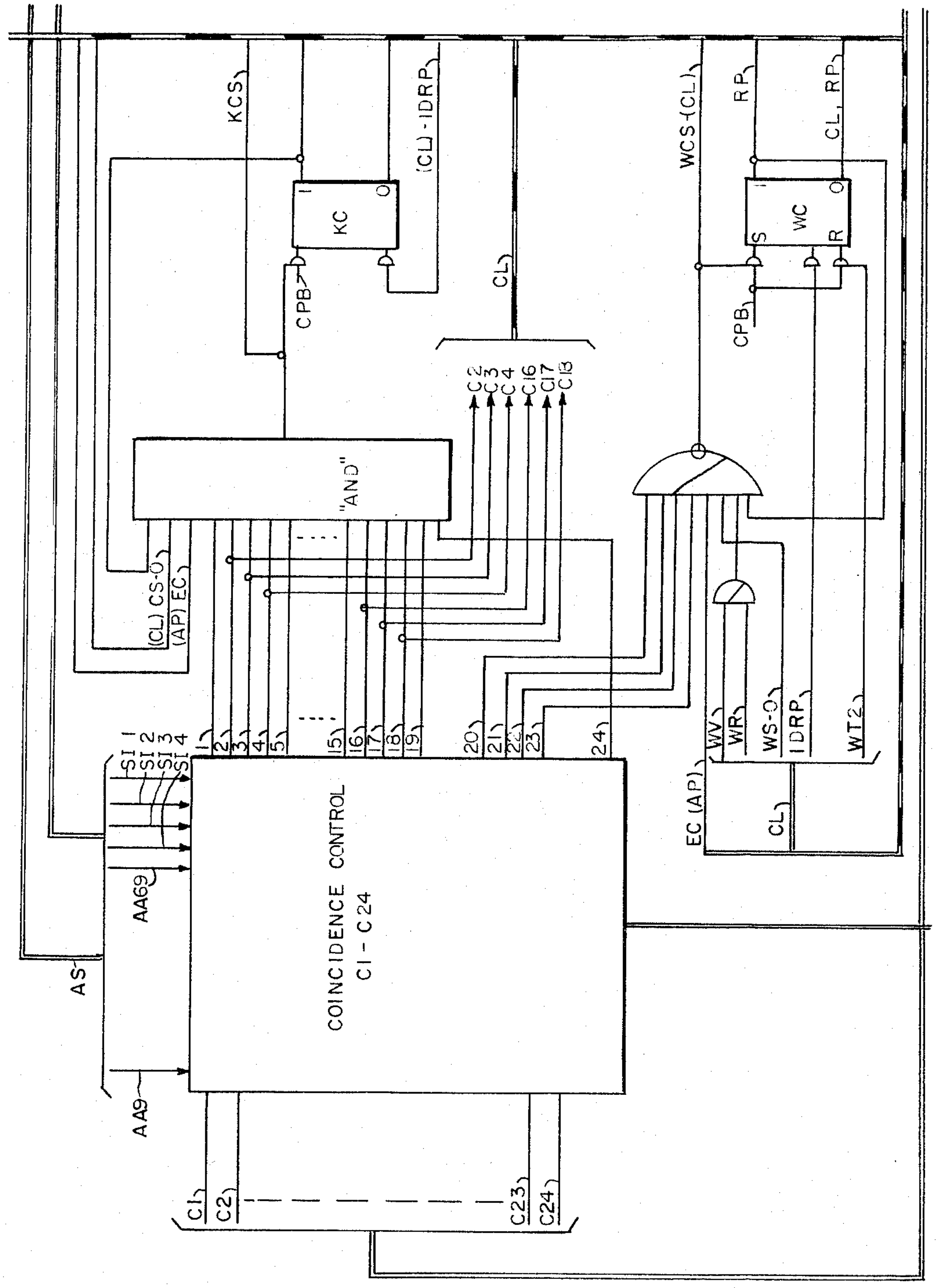
Figure 32:
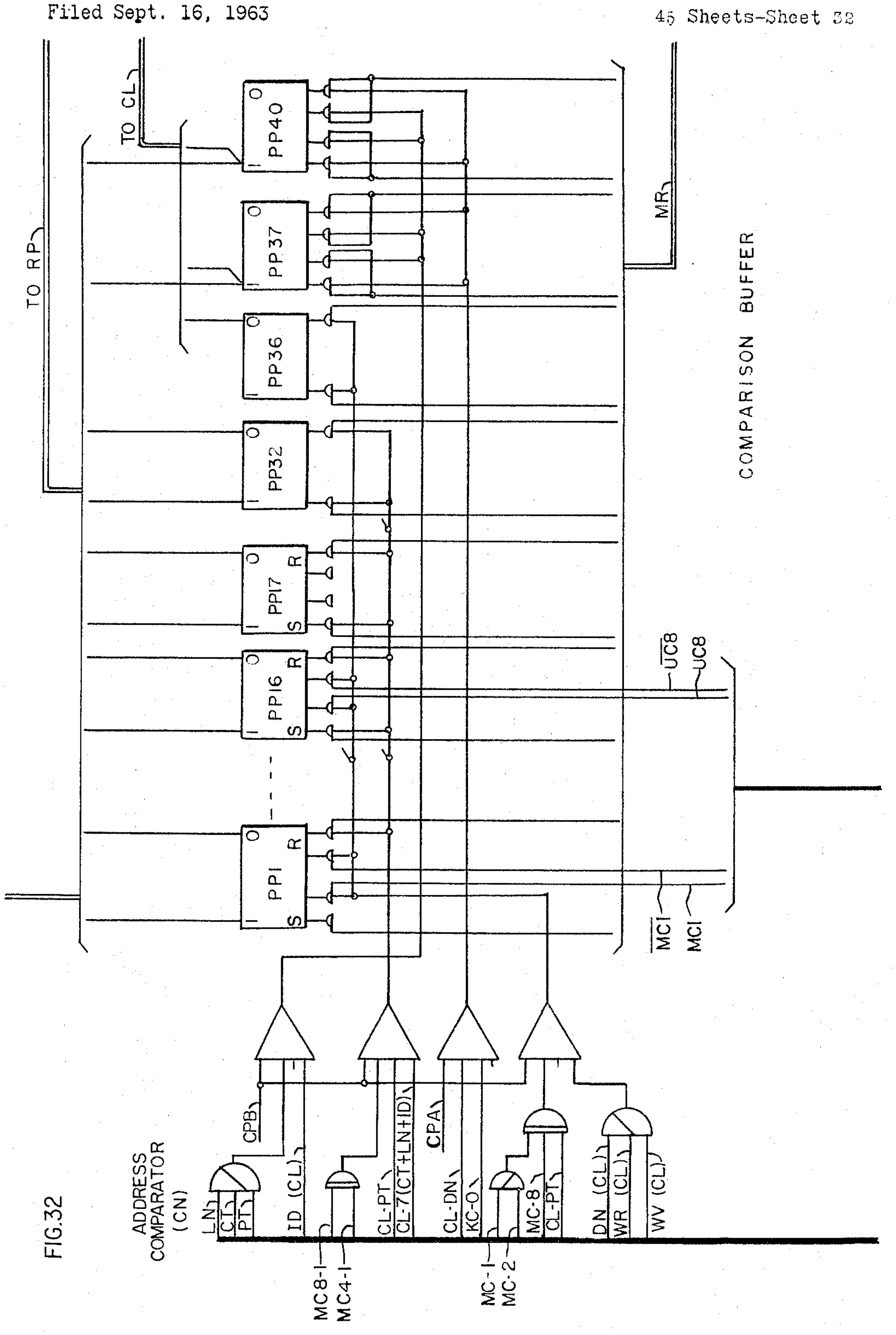
Figure 35:
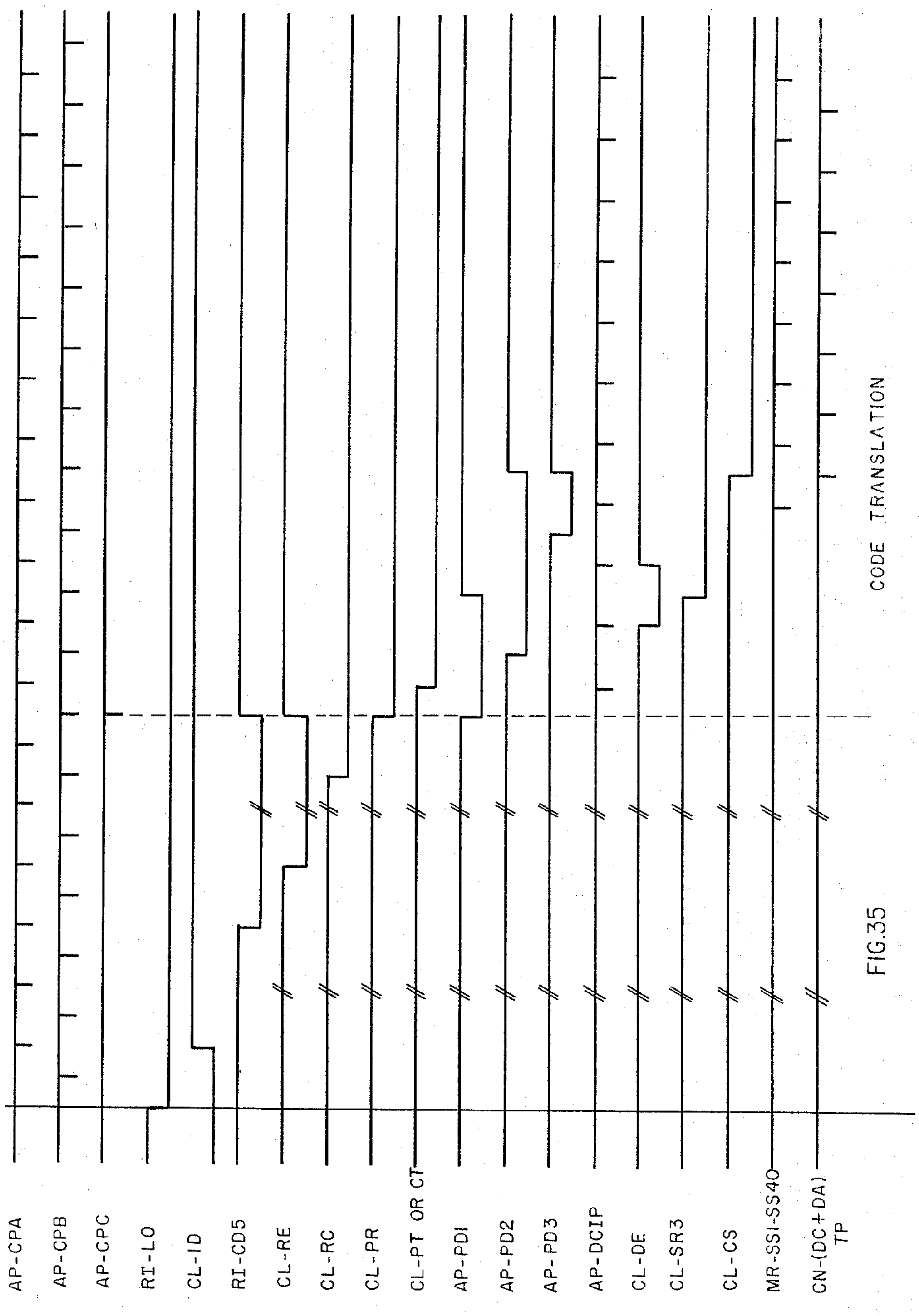
Figures 36A, 36B:
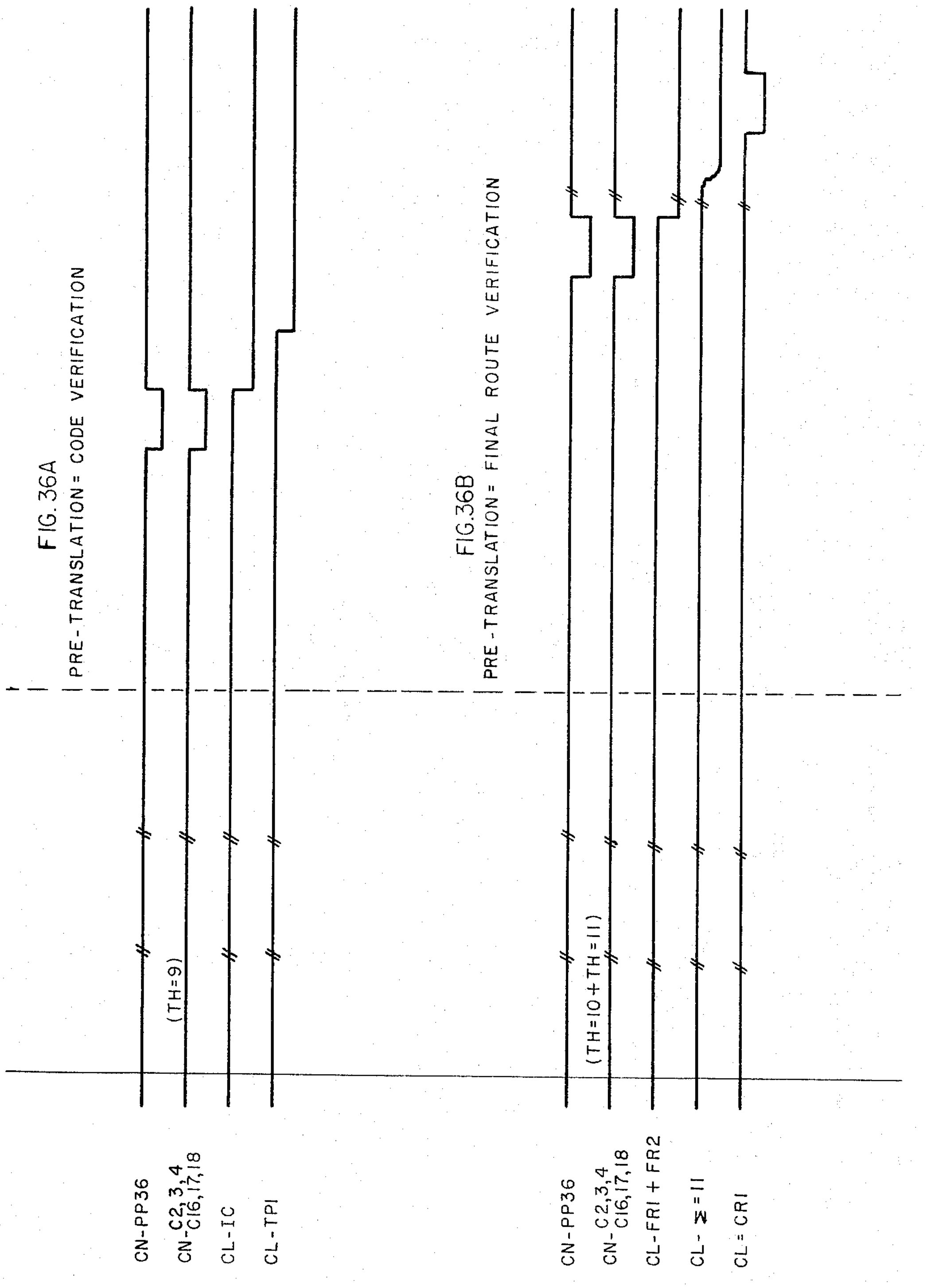
Figures 37A, 37B:
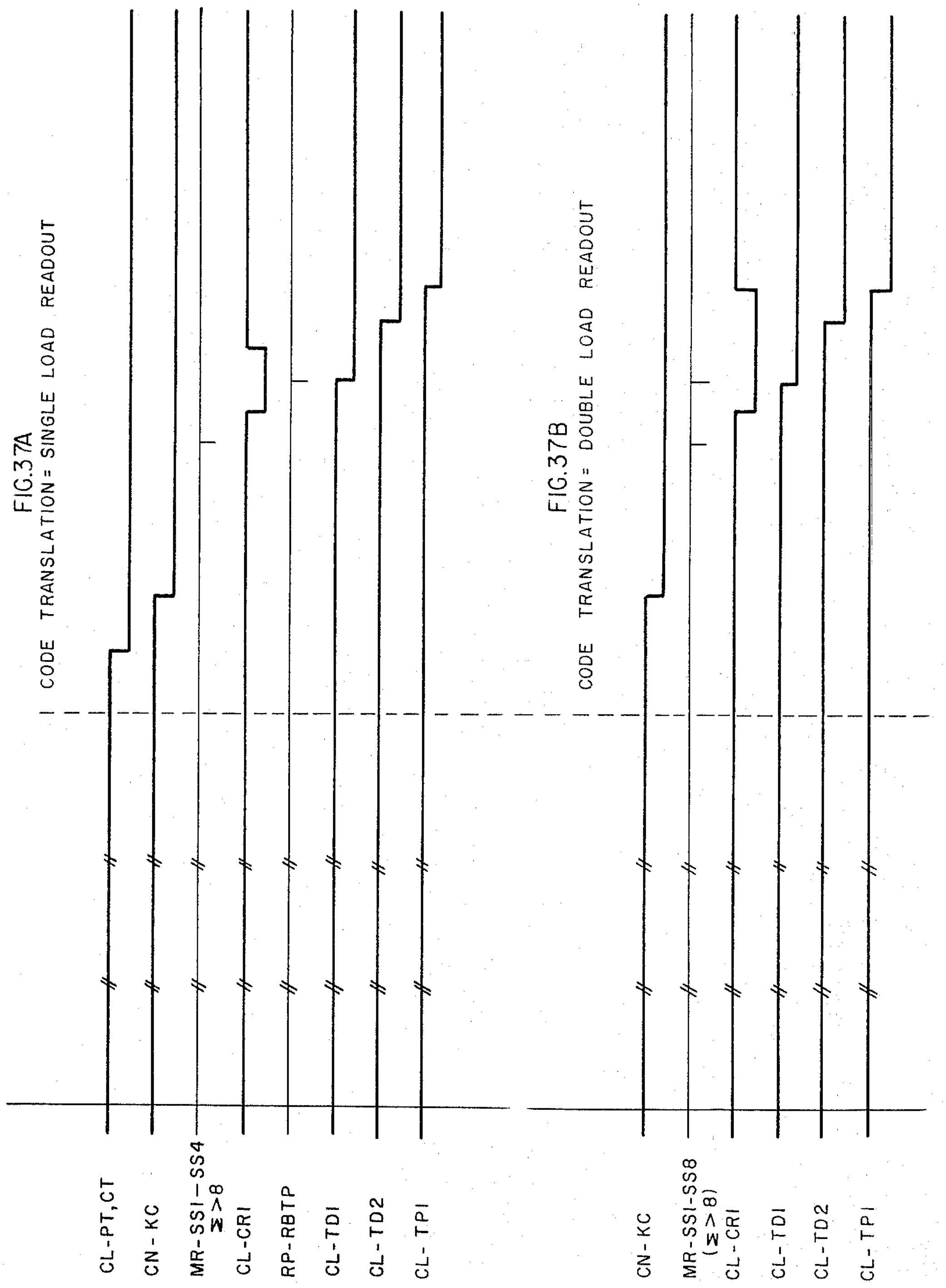
Figure 38:
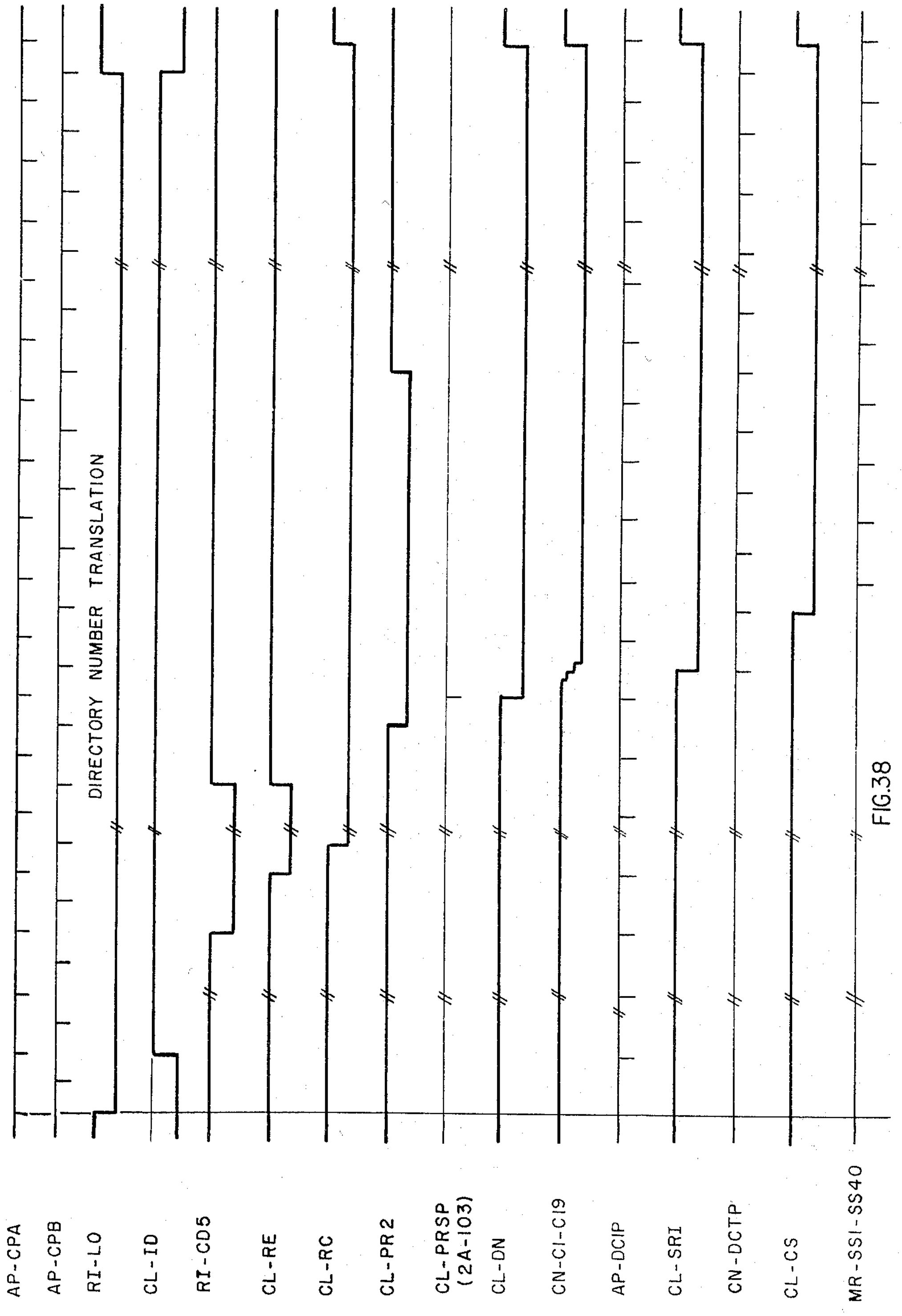
Figure 39:
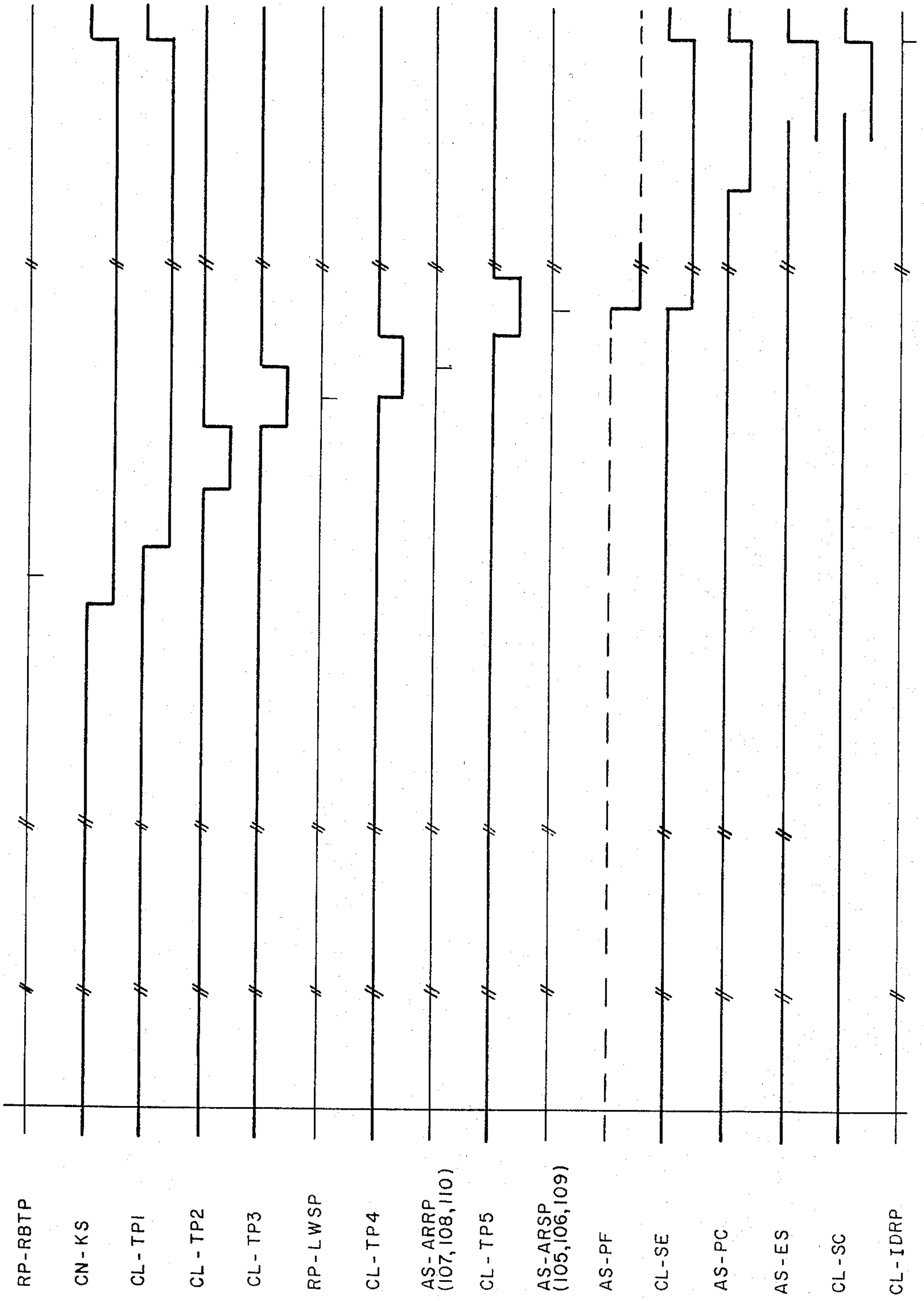

FIGS. 38 and 39 comprise a table showing the operational timing for a directory number translation.

Figure 40:
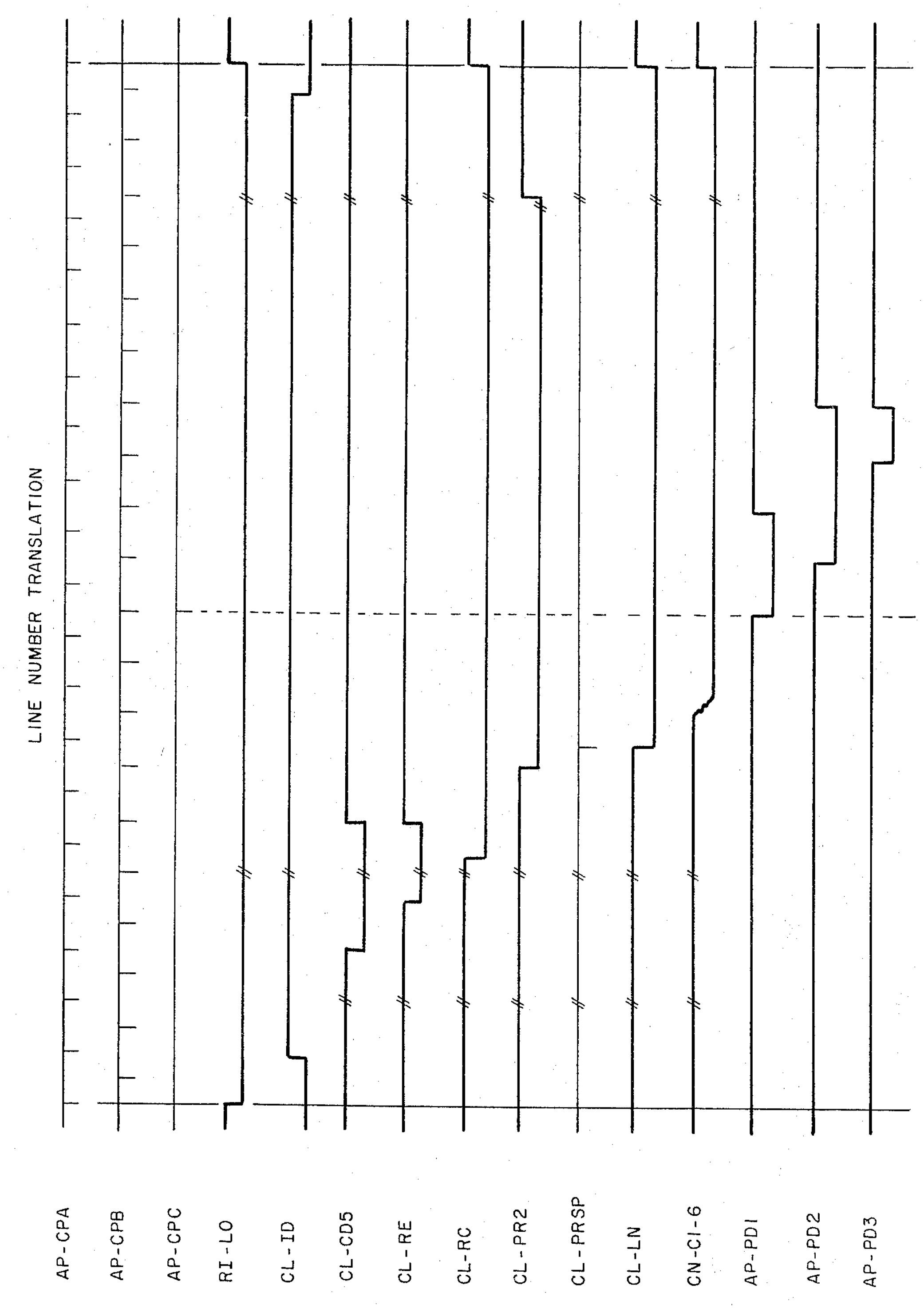
Figure 41:
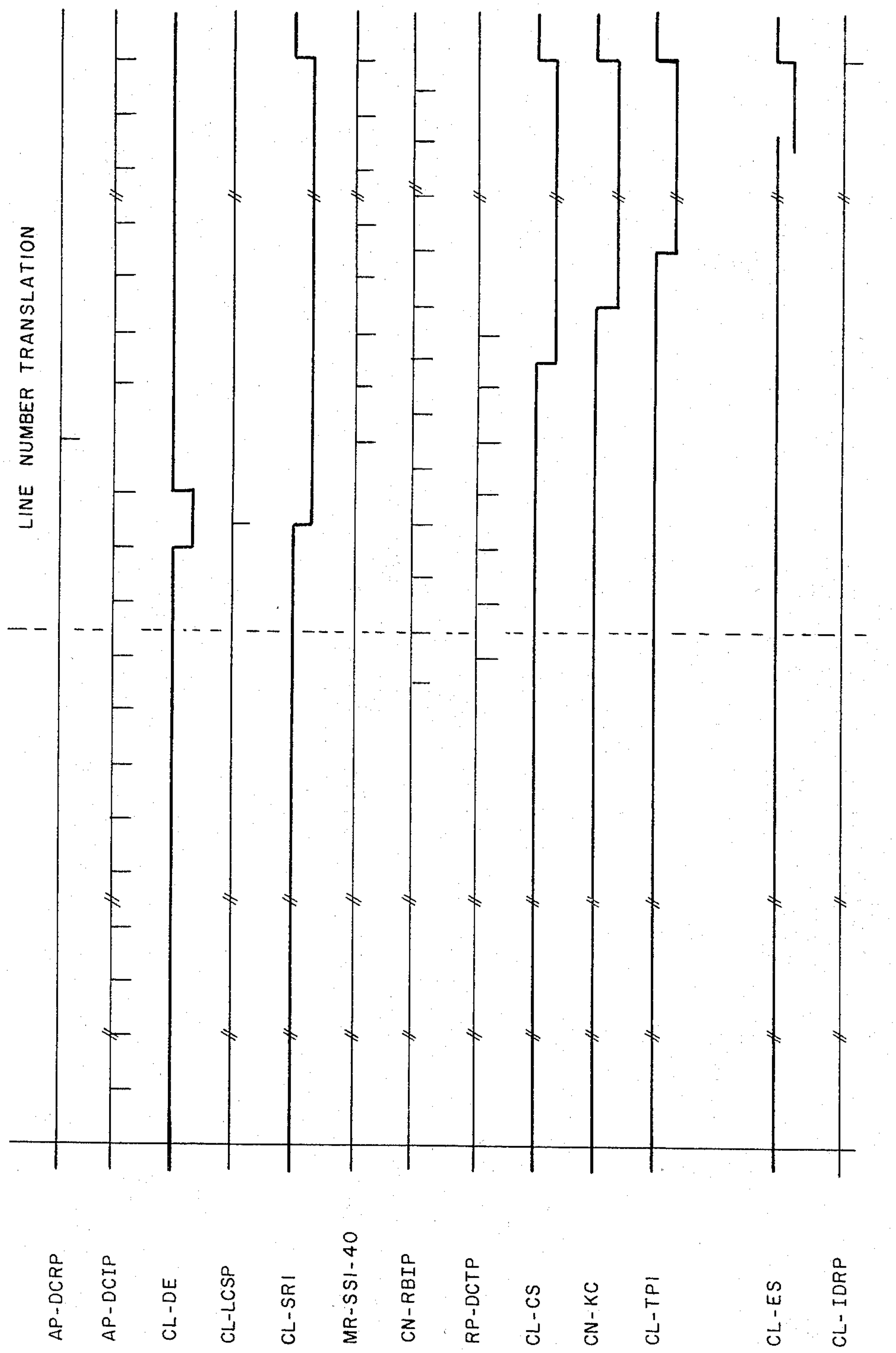

FIGS. 40 and 41 comprise a table showing the operational timing for a line number translation.

Figure 42:
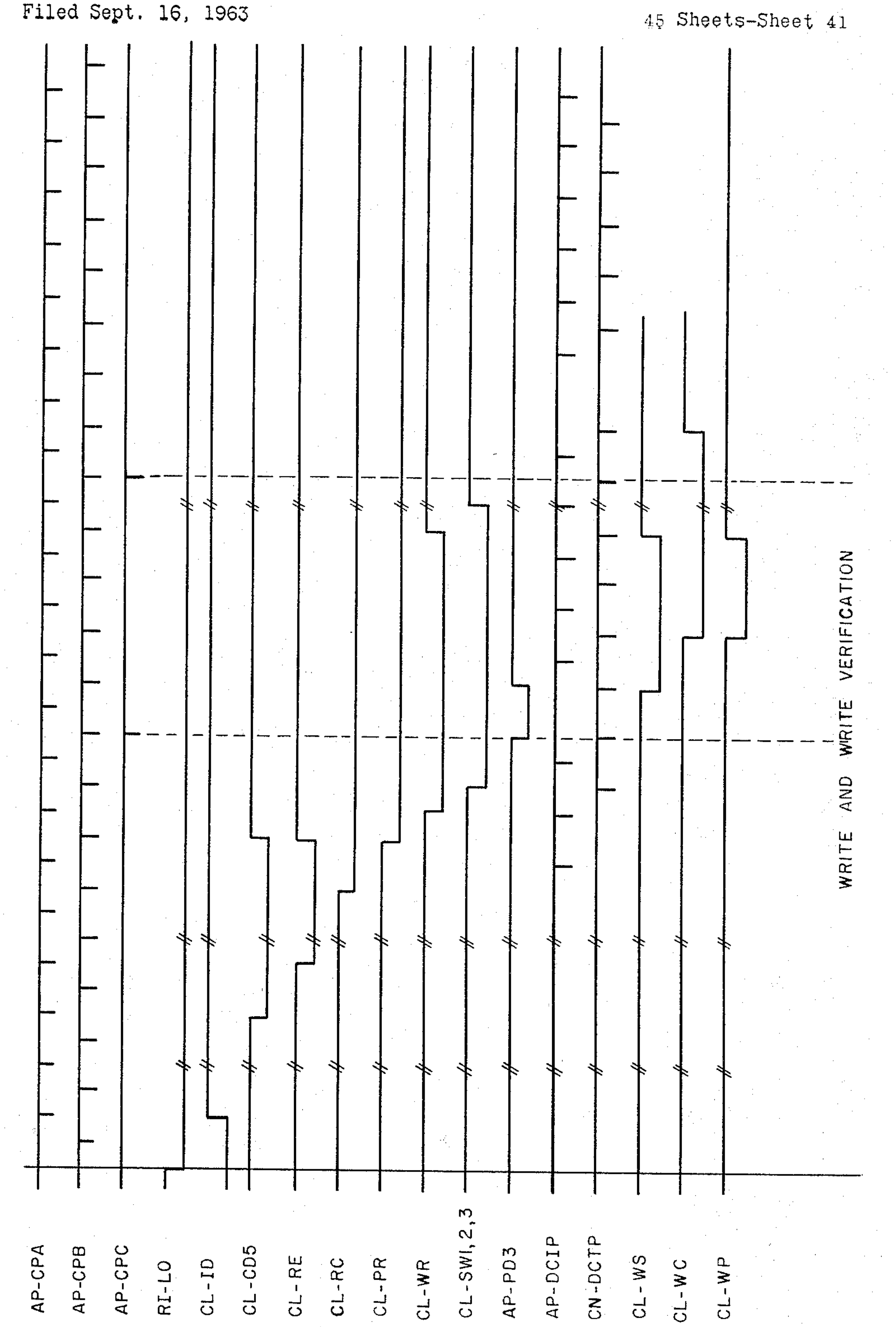
Figure 43:
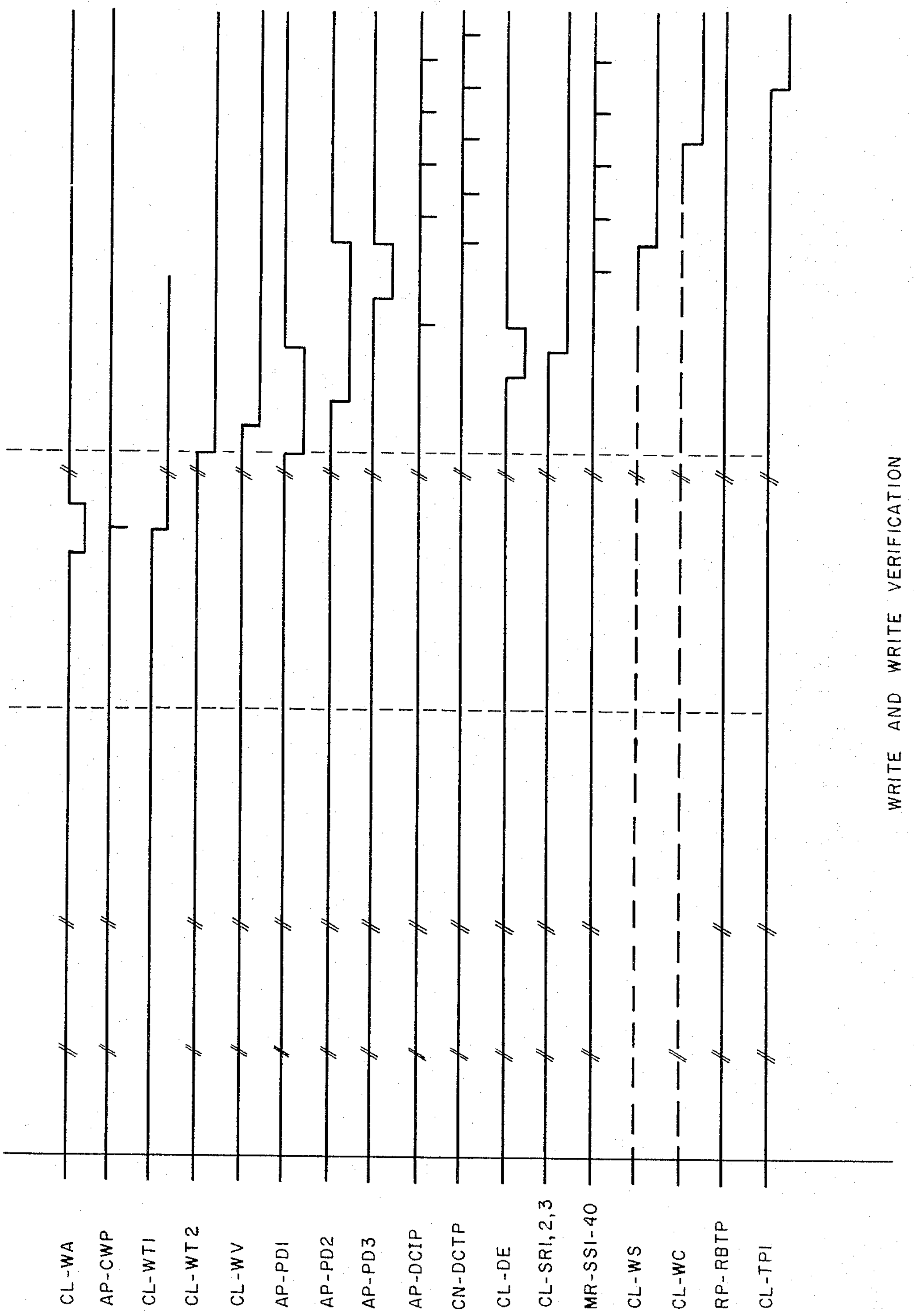

FIGS. 42 and 43 comprise a table showing the operational timing for a write and write transfer operation.

Figure 44:
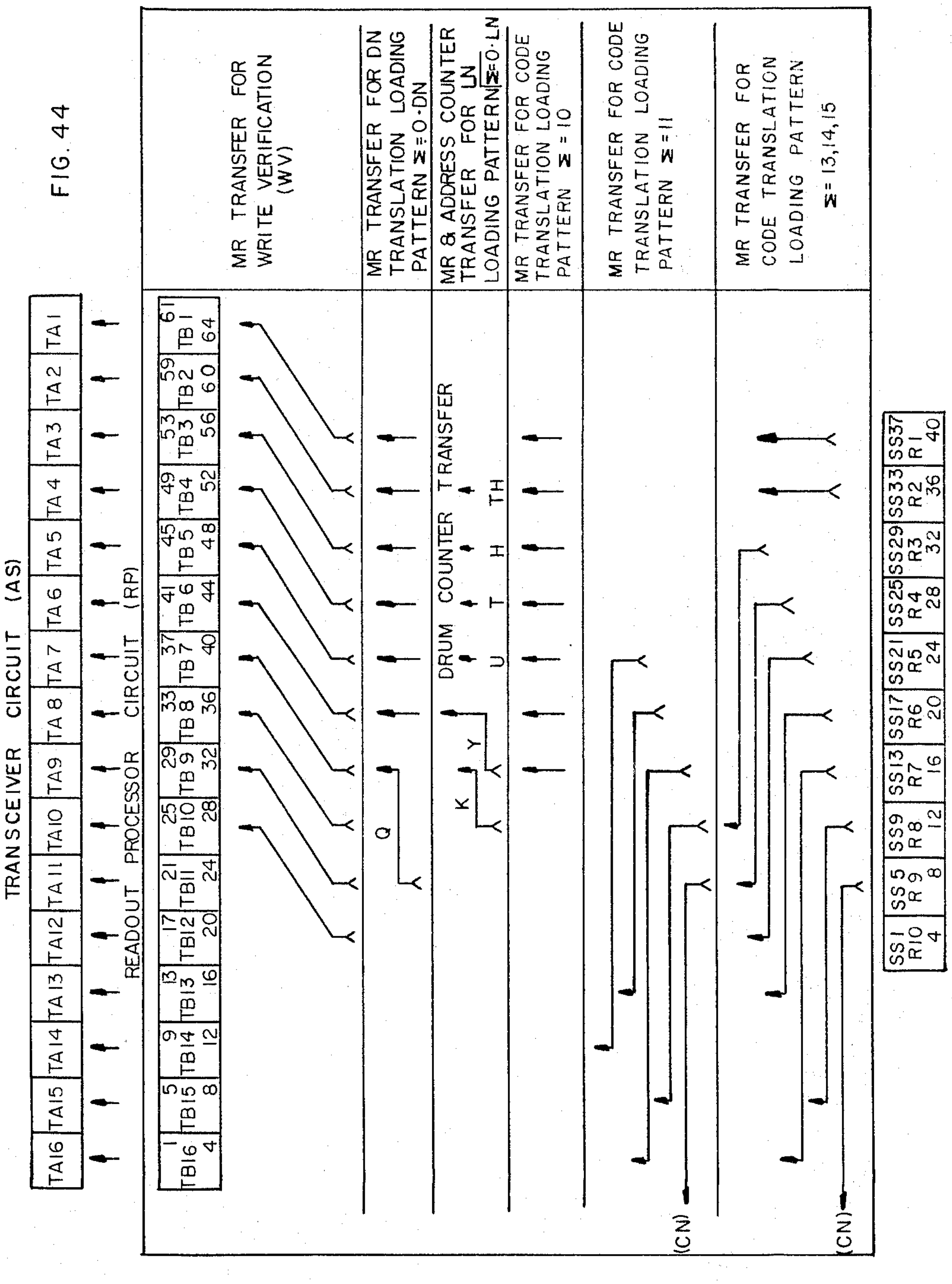

FIG. 44 is a chart showing the information loading patterns into and out of the readout processor (RP).

Figure 45:
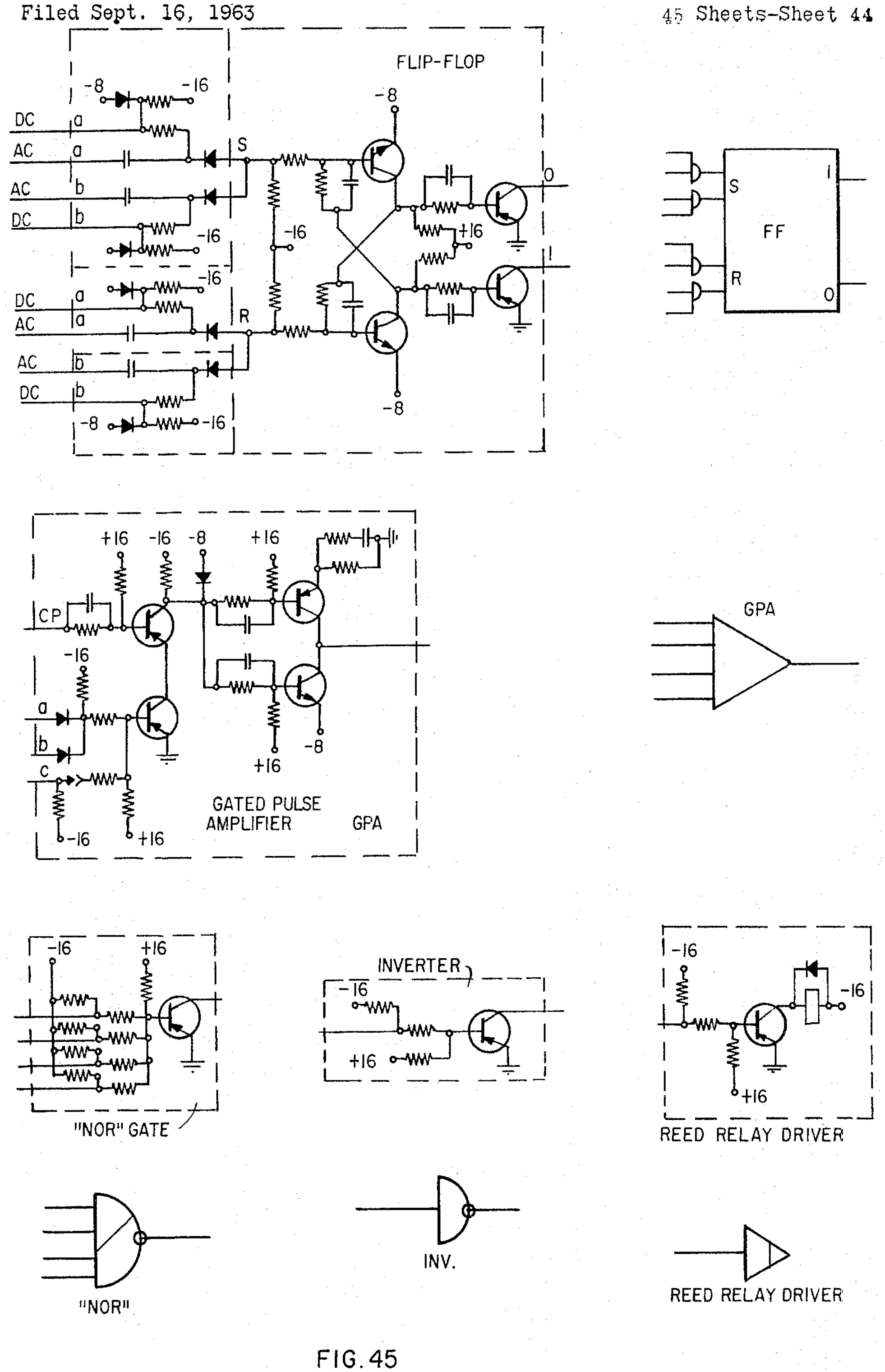

FIG. 45 discloses the circuit details of the main building block circuits.

FIG. 46 illustrates how FIGS. 1A and 1 to 8 should be combined.

FIG. 47 illustrates how FIGS. 10 through 32 should be combined.

FIG. 48 illustrates how FIGS. 35 through 37B should be combined.

FIG. 49 illustrates how FIGS. 38 and 39 should be combined.

FIG. 50 illustrates how FIGS. 40 and 41 should be combined.

FIG. 51 illustrates how FIGS. 42 and 43 should be combined.

GENERAL SYSTEM DESCRIPTION

*Components*

In various parts of the system flip-flops are used as registers. Each of these flip-flops includes two transistors in a bistable circuit configuration. Each flip-flop has eight input terminals and two output terminals. To set a flip-flop to state one, producing a true indication, requires coincidence of a signal on the D.C. input and a trigger pulse on the A.C. input; and in like manner to reset it to state zero, indicating a false condition, requires coincidence of a D.C. input and an A.C. input.

Gated pulse amplifiers are transistor circuits having a direct-coupled gating input terminal and a capacitively-coupled trigger-pulse input terminal. When the two inputs coincide, an output pulse is produced. A typical circuit is shown by R. K. Richards in "Digital Computer Components and Circuits" (D. Van Nostrand Company, Inc., 1957), at page 176.

The logical circuits use NOR gates, each of which is a one-transistor logical element whose output is an AND function of the negations of its inputs. The inputs are coupled through individual resistors to the base electrode, and the output is taken from the collector electrode. A NOR gate having all of its inputs false produces a true output signal and if any one of the inputs is true, the output is false. Throughout this system a true signal condition is indicated by a negative potential, and a false condition by ground.

Typical ones of these circuit elements are illustrated in FIG. 45.

A shift-register is another circuit element which is represented in simplified form and consists of a plurality of flip-flops connected in series.

*Logic*

The logic circuitry is direct-coupled (DC), that is, signals are represented by steady-state voltages. Two levels are employed. The first level is usually —5 volts, although other negative voltages are used in a few places, and represents the binary 1, true, on or active condition. The second level, ground potential, represents the binary 0, false, off or inactive condition. Flip-flops are used as registers with double-rail output signals to drive the logic circuits. A double-rail output is one in which both the logical 1 and 0 conditions are represented by active signals on separate leads. Only one of the two leads, however, has an active signal at any time. Logic circuits are included in each unit for controlling the setting of the flip-flops, which may be set 1 or set 0. "Set" when used alone means "set 1," and "reset" is synonymous with "set 0." These logic circuits may comprise diode type AND and OR gates.

In describing the logical operations performed by the circuits, Boolean algebra equations are used. In this notation the addition symbol signifies OR, the multiplication symbol, expressed or implied, signifies AND, and overlining signifies the inverted condition.

SYSTEM ORGANIZATION

Referring to FIGS. 1A, 1–8, the system consists of the line group 100, group selector 300, register-sender group 600, and the translator 700. There is also a trunk group 500 which provides access from incoming trunks to the registers, and a control center 800 which contains a special computer for operation analysis and recording, and program upgrading equipment.

All of the electronic equipment is furnished in duplicate, for instance, two line group markers 200 may serve up to ten line groups and two group selector markers 400 may serve up to ten group selectors. A minimum of two register-sender groups 600 will be equipped per office and the translator 700, including the magnetic drum 730 and logic circuitry, will always be furnished in pairs per ten thousand directory numbers.

Time division techniques are used in the register-sender group 600 and in the translator 700. The markers are designed on an electronic basis and semi-conductor circuitry is employed throughout the system. A ferrite core memory 660 is used for temporary storage whereas the magnetic drum 730 is used for semi-permanent storage.

The space division switching elements of the system consists of reed relay matrix assemblies.

*Control center*

The control center 800 is designed for the purpose of introducing automation into the maintenance administration of the switchboard. The control console has direct access to all of the stored system program which is written on the magnetic drum. By means of an electric typewriter, this program may be changed by the maintenance personnel to accomplish quickly, for example, subscriber moves, re-routing of calls to intercept, transfer of a call to another line, absent subscriber service, toll restriction, line busy recording, etc. This method of operation has eliminated the need for an IDF and the labor of changing jumper wires.

The electric typewriter contains a tape punch as well as printer and thus provides a copy of the information written onto the magnetic drum.

*Line group matrix*

This section of the system may be thought of as a large switching unit capable of connecting any one of 1000 lines originating calls to any one of 120 circuits called originating junctors 120. Likewise, this unit is capable of connecting any one of 120 circuits called terminating junctors 130 and representing incoming calls to any one of the 1000 lines served by this line group. Crosspoint matrices constitute the switching network and provide concentration going outward for originating calls, and expansion going inward for terminating calls. For practical and economic reasons, three stages, A, B, and C, make up the outgoing switching stages. Four stages, E, D, B and A, make up the incoming switching stages. The 1000 subscribers lines divided into ten groups of 100 each, are located on the main distributing frame and from there are jumpered directly to the A stage 112. No intermediate distributing frame is required. The A stage has 600 outlets or links (60 for each of the ten "hundreds" group) appearing as inlets to the B stage 114. The B stage, in turn, has 300 links (30 for each "hundreds" group) appearing as inlets to the C stage 116. The C stage has 120 links to originating junctors 120. The originating junctors provide by-paths via the "R" stage to twenty-four registers and also provide access to the inlet circuits 310 of the group selector 300. With this switching configuration, a fully equipped line group is capable of handling a maximum traffic of three unit calls per line in each direction at a grade of service better than .01.

The switching stage matrices are made up of crosspoint reed relays, 15,000 for a fully equipped 1000 line group or 15 per line (12 per line for two unit calls per line). The reed relay coil has two windings, an operate (or pull) winding and a hold winding, and has three contacts. Two of the contacts switch the transmission loop. A thrid locks the hold winding to the sleeve of "C" lead.

The subscriber's line equipment is similar to a conventional line and cut-off circuit except that reed relays are used and fewer contacts are required. Reed relays were chosen over a static line circuit for simplicity and reliability of operation and for electrical isolation of electronic apparatus from outside plant disturbances.

A maximum of thirty subscribers in a given hundreds group may be engaged in different conversations at one time. One originating and one terminating junctor, two each of A and B crosspoint reed relays, and one each of D, C, and E crosspoint reed relays are held in the line group per conversation. Registers are held only during dialing.

The originating and terminating junctors mentioned earlier are reed relay circuits performing several functions. The originating junctor provides loop splitting facilities for an originating call. Initially, a transmission path is provided from the calling line to register and an additional path is provided from register to group selector for early outpulsing. When the called line is reached, the originating junctor switches the calling line through to the terminating junctor via the group selector. The circuit also provides a busy tone bridge in the event of no link availability.

The terminating junctor performs functions necessary to extend the call to a called subscriber. It provides a path into the line group marker for signaling between the code receiver in the marker and the sender circuit. The circuit provides regular or party line ringing controls, ring back tone, and ring cut-off controls. When line busy is encountered busy tone is provided at this point. It provides transmission battery feed for both called and calling parties. On tests calls and busy verification calls, the junctor removes the battery feeds and switches the calling line metalically through to the called line. For official calls, answer supervision is disabled within the junctor to prevent charging of the calling end. Thus, it is seen that special service calls are also handled by the terminating junctor via the regular switching network eliminating the need for a special switch train.

*Line group marker*

Two markers 200 are always provided and the 1000 line groups are divided between the two up to a maximum of five line groups per marker. Each marker serves its associated line group matrices on an allotted basis, but, is also capable of assuming the load of its companion marker.

In its idle state, a marker continuously scans for requests for service from the line groups with which it is associated. Upon recognizing a call, either originating or terminating, in a particular line group, it locks out all other groups via its allotter and allows the connect circuitry of the selected group to switch in the matrix leads into the marker for processing. Approximately 400 leads are so controlled. All calls in the allotted line group are processed before the marker returns to its idle state to serve other groups.

When connected to a line group, the marker has two primary functions, connect a line originating a call through the matrices and originating junctor to a register and to connect a terminating junctor (representing an incoming call) through the matrices to the called line. Both reed relays and electronic circuitry are used to perform these jobs. The electronic circuitry provides all logic and scanning operations requiring high speed. Reed relays are used merely for connecting purposes, to switch in the necessary groups of leads into the electronic circuitry for analysis. With this combination of components, the processing of a request for service by the line group marker is accomplished in approximately 100 milliseconds.

For each function, the marker performs several tasks. In general, for originating traffic, it must provide line number identification, pathfinding and route selection, sending of line number identification, class of service (225), and line group identity. For terminating traffic, it must provide terminating junctor identification, transceiver for communicating with the sender circuit, access to called line for busy test, PBX selection, and pathfinding and route selection.

The tasks performed by the marker in processing a call are controlled by a sequence and supervisory circuit 290. This control may be compared to a programmed computer in that the marker follows a fixed plan of operation. All marker operations are governed by this control.

Included is the clock circuit which provides pulses to synchronize operations within the marker and the timing circuitry which is used to generate various time-out periods such as that provided between a reed relay operation and a succeeding electronic scanning operation. Once the supervisory control recognizes a request for service, either terminating or originating, it will process this call from beginning to end, locking out all other calls.

*Group selector matrix*

The intermediate switching functions of the system are performed by a group selector 300. Three stages of crosspoint switches are provided. The first switching stage 312, the A stage, contains 60 cards of 50 crosspoints, each arranged in a 5 x 10 matrix. This switching matrix is associated with the inlet circuit 310 line and cut-off reed relays to the group selector. The second switching stage 314, the B stage, contains 60 cards of 60 crosspoints each in a 10 x 6 matrix. The third stage 316, the C stage, uses a basic arrangement of 60 crosspoints in a 6 x 10 matrix to provide 600 outlets. In addition, a second group 317 of 60 switches may be added to expand the outlet capability of 1200 in case of a very large central office. The group selector has 300 inlets 310 serving the originating junctors in the line groups and incoming trunks.

The outlets of the group selector are arranged as 120 levels of 10 trunks each. These levels may be combined to accommodate trunk groups of any size.

*Group selector marker*

The operation of the group selector is controlled by an electronic marker. The marker has control of all crosspoints in the group selector and sets up calls on a one-at-a-time basis. The marker operates in response to selection digits received electronically in its transceiver from the register-sender group. The holding time of the marker is approximately 100 milliseconds.

Because of the common control nature of the marker, and its high speed, it is possible to provide switching features that would otherwise require a large investment in the form of additional switching stages.

Alternate route selection is performed by the group selector marker. In selecting an alternate route, the marker will identify this trunk group as one that requires a change in the digits to be outpulsed or a change in the type of outpulsing, multi-frequency or dial pulse. In this case, the marker will send back instruction regarding digit changes or a command for the sender to change the type of pulsing. If no change is required, the marker can switch the call through to an alternate trunk without changing the sender's instructions.

Insertion junctors 330, shown on the system block diagram at the outlet of the group selector, are used for add-on conference calls, coin-box completing, PPCS, annoyance calls, etc. These junctors may be inserted into connections on command from the program written on the magnetic drum.

The group selector marker is equipped to identify ticketing trunks and relay this identity to the register-sender group. This permits ticketer storage functions to be placed on the magnetic drum eliminating the need for storage facilities in the ticketing trunk.

*Trunk group matrix*

The trunk group 500 provides access for incoming trunks from the outside of the office or for special intraoffice trunks such as operator or wire chief. A trunk group matrix is capable of connecting any one of 75 incoming trunks to any one of sixteen registers on a single output level basis. All trunks in the same group of 75 are either dial pulse (DP) or multi-frequency (MF). Trunk group matrices are added as required to handle large numbers of incoming trunks. Each matrix is independently controlled but outlets are graded to provide sharing of registers.

The trunk group matrix is comparable to the R stage of the line group matrix. The incoming trunk is equipped with loop splitting facilities, and access is provided from a trunk to a register and an additional path is provided from the register-sender to an inlet circuit of the group selector. When the call has reached its destination, the incoming trunk switches through to the established path and the crosspoints of the trunk group matrix associated with this call are released by the register-sender.

The matrix consists of a two stage network of crosspoint switches. The incoming trunks, divided into five groups of fifteen trunks each, appear as inlets to the first stage, the A stage. The A stage has twenty outlets or links (four for each of the five groups) appearing as inlets to the B stage. The B stage has sixteen links to registers. Both stages use a basic arrangement of twenty crosspoint switches in a 4 x 5 matrix unit. Three units are wired together to give the 4 x 15 matrix unit used in the A stage, while four single units make up the B stage.

*Trunk group marker*

The operation of the trunk group matrix is controlled by an electronic marker 550 which has control of all reed relays and sets up connections on a one-at-a-time basis. The marker operates in response to a call for service from a trunk group and sets up a path based on information concerning the condition of a register junctor (busy or idle) and the condition of any link (busy or idle). The holding time of the marker is approximately 50 milliseconds which is well within the interdigital switching time of any direct controlled system.

*The register-sender*

The register-sender group 600 is a time shared, common control unit with the ability to register and process twenty-four simultaneous calls. The fully equipped unit consists of twenty-four registers and ten senders.

The registers operate in a time division mode. There is one register junctor for every register in the group. Real time to time division entry is provided by this circuit. A common control unit comprises time divided circuits which are shared by all twenty-four registers. These circuits are used by each register in turn and are organized to provide the needed registration and process control for the registers. A temporary storage facility is provided for the register group. Each register has an assigned storage area wherein all register information is placed to allow time division operation by the common control. A folded word oriented ferrite core memory is used for this purpose.

The extension of the proper switching digits, to the line or trunk selection stages of the system and to other connecting exchanges, is accomplished with a group of ten senders. These senders operate under the control of the registers and are used to transmit information in a dial pulse, multi-frequency, or code pulse manner.

Communication with the system translators, line group markers, trunk markers, and group selector markers is accomplished by high speed serial transfer of digital information using di-phase.

*The translator*

The translators 700 of the system provide semipermanent storage used by the system to direct the extension of telephone calls in accordance with the subscriber dialed digits.

A pair of translators are provided for each 10,000 directory numbers served by the office. Each translator of the pair shares the traffic load. One of the pair may be taken out of operation for maintenance and all traffic switched to the other without degrading the grade of service. Expansion capability up to 60,000 directory numbers is provided for the office.

Each translator can be accessed from twenty register-sender groups and a supervisory console on a one-at-a-time basis. Four basic types of translations are processed.

(1) Directory Number Translations (DNT)

The directory number of the called party is translated into switching instructions to enable the register-sender to direct the routing of the call to its destination. The switching instructions contain the equipment location of the called telephone line and the party ringing instructions.

(2) Line Number Translation (LNT)

The calling party's line identification is translated into the calling party's directory number. The line number translations provide automatic number identification (ANI) for all one and two party lines.

(3) Code Translations

The called area, office, or special service code is translated into switching instructions. The translation capabilities required of control switching point (CSP) in the direct distance dialing (DDD) network are provided.

(4) Special Feature

Special switching instructions are generated to provide such features as home extension intercom, repertory dialing, automatic call transfer, and other special features.

Information storage is provided by magnetic drums on the basis of one drum per translator. Memory words are recorded on the drum surface from a supervisory console, by simply typing the memory word and appropriate memory address at the console typewriter. This directory number and/or code translation can be added or existing translations altered with a minimum of maintenance effort.

Each drum provides 600,000 bits of information storage. Information is represented in digital form using a four bit binary coding. The magnetic drum is 10 inches in diameter and provided with 150 tracks. Each track stores 4000 bits with a packing density of approximately 130 bits per inch. The drum rotates at 1800 r.p.m. and provides an average access time of approximately 16 milliseconds. The basic time interval of 8.1 microsecond for the system logic is derived from recorded clock tracks. The recording technique employed is return-to-zero (RZ). Reading and writing functions are performed by one fixed read and write head per track. Adjustable register heads are provided for the clock tracks.

Memory words are recorded in parallel along the axis of the drum. Each memory word consists of 40 bits, thus occupying one bit in each of 40 tracks. Three segments along the drum axis with each segment made up of 40 tracks provide storage for 12,000 memory words. The memory words are addressed consecutively around the drum circumference with the first 4000 addresses located in segment one as shown in Table I, the second 4000 addresses in segment two, and the third 4000 addresses in segment three.

The drum access circuitry, consisting of read and write amplifiers, all transistorized, are mounted on printed circuit cards in close proximity to the magnetic heads. All logic operations are accomplished through the use of transistorized standard circuits, with a small number of special circuits for pulse generation, shaping, distribution, and buffering.

TABLE I.—DRUM HEADS

| | 1 | 4 | 8 | 12 | 16 | 20 | 24 | 28 | 32 | 36 | 40 |
|---|---|---|---|---|---|---|---|---|---|---|---|
| Area and Office Code | Σ=6 | — | — | — | $N_0$ | $A_2$ | $A_1$ | X″ | X′ | $A_1$ | 1000 |
| | ″ | — | — | — | $N'_0$ | $A'_2$ | $A'_1$ | $X''_1$ | $X'_1$ | $A'_1$ | |
| | ″ | — | — | — | ″ | ″ | ″ | ″ | ″ | ″ | |
| | =14 | W | — | IN | TL | MD | ES | SK | D | C | |
| | =6 | — | — | — | $N_0$ | $A_2$ | $A_1$ | X″ | X′ | A | |
| Double Readout | =10 | W | — | Q | P | U | T | H | D | C | |
| | =14 | | DE | IN | TL | MD | ED | SK | D | C | |
| | =5 | | | | K | Y | | N | I | I | |
| | =5 | — | N | I | K | Y | — | — | — | — | |
| | =5 | | — | — | K | Y | — | — | — | — | |
| | =1 | — | $D_2$ | $D_1$ | $P_L$ | $U_L$ | $T_L$ | $H_L$ | $D_L$ | $C_L$ | |
| | =10 | — | — | Q | P | U | T | H | D | C | 2000 |
| | =1 | — | $D_2$ | $D_L$ | $P_L$ | $U_L$ | $T_L$ | $H_L$ | $D_L$ | $C_L$ | |
| | =10 | — | — | Q | P | U | T | H | D | C | |

TABLE I—Continued

| | 1 | 4 | 8 | 12 | 16 | 20 | 24 | 28 | 32 | 36 | 40 |
|---|---|---|---|---|---|---|---|---|---|---|---|
| 3 Digit Codes | =3 | — | — | — | — | — | $N_0$ | $A_2$ | $A_1$ | — | |
| | ″ | — | — | — | — | — | $N'_0$ | $A'_2$ | $A'_1$ | — | |
| | ″ | — | — | — | — | — | $N''_0$ | $A''_2$ | $A''_1$ | — | |
| | ″ | — | — | — | — | — | ″ | ″ | ″ | — | |
| | =14 | W | DE | IN | TL | MD | ES | SK | D | C | |
| | =3 | — | — | — | — | — | N | A | A | — | 3000 |
| | ″ | — | — | — | — | — | N′ | A′ | A′ | — | |
| | ″ | — | — | — | — | — | N″ | A″ | A″ | — | |
| | ″ | — | — | — | — | — | ″ | ″ | ″ | — | |
| | =10 | W | — | Q | P | U | T | H | D | C | |
| | =14 | W | DE | IN | TL | MD | ES | SK | D | C | |
| Local Office Codes | Σ=3 | — | — | — | — | — | $N_0^H$ | $A_2^H$ | $A_1^H$ | — | |
| | =11 | W | DE | IN | TL | AD | — | — | — | — | |
| | =3 | — | — | — | — | — | $N_0^H$ | $A_2^H$ | $A_1^H$ | — | |
| | =11 | — | DE | IN | TL | AD | — | — | — | — | |
| Area Codes | =3 | — | — | — | — | — | $X''_1$ | $X'_1$ | $A''_1$ | — | |
| | ″ | — | — | — | — | — | $X''_4$ | $X'_2$ | $A_2$ | — | |
| | ″ | — | — | — | — | — | $X''_3$ | $X'_3$ | $A_3$ | — | |
| | ″ | — | — | — | — | — | — | ″ | ″ | ″ | |
| | =11 | — | DE | IN | TL | AD | — | — | — | — | |
| Lost Digits | =2 | — | | | K | Y | — | — | — | $A_2$ | |
| | =14 | W | DE | IN | TL | MD | ES | SK | D | C | |
| | =2 | — | | | K | Y | — | — | — | $N_0$ | |
| | =10 | W | — | Q | P | U | T | H | D | C | |
| | =14 | | DE | IN | TL | MD | ES | SK | D | C | |
| Line Numbers | =0 | Q | K | Y | P | U | T | H | D | C | |
| | =0 | Q | K | Y | P | U | T | H | D | C | 4999 |

SENDER TRANSMITTER, RECEIVE CIRCUITS, AND REGISTER JUNCTOR

The senders are universal, in that they provide all modes of sending required by the system. For intra-office signaling a high-speed code sending technique is used, while for sending to an outlying office the senders provide for either dial pulse or multi-frequency signaling, as required by that office. Sending modes may be changed while in the process of routing an individual call.

A "resend" feature is provided to improve the grade of service by allowing a second attempt to complete a call over a different route, if the route first chosen runs into link blockage. It is also used where faulty operation was caused by an intermittent failure (for example, spurious pulses due to noise "spikes" on the intra-office transmission lines).

When required, the calling as well as the called number can be outpulsed. The calling number may be sent in any of the three outpulsing modes (dial pulse, multi-frequency, code pulse).

The sender is divided into the following functional parts: loop and switch train supervisory unit, di-phase sending controller, and the multi-frequency and dial pulse controller.

The loop and switch train supervisory unit employs reed relays and is intended primarily for isolation of the electronic equipment from the switch trains and outside plant facilities. The specific functions of these circuits are:

(1) Signaling between the sender and the register junctor (seizure, holding, release, reorder, and end-of-send signals).

(2) Trunk supervision.

(3) Sender alarm and traffic metering facilities.

The switching digits sent from the sender to the markers are supplied, two digits at a time, by the common control, on request of the sender. The markers return one of the following instructions, and the sender responds accordingly:

(1) Clear—this instruction causes this circuit to return to the initial "receive" state, to await the "connect" information from the succeeding marker.

(2) Reorder (trunk busy) line busy and line idle—these instructions result in 120 IPM busy, 60 IPM busy, and switch through, respectively. They indicate to the sender that its functions on this call are complete. The instructions are repeated by the sender to the register junctor, which in turn signals the sender to release from the call.

(3) Incomplete—this instruction is sent by the line group marker, and indicates that additional digits are required by the marker to process the call. The circuit clears the transceiver, loads the succeeding two digits, sends the digits to the marker, returns to the receive state, and awaits further instructions from the marker.

(4) Resend—this instruction allows a second attempt to establish the connection, over a different route to the called destination, if the first attempt fails because the links are blocked. The main purpose of this feature is to improve the grade of service.

(5) Trunk identity—this information identifies a point in the switch train where the call may be monitored for answer and disconnect supervision. This number is stored in the register-sender group, and if the call required billing, the number is transferred, along with the calling and called numbers, to the ticketing equipment for call-progress monitoring and time recording.

(6) Alternate route—consists mainly of instructions for the addition or deletion of digits to or from the called number, as determined by the route chosen by the marker. The sender does not analyze these values—it simply recognizes the presence of each digit. After the digits have been recognized and stored by the common equipment, the transceiver goes back to the initial "receive" state.

TRANSLATIONS WITH THE MAGNETIC DRUM

*Method of translator operations*

The function of the translator is to provide the register-sender group with the information and instructions required in handling any request for service. Communication between the register-sender group and the translator consists of high speed serial data transmission and direct signalling used in accessing the translator. One translator is capable of rendering service to 20 register-sender groups; however, only one group can be handled at a time. Besides the 20 register-sender groups, the translator may be accessed by the control console which is used to program and record the permanent memory and perform testing and routining of the translator.

ACCESS AND EXIT CIRCUITRY

*Introduction*

The translator provides service to a number of register-sender groups. The register-sender groups request service from the translator in a random fashion by producing a D.C. signal over a call line connected to the register-identifier, and it is conceivable that many will be requesting service simultaneously. Since the translator can serve only one register-sender group at a time, an allotter is provided which interrogates the condition of one call line at a time. Furthermore, since all the register-sender groups are given equal preference as far as acquiring the services of the translator, the allotter is equipped to scan the call lines in succession. Once a register-sender group call signal has been detected, the allotter will lock in the corresponding position and remain locked while the translator receives information and completes the required translation. Completion of the translation allows the allotter to unlock and continue scanning.

After the call signal has been acknowledged by the allotter, the translator receiver circuit allows the translator to accept binary data from the register-sender group. The locked in state of the allotter causes the receiver circuit to send a "GO" signal to the register-sender group requesting service. At this particular time, the correct receiver is enabled to receive diphase information from the register-sender group over a diphase highway. The register-sender group awaits the "GO" signal before it starts sending diphase information. The selected receiver demodulator and synchronizer accepts and decodes the diphase information from the highway and presents the proper binary levels and shift pulses to the translator access register.

The translator access register serves the purpose of conveying the decoded binary input information into the translator for subsequent translation. It also is used to accept the translated binary information in parallel form and serially shift this information out to the translator sender.

The translator sender accepts logic level outputs from the translator access register and converts this information to diphase signals to be sent back to the register-sender groups.

*Sequence of operation*

A logic level (derived from a call signal operating a reed relay) appears at the input of an allotter position gate (AP1 to AP20).

The allotter scans this position by presenting two scanner position signals to the input of the allotter position gate.

The signals are gated together in the same allotter position gate which is also being held enabled by the transfer signal.

The output of the allotter position gate is used to set flip-flop 11L0.

The signal $\overline{LO}$ is fed to the control circuit and changes the control state from "IDLE" to "RECIEVE."

The reception of the "not idle" signal back from the control circuit prevents further scanning, i.e. the allotter is now locked in.

The allotter scanner position leads belonging to the "locked in" decoded position are gated with the "receive" signal from the control circuit in the translator receiver circuit.

The gating above produces a "GO" signal which is sent to the register-sender group being served.

The same gating above enables the particular receiver (synchronizer and demodulator) to accept diphase information from the register-sender group.

Once the "GO" signal is received the register-sender group begins to send diphase modulated information to the receiver chosen.

The receiver (synchronizer and demodulator) decodes the diphase signals into logic levels which are fed serially into the translator access register.

As soon as the translator access register has received its information, the control circuit is placed in the "PROCESS" state which inhibits the receiver. The "PROCESS" state continues until the required translation has been completed.

Once the translation has been completed, the translated information appears in the translator access register; and the control circuit is changed to the "SEND" state.

The translator sender synchronizer is activated and proceeds to serially shift the translated information out of the translator access register. At the same time, the sender modulator converts the outgoing logic levels into diphase information which is sent back to the register-sender group.

After sending has been completed, the control circuit is returned to the "IDLE" state.

Reception of "IDLE" signal from the control circuit causes the allotter to unlock itself and continue scanning.

*Register identifier—General*

This circuit contains a scanner which is an eleven-stage ring counter SC1–SC11 with 21 two-bit decoded position outputs. The scanner is driven by its own pulse distributor which produces the scanner stepping pulse on lead FD3–0 and the scanner reset pulse on lead FD3–1. The pulse distributor also produces a frequency division from the basic 122.8 kc. rate (8.1 $\mu$second period) of the system to the scanner rate of 30.8 kc. (32.5 $\mu$second period). The 21 two-bit decoded position outputs of the scanner are sensed by 21 allotter position gates AP1 to AP21. Each allotter position gate is also fed by a logic level derived through a reed relay energized by the call signal initiated at the register-sender group assigned to that particular scanner position. In this application, 20 register-sender groups and a local console are capable of gaining access to the translator. Access to the translator is achieved by the successful gating of an allotter position and its corresponding logic level input from the respective register-sender group along with the transfer signal. Once the call for service is detected, the allotter communicates with the control circuit changing it from the "idle" state to the "receive" state. The control circuit, in turn, causes the allotter to stop scanning and lock.

*Circuit description—Scanner counter*

The scanner counter is a 21-position ring counter consisting of 11 flip-flops (SC1 to SC11) and 21 decoding NOR gates (AP1 to AP21). The flip-flops are arranged in shift register fashion. The ring is closed by a reversal of feedback from the last stage back to the first, i.e. the "1" output of SC11 is fed back to the D.C. reset of SC1, while the "0" output of SC11 is fed back to the D.C. set of SC1. The A.C. set and reset inputs are all tied together and are fed by a scanner step pulse on lead FD3–0. The D.C. resets of all the flip-flops are tied to −8 volts, and the corresponding A.C. resets are tied together and fed by a scanner reset pulse on lead FD3–1 which resets all the flip-flops once per scanner cycle. This feature allows the scanner to be self-starting and self-correcting.

The counter exhibits the code shown on the table below. The decoding is facilitated with only two outputs per position being necessary as shown.

| SC1 | SC2 | SC3 | SC4 | SC5 | SC6 | SC7 | SC8 | SC9 | SC10 | SC11 | Decoding Logic | No. |
|---|---|---|---|---|---|---|---|---|---|---|---|---|
| 0 | 0 | 0 | 0 | 0 | 0 | 0 | 0 | 0 | 0 | 0 | $\overline{SC1}\ \overline{SC11}$ | 1 |
| 1 | 0 | 0 | 0 | 0 | 0 | 0 | 0 | 0 | 0 | 0 | SC1 $\overline{SC2}$ | 2 |
| 1 | 1 | 0 | 0 | 0 | 0 | 0 | 0 | 0 | 0 | 0 | SC2 $\overline{SC3}$ | 3 |
| 1 | 1 | 1 | 0 | 0 | 0 | 0 | 0 | 0 | 0 | 0 | SC3 $\overline{SC4}$ | 4 |
| 1 | 1 | 1 | 1 | 0 | 0 | 0 | 0 | 0 | 0 | 0 | SC4 $\overline{SC5}$ | 5 |
| 1 | 1 | 1 | 1 | 1 | 0 | 0 | 0 | 0 | 0 | 0 | SC5 $\overline{SC6}$ | 6 |
| 1 | 1 | 1 | 1 | 1 | 1 | 0 | 0 | 0 | 0 | 0 | SC6 $\overline{SC7}$ | 7 |
| 1 | 1 | 1 | 1 | 1 | 1 | 1 | 0 | 0 | 0 | 0 | SC7 $\overline{SC8}$ | 8 |
| 1 | 1 | 1 | 1 | 1 | 1 | 1 | 1 | 0 | 0 | 0 | SC8 $\overline{SC9}$ | 9 |
| 1 | 1 | 1 | 1 | 1 | 1 | 1 | 1 | 1 | 0 | 0 | SC9 $\overline{SD10}$ | 10 |
| 1 | 1 | 1 | 1 | 1 | 1 | 1 | 1 | 1 | 1 | 0 | SC10 $\overline{SC11}$ | 11 |
| 1 | 1 | 1 | 1 | 1 | 1 | 1 | 1 | 1 | 1 | 1 | SC1 SC11 | 12 |
| 0 | 1 | 1 | 1 | 1 | 1 | 1 | 1 | 1 | 1 | 1 | $\overline{SC1}$ SC2 | 13 |
| 0 | 0 | 1 | 1 | 1 | 1 | 1 | 1 | 1 | 1 | 1 | $\overline{SC2}$ SC3 | 14 |
| 0 | 0 | 0 | 1 | 1 | 1 | 1 | 1 | 1 | 1 | 1 | $\overline{SC3}$ SC4 | 15 |
| 0 | 0 | 0 | 0 | 1 | 1 | 1 | 1 | 1 | 1 | 1 | $\overline{SC4}$ SC5 | 16 |
| 0 | 0 | 0 | 0 | 0 | 1 | 1 | 1 | 1 | 1 | 1 | $\overline{SC5}$ SC6 | 17 |
| 0 | 0 | 0 | 0 | 0 | 0 | 1 | 1 | 1 | 1 | 1 | $\overline{SC6}$ SC7 | 18 |
| 0 | 0 | 0 | 0 | 0 | 0 | 0 | 1 | 1 | 1 | 1 | $\overline{SC7}$ SC8 | 19 |
| 0 | 0 | 0 | 0 | 0 | 0 | 0 | 0 | 1 | 1 | 1 | $\overline{SC8}$ SC9 | 20 |
| 0 | 0 | 0 | 0 | 0 | 0 | 0 | 0 | 0 | 1 | 1 | SC9 SC10 | 21 |

*Pulse distributor*

The pulse distributor provides the following three functions:

(1) Counts down the basic "CPA" pulse rate by four.

(2) Produces the scanner stepping pulse train (FD3–0) and the scanner reset pulse (FD3–1).

(3) Prevents the above pulses from stepping the scanner upon reception of a "not idle" signal.

The count down of four is accomplished by utilizing a two-stage binary frequency divider consisting of flip-flops FD1 and FD2 and NOR gates 53 and 54. The design considerations are:

| FD1 | FD2 | Pos. | Logic Equations |
|---|---|---|---|
| 0 | 0 | 1 | Set RI-FD1=RI-$\overline{FD1}$. |
| 1 | 0 | 2 | Reset RI-FD1=RI-FD1. |
| 0 | 1 | 3 | Set RI-FD2=RI-FD1 RI-$\overline{FD2}$. |
| 1 | 1 | 4 | Reset RI-FD2=RI-FD1 RI-FD2. |

The A.C. set and A.C. reset inputs of FD1 and FD2 are tied together and fed by CPB. FD1 is connected in complementary fashion. Position 4 feeds both the D.C. reset of FD2 and position 3 feeds the D.C. input to a gated pulse amplifier GPA #52. The output of GPA #52 becomes the auxiliary scanner index pulse to the A.C. set of flip-flop 11L0. Position 2 feeds the D.C. set of flip-flop FD2. A gate 53 containing the position 2 input leads ($\overline{FD1}$ and FD2) and the lead CPA feeds the input of a GPA #56. The output of GPA #56 becomes the scanner index pulse "SIP" to the A.C. reset of the flip-flop 11L0 and gated pulse amplifiers #8 and #9. The above configuration yields the following logical expressions for "SIP" and "ASIP":

$$SIP=RI-FD1\ RI-\overline{FD2}\ CC-I\ CPA \quad (1)$$

$$ASIP=RI-FD1\ RI-FD2\ CPA \quad (2)$$

A flip-flop FD-3, gates 55 and 57, and GPA 58 and 59 are arranged in such a manner as to produce the following:

$$\text{Scanner reset pulse}=RI-FD3\ SIP \quad (3)$$

$$\text{Scanner step pulse}=RI\ \overline{FD3}\ SIP \quad (4)$$

where:

$$\text{Set } RI\ FD3=RI\ \overline{SC9}\ RI-SC10\ ASIP \quad (5)$$

$$\text{Reset } RI-FD3=\overline{RI-\overline{SC9}\ RI-SC10}\ ASIP \quad (6)$$

By the above treatment both a stepping pulse SSP is produced as well as a scanner reset pulse SRP. "SRP" resets the scanner in a particular code (all zeros) once per cycle of 21; i.e. there are 20 "SSP" pulses and 1 "SRP" per 21 steps of the counter. If the counter starts off in a redundant code (one not represented in the code table), this code will propagate till the FD3 flip-flop becomes set. Once this happens "SRP" will become true, and the counter will be forced into a usable code (all zeros). The use of such an arrangement allows the counter to be self-starting and self-correcting.

*Allotter seizure*

To successfully acknowledge a call signal, the following logic must be fulfilled to get an output through the lock out gates 11LG.

$$RI-LG=RI-AP1+RI-AP2 +RI-AP3\ .\ .\ .\ +RI-AP21$$

where:

RI as a prefix indicates the allotter circuit.
IC as a prefix indicates the console panel.

$$RI-AP1=RI-\overline{SC1}\ RI-\overline{SC11}\ RI-RT1\ CL-RT-0 \quad \text{(Pos. 1)}$$

$$RI-AP2=RI-SC1\ RI-\overline{SC2}\ RI-TC2\ CL-BRT-0 \quad \text{(Pos. 2)}$$

$$RI-AP20=RI-\overline{SC8}\ RI-SC9\ RI-TC20\ CL-BRT-0 \quad \text{(Pos. 20)}$$

$$RI-AP21=RI-\overline{SC9}\ RI-SC10\ CO-CEF\ CL-BRT-0 \quad \text{(Pos. 21)}$$

The RT signals are the logic levels from the register circuits.

$\overline{LO}$ is fed to the control circuit where it is used to reset the 27ID flip-flop and set the 23RE flip-flop. After "11L0" becomes set, "ID" is returned from the control circuit and is used to prevent further scanning by inhibiting the "SIP" pulse. When the allotter is locked in, the allotter position outputs, which are fed to the receivers along with the "receive" signal, select the correct receiver and send back a "GO" signal to the register-sender group The "11L0" flip-flop serves other purposes aside from storing the "LG" signal. It eliminates the possibility of partial gating, i.e. if a call signal should appear toward the end of a particular time interval, there is a possibility that by the time the "idle" signal is returned from the control circuit the scanner may have stepped on, resulting in a faulty locked in position. Because the "11L0" flip-flop is strobed with an "ASIP" pulse, it will always be set in the middle of a time interval thus giving the "$\overline{\text{ID}}$" signal 16 $\mu$seconds to be returned from the control circuit.

Secondly, the "LO" flip-flop serves as a buffer stage between the register-sender group call signal and the electronic circuitry. "LG" might be the result of a spurious signal due to contact bounce, which will be sufficient to set the "11L0" flip-flop. Thus, a signal which is subjected to contact bounce from closure of relay contacts will produce a distinct output from the flip-flop.

*Transfer facility*

The manner in which the traffic load is distributed between two translators (A and B) of a translator pair is decided upon at the allotter. Each translator is allowed to carry full, half, or no load in the following manner:

Condition 1: Translator A serving 10 odd-numbered register-sender groups; Translator B serving the 10 even-numbered register-sender groups (Half Load).

Condition 2: Translator A serving 10 even-numbered register-sender groups; Translator B serving the 10 odd-numbered register-sender groups (Half Load).

Condition 3: Translator A serving all 20 register-sender groups (Full Load); Translator B serving none (No Load).

Condition 4: All 20 register-sender group disconnected from Translator A (No Load); Translator B carrying full load.

The transfer lead $\overline{\text{BRT}}$, $\overline{\text{RT}}$ and $\overline{\text{TSO}}$ are presented as inputs to the "AP" gates. $\overline{\text{BRT}}$ is connected to the even-numbered "AP" gates. $\overline{\text{RT}}$ is connected to the odd-numbered "AP" gates (except AP21). Ground is connected to AP21. Ground presented by the transfer lead enables the "AP" gates while −8 volts disables.

*Translator receiver circuit—General*

The translator receiver circuit consists of a receiver synchronizer and receiver demodulator for each register-sender group served by the translator. The receiver circuit includes provisions for serving twenty register-sender groups. The function served by the translator receivers consists of four main parts.

(1) To choose the correct diphase highway.

(2) To send a "GO" signal to the register-sender group requesting service.

(3) To decode the input diphase information from the register-sender group and present the D.C. levels with corresponding shift pulses for the serial shifting of information into the translator access register during the "RECEIVE" state of the control circuit.

(4) To provide a bypass for processing local transmission from the console.

*Circuit description—Receiver selection*

The selection of a particular transceiver (demodulator and synchronizer) (TR) is made through gates #A1, #B1, #C1, #D1, etc. The logic of these gate outputs is as follows:

*TR—A1=RI—*$\overline{\text{S1}}$ *RI—*$\overline{\text{S11}}$ *CL—RE* (for register-sender group #1)

*TR—A2=RI—S1 R1=*$\overline{\text{S2}}$ *CL—RE* (for register-sender group #2)

*TR—A3=RI—S2 RI—*$\overline{\text{S3}}$ *CL—RE* (for register-sender group #3)

*TR—A4=RI—S3 RI—*$\overline{\text{S4}}$ *CL—RE* (for register-sender group #4)

Where S11, S1, $\overline{\text{S1}}$, S2, $\overline{\text{S2}}$, S3, $\overline{\text{S3}}$, and S4 are scanner position leads from the allotter; and CL–ID is taken from the ID flip-flop in the process control circuit.

*GO signal generation*

A similar logic output for each receiver selection gate (#A1, #A2, #A3, etc. as mentioned above) is also used (#B1, #B2, #B3, etc.) whose output is sent over a highway back to its corresponding register-sender group. The −16 volt lead along with the collector output constitute a signal pair which is used to energize a reed relay in the register of the corresponding register-sender group. This "GO" signal is interpreted as a signal to commence the sending of diphase modulated information to the translator.

*Diphase information handling*

With the receiver demodulator and synchronizer enabled and the "GO" signal sent as described, the register-sender is capable of communicating with the translator via a diphase modulated highway. Diphase data enters the chosen translator receiver over a two-wire highway. Each demodulator-synchronizer pair is fed by an individual register-sender group.

The outputs of the receiver demodulators are tied together in "OR" gate fashion to produce the common output signal. The enabled demodulator will produce a logic level (properly synchronized with the receiver synchronizer) on the "DCS" output. This output carries the decoded binary information to be fed into the translator access register in serial form. The information is normally preceded by the code 001 and suffixed by the single bit "1."

The outputs of the receiver synchronizers are also tied together to form the common "SP" output. "SP" constitutes the translator access register shift pulses which propagate the logic levels appearing on the "DCS" output into the translator access register at a basic period of 25 $\mu$seconds. The synchronizer outputs are synchronized with the demodulator in such a manner as to have the D.-C. level changes of "DCS" strobed at the midpoint of their cycle time. The period of "DCS" is also 27 $\mu$seconds.

*Translator access register—Receiving*

The "DCS" and "DCR" signal inputs from the translator receiver circuit convey a logic level which is fed to flip-flop 12SF. The output $\overline{\text{SF}}$ is fed to the D.-C. reset of flip-flop AA1. The output SF is fed to the D.-C. set of flip-flop AA1. Flip-flops AA1 to AA64 (FIG. 12) are connected in shift register fashion.

The "SP" (shift pulse output from the translator receiver circuit) input is connected in multiple to the A.-C. sets and resets of flip-flops AA1 to AA64 and also PF, BF1, BF2 and BP.

The above connections involving the flip-flop inputs allows the logic level appearing at the "DCS" and "DCR" inputs to be propagated in serial fashion through each successive flip-flop. The information in any message conveyed by these inputs is always preceded by a prefix bit. When the prefix bit reaches the PF (pre-fix) flip-flop in the translator access register the control circuit will be put in the "RECEIVE COMPLETE" state causing the shift pulses to cease; and the correct binary information in the received order will then be contained in the translator access register, i.e. the "RECEIVE" state is complete. Flip-flops BF1 and BF2 are used to buffer the preliminary 2 bits "0" and "0" preceding the prefix bit "1"

at the start of a transmission, while "BP" is used to check for "even" parity of the received information.

*Sending*

After the desired translation has been completed, the control circuit is put in the "SEND" state; and the translator access register begins to receive "SP" pulses causing the whole register to commence shifting out its information (consisting of the translated digits). In the "SEND" state the "DCS" input will be feeding zeros into the translator access register. The output of the translator access register is fed to the translator sender circuit.

After the translator access register reaches the condition of having all zeros in its flip-flops as determined by the gates 13ES sending is considered to be completed; and an end of send signal is produced by the "13ES9" gate circuit. This signal is recorded in the "13ES" flip-flop (which is strobed with a pulse, "DRP"). The output of the "13ES" flip-flop communicates with the control circuit causing it to change from the "SEND" to the "IDLE" state.

*Translator send circuit—General*

The translator sender circuit provides the translator with a means for encoding the binary information stored in the translator access register and presenting a diphase modulated output to be sent via a diphase highway to the register-sender groups. It also is used to produce shift pulses for local transmission between the console register and the translator access register. The sender employs a diphase modulator and sender synchronizer.

TRANSLATOR MODES OF OPERATION

To achieve maximum efficiency in the operations of the translator, the translating process is divided into several modes of operation. In each mode, the translator controller (CL) supervise the sequence of operations assigned to that mode. The modes are: Idle, Receive-Receive Completed, Process, Send-End of Send.

If there is no request for service the translator is in the idle mode and is indicated by the set condition of flip-flop CL–ID. The conditions are:

$$ID\ (\text{set})=(RI-\overline{FD1})\ (RI-FD2)[(AS-ES)+TO2\ \overline{TO3}\ \overline{RC}\ TRB+RT\ (\text{trans B})\ (TR2+TR4\ \text{to}\ TR11+TR14)]$$

$$ID\ (\text{reset})=(RI-LO)\ \overline{RE}\ \overline{PR1}\ \overline{SE}$$

In this mode the process controller resets all registers, buffers and other flip-flops to their idle state. The controller also enables the register identifier (RI) to scan all request for service input levels. The scanner is driven by pulses derived from the index readout at the rate of four index pulses (32 $\mu$s.) per request of service input level. During this time if a request for service is detected the controller CL sets the translator into the receive mode. The receive flip-flop RE is set upon locking the scanner, resetting the idle, lapse of the time required for the transmission relay to be pulled up, and the system not in operation.

$$RE\ (\text{set})=RI-CD5\ \overline{PR1}\ \overline{SE}\ \overline{ID}$$

During this mode, the register identifier (RI) selects the register sender requesting service, and closes a path connecting the two conductor transmission highway. After a guard period of 4 ms. the register identifier RI sends the ready to receive command to the respective register-sender group allowing it to start sending data. The translator receiver decodes the data into logic levels and stores it in the access register AS.

The controller CL senses that the complete set of data is received by the received complete flip-flop being set, after a receive state and after the first bit is in position SF of the access register.

$$RC\ (\text{set})=RE\ (AS-SF)$$

It stops the transmission and sets the translator into the Processing Mode. The process mode flip-flops are divided into a three step group; PR1, PR2 and PR3 to serve as a buffer for time delay for the propagation in setting CT1 to CT, PT and also to eliminate "not" logic.

$$PR1\ (\text{set})\ ^{1}=\overline{PR1}\ \overline{SE}\ (\overline{AS}-\overline{BP})\ RC$$
$$PR2\ (\text{set})=PR1\ \overline{WR}\ \overline{WT1}$$
$$PR3\ (\text{set})=PR2$$

[1] The receive flip-flop RE will be reset upon setting PR1.

In this mode, upon analysis of the received information, the controller CL selects the required type of translation (see subsequent sections), the object of which is to obtain information from the permanent memory storage or to generate such information by logic commands.

In order to extract information from the memory the controller CL selects the required memory segment and enables its readout. It selects a proper pattern of coincidence, initiates the required coincidence scanning and starts the necessary information flow. This mode of operation will continue until a coincidence between the received data and information fed into the address comparison circuit CN is acknowledged.

The coincidence command transfers the translator into the Outgoing Data Processing Mode.

If the outgoing information is to be generated by logic commands, the process controller sets the translator into the Outgoing Data Processing Mode directly without the check for coincidence.

The outgoing data generated or read from the memory is stored in the readout processor transfer buffer RP.

The information extracted and the information received are now analyzed. Since the point of origin and the destination are now known the routing of the call is checked. It required, the routing may be changed or the call may be blocked if the destination is not authorized. A subsequent reference to the memory and check for coincidence using the originating and terminating class of service as the address may be necessary to determine the proper handling of some calls. Upon completion of the analysis the received data in the access register AS is replaced by the outgoing data. The translator now is in the Sending Mode of operation. The send flip-flop SE is set with the transfer process output TP5 which also resets PR1, PR2 and PR3. It is reset by Idle and CPA.

Since the data transmission highway remained connected during the translating process, the receiver-sender is able to start sending immediately. When the controller CL senses that all the data has been sent it sets the translator back to the Idle Mode of operation. The end of send flip-flop ES is set upon the ESG gates detecting the set condition of all of the access register flip-flops. This end of send signal alone is sufficient in normal operation for the translator to return to the idle mode. However, in the case of a malfunction of the first translator, the idle flip-flop ID will not be reset until the trouble is taken care of by the trouble recorder. The associated translator flip-flop RT does not permit the return to idle of the first translator (B). On the other hand if the associated translator had a malfunction first, then the first translator (A) will be returned to idle.

$$ID\ (\text{set})=\overline{RT(B)}\ (TR1\ .\ .\ .\ TR14)$$

The idle flip-flop ID is reset upon the first "received completed" (RC) time out. Two successful "receive completed" time outs will set the translator into the trouble state.

$$ID\ (\text{set})=TO2\ \overline{TO3}\ \overline{TR13}$$

The idle flip-flop ID can also be set with a reset push key. With the ID flip-flop set the translator returns to the idle mode, resetting all of flip-flops necessary. The translator is now able to answer the next request for service.

ACCESSING THE TRANSLATOR

There are a variety of services for which the register-sender group may access the translator. The translator must be able to recognize and return the required information for all possible combinations of access codes, special service codes, area codes, office codes, directory number, line number, etc. In addition, the translator must inform and guide the register sender if erroneous or incomplete information has been dialed.

In processing a call for service the translator may request the register-sender to access it more than one time. In each new access, the register-sender group has to wait its turn of service and the fact that it is a successive access may only be deduced by the controller CL from the analysis of the received data. Thus each call for service is initially viewed by the translator as a first call. The translations required in the second or higher access are considered to be pre-programmed translations, since the processing information which was sent to the register-sender group by the translator in the previous access is returned. The controller CL used this information in sequencing the operation of the translator.

The first access translation is the initial contact between the register-sender group requesting service and the translator. The data sent to the translator may consist of 0, 1, 2, 3 or 4 dialed digits and information pertaining to the point of origin. Since the register-sender group does not analyze the dialed digits, the translation must yield a complete information and instruction required for completion of a given call.

The serial flow of information between the register-sender and the translator consists of 64 data bits (16 digits in binary coded decimal form). Each information transfer to and from the translator is parity checked with one parity bit added to the complete serial data transfer.

Since in the first acess, the dialed digits received by the translator are not stored in a fixed position in the 64 bit shift register, the controller CL must locate the digits and if necessary establish their values in order to initiate a translation. The outgoing data, resulting from a translation, is sent to the register-sender in specially assigned positions. The outgoing data may be divided into three groups:

(a) Routing instruction
(b) Sender instruction
(c) Processing instruction

The routing instruction, consisting of a maximum of 9 digits, represents information required to route a given call to its destination.

The sender instruction, consisting of a maximum of 3 digits, is information necessary for controlling the various modes of sending used by the register-sender group extending the telephone connection.

The processing instruction, consisting of a maximum of 4 digits, consists of the process control digits required for communication between the translator and the register sender group. With the precessing instruction the translator informs the resgister sender how many digits the subscriber is expected to dial and how many digits should be sent to the translator in each (in a multi-drum office the address of the translator to be accessed is also given). The precessing instruction also enables the tranlator to pre-program its operations for the second or higher access. The translator sends to the register sender the processing digits which are to be returned to the translator in the successive access, instructing the process controller to initiate the required translations.

DATA EXTRACTION PROCESS

The object of any type of translation is to obtain data from the permanent memory storage or to extract it from logic commands. For many translations the combination of both methods is used to obtain the required data.

LOGIC GENERATED TRANSLATION

The logic generation of outgoing data provides the translator with the maximum speed of translation. In logic generated translation, the memory access time (average of 16 ms.) is not required since the process controller sets the translator from the Receive Mode into the Outgoing Data Processing Mode. Logic generated translations do not provide the translator with the source degree of flexibility in programming changes as provided by the completely flexible memory readout translations.

Logic generation of information is used in dealing with incomplete or incorrect data or in the case when a call should be blocked, intercepted or transferred to a special trunk. For all logic generated translations, the required information to be generated is permanent and does not require variation.

The command for a logic generated translation is given by the process controller CL upon analysis of the received data. The process controller CL allows the translator to omit the Incoming Data Processing Mode and sets the translator into the Outgoing Data Processing Mode. The readout processor RP senses the command for logic translation and sets the appropriate D.C. levels in its transfer buffer circuit. During the Outgoing Data Processing Mode of operation these levels are stored in the readout processor buffer 3RP in terms of digits.

The information is transferred to the sender and sent to the respective register-sender.

MEMORY READOUT TRANSLATION

Translation based on extracted information from an electrically alterable permanent memory storage provides the translator with maximum flexibility.

To extract information from the permanent memory which is organized in the three segments, the controller CL initiates a continuous readout from the selected segment or a consecutive readout of all the segments.

Most of the code translations are located in the third segment of the memory; therefore the process controller CL starts with the readout of the third segment automatically proceeding to the second and first segment. In line number translations, since most of the numbers are located in the first and second segment, the controller begins with the readout of the first segment, and then proceeds with the second and third segment. In directory number translations, the controller selects for readout the segment in which the information is stored.

*Drum segment selection—"READ"*

The segment selection will be done on the basis of thousand digit of the incoming number.

| | | |
|---|---|---|
| Thousand | 1, 2, 3, 4 | Seg. I |
| | 5, 6, 7, 8 | Seg. II |
| | 9, 10, 11, 12 | Seg. III |

Only values 1 to 10 will be used for directory number translation. However, for writing purposes all 12 values will be decoded.

The thousand digit (stored in TA4) will be stored on the following flip-flops.

No lost digit DN translation:

*DN DN1*

$M8=AS-AA$ 52
$M4=AS-AA$ 51
$M2=AS-AA$ 50
$M1=AS-AA$ 49

1, 2, or 3 lost digits:

*DN DN2*

$M8=AS-AA$ 64
$M4=AS-AA$ 63
$M2=AS-AA$ 62
$M1=AS-AA$ 61

4 lost digits:

*DN DN3*

$M8=AS-AA$ 36—32
$M4=AS-AA$ 35—31
Delayed due to $k$ $y$ exchange
$M2=AS-AA$ 34—30
$M1=AS-AA$ 33—29
Read segment selection—$TH=1, 2, 3, 4$

*Segment Read I*

$$SR1=M1\overline{M2}\,\overline{M4}\,\overline{M8}+\overline{M1}M2\overline{M4}\,\overline{M8}+M1M2\overline{M4}\,\overline{M8}+\overline{M1}\,\overline{M2}M4\overline{M8}=\overline{M4}\,\overline{M8}+\overline{M1}\,\overline{M2}\,\overline{M8}$$

$$SR1=DN\{[DN1(\overline{AA51}\,\overline{AA52}+\overline{AA49}\,\overline{AA50}\,\overline{AA52})]+[DN2(\overline{AA63}\,\overline{AA64}+\overline{AA61}\,\overline{AA62}\,\overline{AA64})]+[DN3(\overline{AA35}\,\overline{AA36}+\overline{AA33}\,\overline{AA34}\,\overline{AA36})]\}$$

*Segment Read II*

$$SR2=M1\overline{M2}M4\overline{M8}+\overline{M1}M2M4\overline{M8}+M1M2M4\overline{M8}\,\overline{M1}\,\overline{M2}\,\overline{M4}M8$$

$$SR2=M1M4+M2M4+\overline{M1}\,\overline{M2}\,\overline{M4}$$

$$SR2=DN\{[DN1(AA49AA51+AA50AA51+\overline{AA49}\,\overline{AA50}\,\overline{AA51})]+[DN2(AA61AA63+AA62AA63+\overline{AA61}\,\overline{AA62}\,\overline{AA63})]+[DN3(AA33AA35+AA34AA35+\overline{AA33}\,\overline{AA34}\,\overline{AA35})]\}$$

*Segment Read III*

$$SR3=M1\overline{M2}\,\overline{M4}M8+\overline{M1}M2\overline{M4}M8+M1M2\overline{M4}M8+\overline{M1}\,\overline{M2}M4M8$$

$$SR3=M2M8+M1M8+M4M8=$$

$$SR3=DN\{[DN1(AA50AA52+AA49AA52+AA51AA52)]+[DN2(AA62AA64+AA61AA64+AA63AA64)]+[DN3(AA34AA36+AA33AA36+AA35AA36)]\}$$

*Line Number Translation*

The segments SR1, SR2, SR3 will be selected for LNT in indicated order.

The line number translation has a non-random access. Scanning starts with segment I (SRI) through segment III (SRIII) while the counter counts from 1 to 10 thousand. For LNT the segment selection starts with drum reset pulse delayed by the counter flip-flop to PD–2.

*Code Translations*

For code translation the segment selection starts with SR3 through SR1.

The control for segment selection is as follows:

*General SR Set and Reset*

$$SR1(S)=\overline{SR1}\,\overline{SR2}\,\overline{SR3}LN+\overline{SR1}SR2\overline{SR3}(CT+PT)$$
$$SR1(RS)=SR1\overline{SR2}\,\overline{SR3}LN+SR1\overline{SR2}\,\overline{SR3}(CT+PT)$$
$$SR2(S)=SR1\overline{SR2}\,\overline{SR3}LN+\overline{SR1}\,\overline{SR2}SR3(CT+PT)$$
$$SR2(RS)=\overline{SR1}SR2\overline{SR3}LN+\overline{SR1}SR2\overline{SR3}(CT+PT)$$
$$SR3(S)=\overline{SR1}SR2\overline{SR3}LN+\overline{SR1}\,\overline{SR2}\,\overline{SR3}(CT+PT)$$
$$SR3(RS)=\overline{SR1}\,\overline{SR2}SR3LN+\overline{SR1}\,\overline{SR2}SR3(CT+PT)$$
$$SR1(S)=\overline{SR1}\,\overline{SR3}[\overline{SR2}LN+SR2(CT+PT)]$$
$$SR1(RS)=SR1\overline{SR2}\,\overline{SR3}(LN+CT+PT)$$
$$SR2(S)=\overline{SR2}[SR1\overline{SR3}LN+\overline{SR1}SR3(CT+PT)]$$
$$SR2(RS)=\overline{SR3}SR2\overline{SR3}(LN+CT+PT)]$$
$$SR2(RS)=\overline{SR1}SR2\overline{SR3}(LN+CT+PT)$$
$$SR3(S)=\overline{SR1}\,\overline{SR3}[SR2LN+\overline{SR2}(CT+PT)]$$
$$SR3(RS)=\overline{SR1}\,\overline{SR2}SR3(LN+CT+PT)$$
$$AC+\overline{A}B=(A+B)(\overline{A}+C)$$

$$SR1(S)=[\overline{SR1}\ \overline{SR3}][\overline{SR2}(\overset{B}{LN})+SR2(\overbrace{PT+CT}^{C})]$$
$$=[\overline{SR1}\ \overline{SR3}][SR2+LN][\overline{SR2}+PT+CT]$$

$$SR3(S)=\overline{SR1}\ \overline{SR3}[SR2\overset{C}{LN}+\overline{SR2}(CT\overset{B}{+}PT)]$$
$$=[\overline{SR1}\ \overline{SR3}][\overline{SR2}+LN][SR2+CT+PT]$$

*Forbidden Combinations*

$SR1\ SR2\ SR3\ LN\ CT\ PT$
$SR1\ SR2\ \overline{SR3}\ LN\ CT\ \overline{PT}$
$SR1\ \overline{SR2}\ SR3\ LN\ \overline{CT}\ PT$
$\overline{SR1}\ SR2\ SR3\ \overline{LN}\ CT\ PT$

*Set Commands for SR2*

$$\overline{SR2}[\overline{\overline{LN}\ \overline{SR3}+\overline{SR1}\ \overline{CT}\ \overline{PT}}]$$
$$SR2(S)=\overline{SR2}[(LN+SR3)\ (SR1+CT+PT)]$$

*Sets Commands for SR1*

$$\overline{SR1}\ \overline{SR3}[\overline{SR2}\ \overline{LN}+SR2\ \overline{CT}\ \overline{PT}]$$
$$\overline{SR1}\ \overline{SR3}[(SR2+LN)\ (\overline{SR2}+CT+PT)]$$

*Set Commands for SR3*

$$\overline{SR1}\ \overline{SR3}[\overline{\overline{SR2}\ \overline{CT}\ \overline{PT}+\overline{SR2}\ \overline{LN}}]$$
$$\overline{SR1}\ \overline{SR3}[(SR2+CT+PT)\ (\overline{SR2}+LN)]$$

*Segment Selection for DN, WV (write verification)*

The segment is selected by the decoding of the thousand count. The option "B" of the SR1–SR3 flip-flops is used with DN and WV.

*Segment I*—1, 2, 3, 4 (count)
$f=\overline{M8}\ (\overline{M2}+\overline{M4})\ (\overline{M1}+\overline{M4})$
*Segment II*—5, 6, 7, 8 (count)
$f=(\overline{M1}+M4)\ (\overline{M2}+M4)\ (M1+M2+\overline{M4})$
*Segment III*—9, 10, 11, 12
$f=M8\ (M1+M2+M4)$

| | M1 | M2 | M4 | M8 | |
|---|---|---|---|---|---|
| AS-AA | 49 | 50 | 51 | 52 | DN1 |
| AS-AA | 61 | 62 | 63 | 64 | DN2 |
| AS-AA | 33 | 34 | 35 | 36 | DN3 |
| AS-AA | 21 | 22 | 23 | 24 | WV |

The information read from the storage is transferred to the readout buffer MR, and then from here depending on the direct address scan, memory word scan, or associative address scan the proper flow of information is initiated by the controller CL.

To select the required outgoing data from the stored information the translator seeks coincidence between the input data and the information fed into coincidence buffer CN. Since the input data used in finding coincidence does not appear in the same position for each call; the process controller CL (upon establishing the location) energizes only some coincidence gates. The address comparator CN is equipped with 24 coincidence gates, each gate is capable of finding a coincidence between two digits (four bits per digit) located in a fixed position one in the comparison buffer CN the other in the access register AS. For instance, a gate C1 of CN checks the coincidence between digit position C1 in the coincidence buffer CN and digit position AA1 in the access register AS. Another coincidence gate C2 checks the position C2 with position AA2 in the access register. The number of coincidence gates used in a given translation varies from two to ten. Gates not used are inhibited by the process controller circuit CL. The coincidence gates used and the various positions compared, give the translator definite coincidence patterns (which must be followed in order to extract the desired information from the memory). The simultaneous coincidence of all energized coincidence gates used in a given translation indicates an overall coincidence which is acknowledged by the comparator circuit CN.

In associative memory scan the information fed into the comparator CN consists of the memory words constituting only internal memory addresses of various length, as well as memory words containing outgoing data.

There could exist a possibility of finding enormous coincidence with such outgoing data. Moreover, some internal address consisting of few degits could coincide with a fraction of a longer address yielding also an erroneous coincidence.

To guard against such errors all calls for service are classified in various groups with each of these relevant fields there is associated a definite coincidence pattern. Also for each relevant field the process control CL generates a coincidence control digit. Such a digit is originally recorded with every internal address. During memory scan the overall coincidence cannot be found unless the control digits correspond.

Similar control digits are originally recorded with the words representing outgoing data. Upon coincidence, the control digits are used to enable the data transfer from the readout buffer to the readout processor. Since the positions of every digit in the outgoing data is fixed the control digits are used to guide the transfer of data to their assigned locations. The variable loading patterns provide very efficient use of the permanent memory storage position.

*Address comparator—Comparison buffer*

The information from the readout buffer will be transferred to the comparison buffer in the following translations:

(1) LN translation
(2) CT translation
(3) PT3 translation
(4) PT1, PT2 translation The readout buffer information is transferred to the comparison buffer in the first two pre-translation operations only when the thousand count is 11 and 12. When the count is 9 or 10 the counter (address counter) is read into comparison buffer, however during this operation W (PP33–PP36) and (SS5–SS8) is transferred from the readout buffer to the comparison buffer.

The W value (W8) is necessary for coincidence of final route and intercept.

$$M8\ \overline{(\overline{M1}\ \overline{M4}+M1\ \overline{M2})}$$
$$M8\ (M1+M4)\ (\overline{M1}+M2)$$
$$M4\ M8+M1\ M2\ M8\ M8\ (M4+M1\ M2)$$

The counter output is transferred into the coincidence buffer during:

(1) DN translation
(2) WV translation (writing verification)
(3) WR translation
(4) CT–10, CT11 translation In CT10, CT11 only during the thousand count 9 and 10 the counter will be transferred to the comparison buffer.

$$f=M8\ \overline{(\overline{M1}\ \overline{M2}+M1\ M2)}$$
$$M8\ (M1+M2)\ (\overline{M1}+\overline{M2})$$
$$\overline{M1}\ M2\ M8+M1\ \overline{M2}\ M8$$

The counter is stored on flip-flop PP1 to PP16.

*Σ transfer—DN translation*

Σ the coincidence and the loading control digit is transferred to the coincidence buffer during DN translation. If this value is not 0000 for all line numbers this call should be intercepted.

At the instance when coincidence becomes acknowledged (KC is true) the given Σ is being reset and the Σ in readout buffer was replaced with new Σ 4 milliseconds ago.

This sigma assigned to a given LN is needed for the purpose of intercept check in case of a value bigger than 0000, and for this reason has to be retained.

Note: Set-Reset PP37 to PP40, A option; Intercept Command $\overline{\Sigma 0}$ (DN) (KC)

*PT, CT, LN translation*

For CT, LN sigma is transferred from the readout buffer at the same time as the information is transferred for which coincidence is sought. Sigma should prevent coincidence with wrong information.

*W or Q digit transfer—PT translation*

During the first thousand when the initial pretranslation for existing codes is performed the W has to be transferred to the comparison buffer with the counter. It does not have to be retained upon coincidence since when the IC flip-flop is set, there is no need for the given W value. The same holds true for the (10 thousand) second thousand when the FR is being sought.

Note: Only W8 stored in PP36 must be transferred for initial pretranslation.

The second part W read out with the sought information has to be retained for analysis in connection with the "terminating class of service." The coincidence inhibits further transfer.

To accomplish this W is transferred only then, when readout buffer is transferred to the transfer buffer. That is:

$$(PT\ FR\ SS1\ \overline{SS2}\ SS3\ SS4+KC\ SS4\ \overline{DN}\ \overline{LN})$$
$$CPA=CR1\ CP$$

The same command will be true for (CT) code translation.

*Initial pretranslation*

This GPA is the same as the DCTP with the exception that the C terminal has $DN+WR+WV$ command. This will not interfere since the only time we look at W8 is when PT1 or PT2 is true. Therefore: PP36 will be driven by DCTP, option A, secondary pretranslation.

Note: Set-Reset PP33, 34, 35, option A
Reset PP36 (Idle) option B

*Address comparator—Coincidence control*

There are 11 different cases for the coincidence circuit. For these the controller circuits provide commands PT (PT1, PT2, PT3), CT (CT1, CT2, CT3, CT4), LN, DN (DN1, DN2, DN3), WR, WV, Write (WR) and write verification (WV) are assigned to a different set of coincidence gates.

The coincidence is found between information stored in the access register consisting of 64 flip-flops (AA1–AA64) and the comparison buffer consisting of 40 flip-flops.

The access register flip-flops are combined in groups of 4 represented by a digit or letter.

The AA64, AA63, AA62, AA61 group are identified by the symbol TA1, and the AA1, AA2, AA3, AA4 are represented by symbol TA16.

Similarly the comparison buffer flip-flops are given symbols CB1 to CB10, where CB1 represents PP1, PP2, PP3, PP4 flip-flops.

*PT Pretranslation (CT10–CT11)*

There are three possible operations under PT:
(1) PT TL3

Coincidence gates C16, C17, C18
Buffers Position TA1—CB2
TA2—CB3
TA3—CB4

CB2, 3, 4 stores the H, T, U in first sequence and $A_1$, $A_2$, $N_0$ or A X′ X″ in the second sequence.

(2) PT TL4 $[TA=0)+(TA=1)]$

CG: C2, C3, C4
B.P.: TA2—CB2
TA3—CB3
TA4—CB4

(3) PT K2 Y13

CB: C1, C2, C8, C9
B.P.: TA1—CB1
TA2—CB2
TA8—CB7
TA9—CB8

TA1, TA2 stores $A_2$ $N_0$ or $N_0$ $N_1$ (from $A_1$ $A_2$ $N_0$ $N_1$ $N_2$ $N_3$ $N_4$) depending on number of digits lost.

TA8, stores Y digit
TA9, stores K digit

*CT—Final Code Translation*

There are four possible operations:
(1) CT TL6

Coincidence Gates: C1 to C6
Buffers Position: TA1 to TA6—CB1 to CB6
The TA1 to TA6 stores A X′ X′ $A_1$ $A_2$ $N_0$
(2) CT IN8

C.G.: C1 to C6, C10 C11
B.P.: TA1 to TA6—CB1 to CB6
TA10—CB7
TA11—CB8
TA1 to TA6 stores line number (CDHTUP)

TA10 and TA11 stores two digits dialed by subscriber for repertory dialing.
(3) CT TL7 (IN10)

C.G.: C1 to C7
B.P.: TA1 to TA7—CB1 to CB7

TA1 to TA7 stores full DN of a subscriber whose translation cannot be determined by three digits.
(4) CT TL4 (IN10)

C.G.: C1 to C7
B.P.: TA1 to TA4—CB1 to CB4

TA1 to TA4 stores $A_1$ $A_2$ $N_0$ $N_1$ of the DN of a subscriber whose translator cannot be determined by three digits code.

*LN—Line Number Translation*

LN—Coincidence gates: C1 to C6
Buffer Position: TA1 to TA6—CB1 to CB6

TA1 to TA6 stores in line number (CDHTUP)

*Directory Number DN*

There are three operations under DN:
(1) DN1:

Coincidence gates: C12, C13, C14, C15
Buffer Position: TA4—CB1
TA5—CB2
TA6—CB3
TA7—CB4
TA4 to TA7 stores $N_1$ $N_2$ $N_3$ $N_4$
CB1 to CB4 stores TH, H, T, U (2) DN2:

Coincidence gates: C1, C2, C3, C4
Buffer Position: TA1 to TA4—CB1 to CB4

(3) DN3:

Coincidence gates: C16, C17, C18, C19
TA1—CB2
TA2—CB3
TA3—CB4
TA8—CB1 (C19)

When the overall coincidence is acknowledged by the comparator the comparison process is halted. The internal memory address is now in the coincidence buffer MR. Once coincidence has been found all memory words readout after this internal address are checked by the process controller 3CC for the presence of a loading control digit. When the control digit is sensed, an immediate command for data transfer to the processor 3RP is given. This feature of programming the data readout after coincidence, permits the translator to save memory space, since repetitious data memory words are not recorded. To take advantage of this feature, all internal addresses having the same data words are grouped and placed in consecutive manner in the memory storage which are followed by the data word pertaining to this group.

Some translations may require as many as 64 bits of outgoing data, a single memory word contains 40 bits, therefore the translator uses a folded memory word. Such folded words consist of two or more single memory words placed consecutively in the memory storage. Each of these single memory words contains a loading pattern control digit permitting the proper readout transfer.

All the operations performed by the translator are grouped in certain types of translations. Each type uses, a separate coincidence pattern, and a distinct procedure in the data processing mode of operation.

*Types of translation*

All types of translations are grouped with respect to their order of access into three general categories:
(a) First access code translation
(b) Higher access code translation
(c) Number group translations

FIRST ACCESS CODE TRANSLATIONS

The outgoing data required for the first access translations may be read from the memory or generated by logic. Some of the typical memory readout type of translations performed on the first access are considered below:

*Fixed memory readout translation*

To translate a code which cannot be readily checked for coincidence when the outgoing data is not assignable to allow logic generated translation, then the process controller performs a special readout translation without the use of coincidence.

The controller CL selects a desired segment and enables the memory readout MR. The control digit assigned to each memory is now analyzed by the controller CL. This procedure continues until the appearance of a predetermined data control digit is sensed in the readout buffer MR. The decoded value of the digit, with this type of translation, give a command to transfer the information in the readout buffer MR to the processor circuit CL. The translator is now set into the Outgoing Data Processing Mode followed by the Sending Mode where the extracted data is sent to the register sender being served.

*Three digit code translation*

Since many access codes, special service codes, and all area and office codes consist of three digits the translator, prior to the regular translation, performs a pretranslation. The pretranslation consists of code verification which is confirmation if a given three digit code constitutes an assigned code which should be translated or if it is an unauthorized code which must be intercepted. The pretranslation is also used to determine which area or office codes are not reached with a common routing (final route). The translator can be programmed, to use the pretranslation process, in establishing zoning assignment in the wide area telephone service and in metering service. The merit of pretranslation lays in the ability to check thousands of codes without storing them in the permanent memory.

In the pretranslation process the memory address counter 3C(AP) is used as the code identifier. During each thousand (TH) count the hundred (H) the ten (T) and the unit (U) digits change from 000 to 999 displaying all possible three digit codes. In every memory word there is a bit allocated to this type of translation which marks a three digit code represented by the H, T, U.

The decoded value of the thousand digit classified the category of the marked code. Under the first thousands digits, the category is code verification, the second thousand is assigned to all final route area codes, office codes, and so on. There are four possible categories per one drum revolution, the third to all final routes. With one bit assigned in the memory word.

During the pretranslation process the drum address counter output is fed into the comparator CN which seeks coincidence between the H, T and U of the counter and three digit code stored in the access register AS. The memory readout is also enabled and the pretranslation marking bit checked in every readout. The controller CL decodes the thousand digit and set an appropriate command if the three digit coincidence is found and the pretranslation marking bit is sensed. If this occurs during the first thousand the controller CL gives the command to intercept the call since the input data represents an unassigned code.

If this occurs during the second or third thousand count the command to route this call via area or office final route is given.

If no coincidence was found in the pretranslation process the normal code translation beings using the associative memory scan. The controller CL generates the coincidence control digit which together with the three digit code is compared with the internal addresses read from the memory. Upon coincidence, when the loading control digit is sensed in the readout buffer RP, the outgoing data is transferred, with its appropriate loading pattern, into readout processor 3RP.

*Code and class of service translations*

The translator must furnish routing data for special service codes which require different routing instructions for the same code, depending upon the point of origin. To translate such codes the controller 3CC includes the point of origin identification called the class of service (KY) as well as the code digits (11N) in the coincidence pattern. Upon coincidence the data is extracted through an associative address scan.

*Repertory dialing and calling forwarding translations*

The routing data for these translations is stored in the segment of the memory called the subscriber programmed memory. The register-sender group accesses the translator with an abbreviated code and the subscriber station line identification both of which are included in the coincidence pattern. The controller 3CC, upon establishing the type of translation required, selects the required segment and initiates the associative address scan which enables the translator to extract the subscriber programmed data from the memory storage.

There are other types of translations performed in the first access. Each type requires different patterns of coincidence, however, all first access translation obtain the necessary data by logic generation or through associative address scanning.

*Class of service translation*

In some translations the required information can be easily extracted from the memory readout by including the point of origin identification into the coincidence pattern. These translations include home extension intercom, local and toll incoming junctor and other calls for service.

The translator process controller 3CL selects this type of translation upon analysis of the incoming data. The information is extracted from the memory through an associative address scan.

*High access code translations*

The second or higher access translations are considered to be pre-programmed translations, since the processing digit sent to the register-sender group in the first access is returned to the translator and now enables the controller to select the desired translation.

The translator requests a second access translation in cases where the received information in the first access was not sufficient to determine the complete routing data. Second access code translations use the associative address scan in order to extract the data from the memory.

The most typical second access translation is the six digit area and office code translation. In the first access, the data consisted of the area code which in many cases is not sufficient to determine complete routing data. In such a case, during the first access code translation, the register-sender group is requested to access the translator the second time. From the analysis of the processing information the controller CL recognizes the second access translation, and includes the received six digits into the coincidence pattern. Upon coincidence the translator proceeds as in the first access translation.

*Code translation description*

CT1—Six digits translation resulting from second access to the drum. (The first access with theree digits). Based on the first access the translation was impossible to perform since there was not sufficient data.

CT2—Repertory dialing. This translation is performed for the local incoming junctor (Y6) (SXS) with the total number of one digit (used on one lost digit level K1 and K10) and for total of second digit from local line (Y0) but not from a flat rate local line, incoming junctor.

CT3—Four digits translation $A_1A_2N_0N_1$ type of translation for offices where under one office code number are assigned by the thousand digit. ($N_1$) to the SXS or the EAX.

CT4—Two digits translation in cases where there are one or two lost digits. This translation has two parts. CT4 is the first part, CT6 is the second part.

CT5—Three digits and class of service translation. This translation is used in toll special service codes in the order IIN KY.

CT6—Second part of CT4. In this translation one digit and the class of service is compared.

CT7—Two digits and KY translation. This translation takes place after register sender times out when special service codes were dialed (IIN type).

CT8—KY translation consisting of: 3 lost digits metered service trunk 3+4 lost digits incoming trunks SXS, wire chief busy verification OON call, home extension intercom call (local line *TL*=2) and (local junctor TL1). Coin box operator calls (PCLR) and receiver "off hook" calls from local coin box, free service incoming coin box, coin box incoming trunk.

CT9—All call "off hook" (not coin box) will go to permanently assigned trunk.

CT10—Pretranslation for four digits with the first digit being one or zero not coming from toll.

CT11—Pretranslation of 3 digits and 4 digits (four digits from toll).

OP—Operator call not from coin box, or Wats line.

RD—Register disconnect in all calls coming in with improper information.

IC—Intercept instruction due to pretranslation or during IN translation.

*Logic equations for code translations*

$CT1=AD8\ TL6$ $CT=AD8\ IN8\{TL1[Y6\ K10]+TL2\ (TA10=10)\ \overline{[(Y0\ K1)+(Y6\ K10)+Y8\ K10]}$ $CT3=AD8\ TL4\overline{[(TA1=)+(TA1=10)]}$ $CT4=AD8\ (TL3+TL4)\ [Y2\ (K1+K2)+Y13\ (K1+K3)]$ set after translation starts with $TH=12$ $CT5=AD8\ TL3\ [(Y4)\ (K1)\ (TA1=1)\ (TA2=1)]$ $CT6=AD8\ (TL3+TL4)\ [Y2\ (K1+K2)+Y13\ (K1\ K3)]$ reset after translation starts with $TH=12$ $CT7=AD8\ TL2\ [(Y6+Y8)\ (K1)+(Y2)\ (K1+K2)+Y13\ (K1+K3)]\ (IN8)\ (TA10=1)$ $CT8=AD8\{(TL3+TL4)\ [Y13\ (K9+K11)]+TL3\ [(Y6+Y7+Y8)\ \overline{K1+K10}]+TL3\ [(TA1=10)\ (TA2=10)\ (Y4)\ (K5)]+TL2[(TA10=1)\ (Y0)\ (K11+K13)+TL1\ [(Y6)\ (K1)]\ TL1\ [(Y0\ K3)+Y2\ (K3+K4)]\ TL0\ [(Y0+K3)+Y2\ (K3+K4)]\ TL0\ (Y8\ K10)\}$

*CT9*

$CT10=AD8\{TL4\ [TA=1+TA1=10]\ \overline{[(Y4)\ (K1+K3+K5+K7+K9)]}$ $CT11=AD8\{TL3+TL4\ [(Y4)\ (K1+K3+K5+K7+K9)]\}$ $TL0\ \overline{[(Y6+Y8)\ (K10)+(Y0)\ (K3)+Y2\ (K3+K4)]}$ (13)

$TL0\ [\overline{Y6}\ \overline{Y8}+\overline{K10}]\ [\overline{Y0}+\overline{K3}]\ [\overline{Y2}+\overline{K3}\ \overline{K4}]$ $\underline{RD}$ *(Register Sender Disconnect)*

$TL2\{\overline{[Y0\ (K11+K13)]}\ (TA10=1)+Y0\ K1\ (TL2)$

Operator$=TL1\ (TA10=10)\ \overline{[Y0\ K3+Y2\ (K3+K4)]}+TL0\ (TA10=0)\ Y6\ K10$ should be set with write function $\underline{IC}$ *(Intercept)*

$CV\ DN\ (\overline{\Sigma=0})$ sigma taken from coincidence buffer $TL2\ (TA10=10)\ [Y0\ K1+Y6\ K10]\ Y6\ \overline{K1}$

*Inhibit commands for comparison gates*

Gate:

$C1=CT7+CT8+PT+DN$ $C2=CT6+CT7+CT8+CT11+DN1+DN3$ $C3=CT4+CT6+CT7+CT8+CT11+DN1+DN3$ $C4=CT4+\underline{\overline{CT5+CT6+CT7}+CT8}+CT11+DN1+DN3$ $C5=CT3+CT4+\underline{CT5+CT6+CT7+CT8}+PT+DN$ $C6=C5$ $C7=CT+PT+DN1+DN3+LN$ $C8=\underline{CT1+CT2+CT3+CT4}+PT+DN+LN$ $C9=\overline{C8}$ $C10=\underline{CT1+CT3+CT4}+CT5+CT6+CT8\ PT+DN+LN$ $C11=C10$ $C12=CT+PT+DN2+DN3+LN$ $C13=C12$ $C14=C12$ $C15=C12$ $C16=CT+CT10+DN1+DN2+LN$ $C17=C16$ $C18=C16$ $C19=CT+PT+DN1+DN2$ $C20$ *to* $23\ \overline{WR}\ \overline{WV}$ $C24=DN+WR+WV$

*Process control commands*

$CT1=AD8\ TL6$ $TL6=\overline{TL_1}\ TL_2\ TL_4\ \overline{TL_8}$ $TL6=\overline{TL_1}\ TL_2\ TL_4$ $CT2=AD8\ IN8\{TL1\ Y6\ K10+TL2\ (TA10=10)\ [\overline{Y0}\ \overline{K1}]\ [\overline{Y6}]\ [\overline{Y8}]$ Gates:
- TL1—
- TL2—
- (TA10=10)—
- K1
- K10
- Y0
- Y6
- Y8

$CT3=AD8\ TL4\ (\overline{TA1=1})\ (\overline{TA1=10})$

Gates:

$TA1=1\ (AD8)$ $TA1=10\ (TL4)$ $CT4=AD8\ (TL3+TL4)\ [Y2\ (K1+K2)+Y13\ (K1+K3)]$

Gates:
- TL3 (AD8)
- TL4
- K1
- K2
- K3
- Y2
- Y13

$CT5=AD8\ TL3\ [(Y4)\ (K1)\ (TA1=1)\ (TA2=1)]$

Gates:
- $Y4\ (TL3)$
- $K1\ (AD8)$
- $TA1=1$
- $TA2=2$ $CT6$—same as $CT4$ $CT7=IN8\ (TA10=1)\ AD8\ TL2[K1\ (Y6+K1\ Y8)+Y2\ (K1+K2)+Y13\ (K1+K3)]$ $CT8=AD8\{(TL3+TL4)\ (Y13)\ (K9+K11)+$ (I)
$TL3[(Y6+Y7+Y8)][\overline{K1}+\overline{K10}]+$ (II)
$TL3\ (TA1=10)\ (TA2=10)\ (Y4)\ (K5)+$ (III)
$TL2\ (TA10=1)\ Y0\ (K11+K13)\ IN8+$ (IV)
$TL1[(Y6)\ (K1)]\ IN8+$ (V)
$TL1\ Y2\ (K3+K4)\ IN8+$ (VII)
$TL0\ (Y0\ K3)\ IN8+$ (VIII)
$TL0\ Y2\ (K3+K4)\ IN8+$ (IX)
$TL0\ Y8\ K10\ IN8$ (X)
[1] $TL1\ Y1\ (TA10=10)\ IN8$ (XI)

[1] For coin box.

$\underline{CT9}$ *(PST)*

$IN8\ TL0\overline{[(Y6+Y8)\ (K10)+Y0\ K3+Y2\ (K3+K4)]}$ $IN8\ TL0\overline{[Y6\ K10+Y8\ K10+Y0\ K3+Y2\ K3+Y2\ K4]}$ $IN8\ TL0[\overline{Y6}+\overline{K10})\ (\overline{Y8}+\overline{K10})\ (\overline{Y0}+\overline{K3})\ (\overline{Y2}+\overline{K3})\ (\overline{Y2}+\overline{K4})]$ $IN8\ TL0\overline{[(Y6+Y8)\ K10][Y10\ Y3+Y2\ (K3+K4)]}$ $IN8\ TL0[\overline{Y6}\ \overline{Y8}+\overline{K10}]$ $IN8\ TL0[Y6+K10)\ (Y8+K10)]$ $\underline{CT10}$ *(PT)*

$AD8\ TL4[TA1=1)+TA1=10]\ (\overline{Y4})\ (\overline{KODD})$ $\underline{CT11}$ *(PT)*

$AD8\{TL3+TL4\ Y4\ KODD\}$ $\underline{OP}$ *(set with WR before CT)*

$AD8\ IN8\{TL1\ (TA10=10)\ \overline{[Y0\ K3+Y2\ (K3+K4)\ Y1]}+TL0\ (TA10=0)\ Y6\ K10\}$ $AD8\ IN8\{(TL1\ (TA10=10)\ (\overline{Y0}+\overline{K3})\ (\overline{Y2})\ (\overline{K3}+\overline{K4})+TL0\ (TA10=0)\ Y6\ K10$ $AD8\ IN8\{TL1\ (TA10=10)\ (\overline{Y0}+\overline{K3})\ [\overline{Y2}+\overline{K3}\ \overline{K4}]+TL0\ (TA10=0)\ Y6\ K10$ $AD8\ IN8\{TL1\ (TA10=10)\ (\overline{Y0}+\overline{K3})\ (\overline{Y2}+\overline{K3})\ (\overline{Y2}+\overline{K4})$ $RD=AD8\ IN8\ TL1\{\overline{Y6\ K10+Y6\ K1+Y0\ K3+Y2}$
$\overline{(K3+K4)+Y1}\ (TA10=10)+TA10=\overline{10[\overline{Y0}\ \overline{K3}+\overline{Y2}}$
$\overline{(\overline{K3}+\overline{K4})+\overline{Y1}]\}+AD8\ IN8\ TL2\{(TA10=10)\ [\overline{Y0}}$
$\overline{\overline{K1}+\overline{Y6}+\overline{Y8}]+TA10=1}\ [\overline{K1\ (Y6+Y8)+Y2\ (K1+}$
$\overline{K2)+Y13\ (K1+K3)]}\}\cdot\{\overline{[(TA10=1)\ \ (Y0\ \ (K11+}$
$\overline{K13))]}\}$ $TL1{:}\ Y6\ K10=A$
$Y6\ K1=B$
$Y0\ K3=C$
$Y2\ (K3+K4)=D$
$Y1=E$
$(TA10=10)=F$ $f1=\overline{A+B+C+D+EF+F\ (\overline{C}+\overline{D}+\overline{E})}$
$=\overline{A}\ \overline{B}\ \overline{C}\ \overline{D}\ (\overline{EF})\ \overline{F}\ (\overline{\overline{C}+\overline{D}+\overline{E}})$
$=\overline{A}\ \overline{B}\ \overline{C}\ \overline{D}\ (\overline{E}+\overline{F})\ (\overline{F}+C+D+E)$
$=(\overline{A}\ \overline{B}\ \overline{C}\ \overline{D}\ \overline{E}+\overline{A}\ \overline{B}\ \overline{C}\ \overline{D}\ \overline{F})\ (\overline{F}+C+D+E)$
$=\overline{A}\ \overline{B}\ \overline{C}\ \overline{D}\ \overline{E}\ \overline{F}+\overline{A}\ \overline{B}\ \overline{C}\ \overline{D}\ \overline{F}+\overline{A}\ \overline{B}\ \overline{C}\ \overline{D}\ E\ \overline{F}$
$=\overline{A}\ \overline{B}\ \overline{C}\ \overline{D}\ \overline{F}\ (\overline{E}+E)+\overline{A}\ \overline{B}\ \overline{C}\ \overline{D}\ \overline{F}$
$=\overline{A}\ \overline{B}\ \overline{C}\ \overline{D}\ \overline{F}=\overline{A}\ \overline{B}\ (\overline{C+D})\ \overline{F}$ $TL1\ \overline{[Y6\ K10]\ [Y6\ K1]\ [Y0\ K3+Y2\ (K3+K4)]\ [TA10}$
$=\overline{10}]$ $TL2{:}\ TA10=10=A$
$Y0\ K1+Y6+Y8=B$
$TA10=1=C$
$K1\ \ (Y6+Y8)+Y2\ \ (K1+K2)+Y13\ \ (K1+K3)$
$=D$
$Y0\ (K11+K13)=E$ $f2=\overline{[A\ \overline{B}+CD]\ [CE]}=\overline{[A\ \overline{B}]}\ (\overline{C}+\overline{D})\ (\overline{C}+\overline{E})$
$=\overline{[A\ \overline{B}]}\ (\overline{C}+\overline{D}\ \overline{E})$
$=\overline{[A\ \overline{B}]}\ (\overline{C})+\overline{[A\ \overline{B}]}\ \overline{D}\ \overline{E}$ $TL2\ \ \overline{[TA10=1]\ \ [TA10=10]\ \ \overline{Y0}\ \ \overline{K1}+\overline{Y6}+\overline{Y8}]}+TL2$
$\overline{[TA10=10]\ (\overline{Y0}\ \overline{K1}+\overline{Y6}+\overline{Y8})]\ [K1\ \ (Y6+Y8)+Y2}$
$\overline{(K1+K2)+Y13\ (K1+K3)]\ [Y0\ (K11+K13)]}$

*Intercept*

$CV+(\overline{\Sigma=0})\ DN\ KC$

*Writing commands*

The WR flip-flop is set if DE digit (delete) is 15 and the IN (instruction) digit is 7 and the WT1 flip-flop is in its reset state.

The WR flip-flop is reset with idle or WT1 and CPB being true.

Following write command a write verification takes place (WV).

The WV is set after write completed and completion of one revolution (WT2).

*Line number translation*

Line number translation is set by instruction $(IN)=2$ and address 12 not true. If in three revolutions the coincidence is not found the UT flip-flop is set.

*Sigma coincidence*

Coincidence control digit is generated by the controller for each variety of code and line number translation.

| | | ε1 | ε2 | ε4 | ε8 |
|---|---|---|---|---|---|
| LN | ε=0 | 0 | 0 | 0 | 0 |
| CT1 | ε=1 | 1 | 0 | 0 | 0 |
| CT2 | ε=2 | 0 | 1 | 0 | 0 |
| CT3 | ε=3 | 1 | 1 | 0 | 0 |
| CT4 | ε=4 | 0 | 0 | 1 | 0 |
| CT5 | ε=5 | 1 | 0 | 1 | 0 |
| CT6 | ε=5 | 1 | 0 | 1 | 0 |
| CT7 | ε=5 | 1 | 0 | 1 | 0 |
| CT8 | ε=5 | 1 | 0 | 1 | 0 |
| CT10 | ε=6 | 0 | 1 | 1 | 0 |
| CT11 | ε=6 | 0 | 1 | 1 | 0 |

*Number group translation*

Number group translations provide routing and control instructions for reaching telephone subscribers whose directory numbers are assigned to the local telephone exchange. The number group translations may be divided into the directory number translations and the line number translations.

*Directory number translation*

The object of this translation is to extract from the memory, information which will route the call to the local subscriber station.

Like the second or higher access code translation, it is a pre-programmed translation. The received data may consist of seven dialed digits, the first three being the office code, the last four represent the thousand (TH) the hundred (H) and the ten (T) and the unit (U) digit of the dialed directory number; however, in cases of lost digits (in switching a call through a SXS office) the received data may consist of 4 or 3 dialed digits representing the TH, H, T, U or the H, T, U of the dialed directory number. (In the last case one of the class of service digit is substituted as the missing thousands digit.)

Since the number of digits received varies the TH, H, T and U digit of the received directory number used in finding coincidence is stored in differing positions, each different position of the TH, H, T and U requires separate coincidence patterns for the translation process. The TH, H, T, and the U digits of directory number are represented by the address counter. To every step of the counter from 1000 to 10,999 there is a memory word assigned representing the corresponding line number.

The directory number translation is initiated by the controller upon analysis of the processing information. Selection of the desired drum segment that contains the required data, is based on the value of the thousand digit of the received directory number. To extract data from the memory storage the controller (CL) initiates the direct address scan during which the counter (AP) is being fed into the comparator circuit (CN) and checked for coincidence with the TH, H, T, and U digit of the received directory number from the access register (AS), at the same time the corresponding line number read from the selected segment is being transferred to the readout processor (RP). Upon coincidence the memory readout transfer is halted since the line number corresponding to the given count for which coincidence was found is now in the readout processor (RP).

*Information transfer process*

In successful translation upon coincidence the information transfer process begins with setting up the TP1 flip-flop.

TP1—with this command the readout processor is notified that information pertaining to a given coincidence are now in storage.

TP2—is a readout processor propagation time (gates storage and delay time) delay flip-flop.

TP3—is a command for readout processor to write changes (if any) in the stored information.

TP4—is a reset command to clear the translator transceiver access register.

TP5—is a transfer command. The stored information in read out processor is transferred to access register.

To start the transfer process the TP1 flip-flop is set as follows:

$TP1\ \text{Set}=\{CPB\}SE[OP+IC+RD+UT+BP\ RC$
$+(LN+DN)KC+WV\ WC]+CPB\ SE\ TD2$
$TP1\ \text{Reset}=CPA\ \ TP5+IDRP$ Reset is accomplished when the entire transfer process is completed.

$TP2 \text{ set} = \{CPB\} TP1\, \overline{TP2}\, \overline{TP3}\, \overline{TP4}\, \overline{TP5}$
$TP2 \text{ reset} = \{CPB\} TP2$
$TP3 \text{ set} = \{CPB\} TP2$
$TP3 \text{ reset} = \{CPB\} TP3$
$TP4 \text{ set} = \{CPA\} TP3$
$TP4 \text{ reset} = \{CPA\} TP4$
$TP5 \text{ set} = \{CPA\} TP4$
$TP5 \text{ reset} = \{CPA\} TP5$ Note: TP2, TP3, TP4, TP5, are set only for 8 microseconds per translation.

TP1 is set and stays set during the entire transfer process.

*Process controlled—Coincidence circuit control*

Two flip-flops in the controller control direct the setting of the KC and the WC flip-flops.

CS controls the KC setting
WS controls the WC setting

Without these flip-flops being set the translation or the write coincidence can not occur.

CS in directory number translation must be set as soon as DN flip-flop is being set; however, in line number translation code translation (CT, PT) the flip-flop CS is set 4 microseconds after counter reset since this is the point from which we start looking for coincidence. To assure that the counter is in the proper counting mode (mode for writing and mode for translation) PD2, PD3 levels are added to the setting control of CS.

$CS$ set=(translation counter mode) $(LN+CT+PT)$
CS reset is the IDRP

WS flip-flop is set during write operation.

The first command is for WR
$WS \text{ set} = WR\, \overline{WT1}$ (write counter mode)
The second command for WV
$WS \text{ set} = WV$ (translation counter mode)
$WS$ reset (in $WR$) $= CPB\ WT1$
$WS$ reset (in $WV$) $= IDRP$ The data extracted from the drum is not complete, but since the addition of informaton is the same for most directory number translations the logic generation of processing digits and sender instruction digits, is performed in the Outgoing Data Processing Mode. When the completed data is obtained the controller transfers the translator into the Sending Mode. The use of the memory word control digit is important in cases where the coincidence is found with the address counter AP representing an unassigned directory number or a number for which a special processing is desired. In such instances, upon decoding the value of the control digit the command for intercept or for special handling of the call is given by the process controller (CL).

*Translator process timing*

The timing for the translator in the process state is illustrated in FIGURES 35 through 42. The timing for the modes DN is shown in FIGS. 38 and 39 and for LN in FIGS. 40 and 41. The code translation timing is shown in FIGS. 35, 36A, 36B, 37A and 37B while the write and write transfer is shown in FIGS. 42 and 43.

*Translator malfunctions*

Each access to the translator is timed for each translation and mode of operation is also timed for its completion. Counting of the number of drum revolutions (33 ms. per revolution) allows the translator to set a time table according to which all operations are timed. An operation of the translator not completed within the specified time is considered a malfuncton for which the controller sets the translator out of operation and transfers its input loads to the duplicate translator.

The operation of the counter is checked during translation as well as during the idle mode. Upon completion of one revolution of the drum, if the decoded value of the counter is incorrect (4096), the controller stored the fact that a mis-count occurred and proceeds to check the count in the next revolution.

The counter has a self-checking and self-correcting feature, therefore, only two consecutive failures of the counter are considered a malfunction for which the input loads of the translator are transferred.

The received data is checked for completeness and correct parity; however, the reception of erroneous data for the first time is not considered to be a translator malfunction since there is a possibility that the register-sender group involved in sending the data could be at fault. In the next access the translator will probably deal with different register-senders (since up to 20 registers are served). If incompleted data or incorrect parity is received again it is considered to be a translator malfunction for which the controller transfers the input loads to the amplifier.

*Translator malfunction*

*Counter failure.*—If the counter does not display 4999+8999+12999 when the counter reset pulse appears the counter flip-flop alarm is being set $(AP-AL)$—following this the Trouble I flip-flop is set (TR1) setting TR1 indicates minor trouble; however, two consecutive failures of the counter indicates major trouble—TR2 flip-flop is set which causes the transfer of load to the associate translator and summons the trouble recorder.

$TR1(S) = (AP-AL)\ (AP-PD3)$
$TR1(RS) = TR2 + (\overline{AP-AL})\ (AP-PD3)\ (TR1)$
$TR2(S) = (AP-AL)\ (AP-PD3)\ (TR1)$
$TR2(RS)$ = Trouble Recorder

*Operation timing*

The timing is accomplished with TO1 to TO5 flip-flops and the drum reset pulse.

*Malfunction in translator—Directory Number Translation*

$TR4(S) = (TO3)\ (\overline{TO4})\ DN\ [ID]$

*Pretranslation*

$TR5(S) = (TO4)\ (\overline{TO5})\ (PT)\ [(ID)]$

*Write operation*

$TR6(S) = TO4\ \overline{TO5}\ WR\ [(ID)]$

*Line number translation*

During LN the following results may occur: (1) Successful translation, (2) Unsuccessful translation and (3) Malfunction.

$TR7(S)$ indicates malfunction
$TR7(S) = TO1\ TO5\ LN\ \overline{UT}$

*Code translation*

$TR8(S) = \overline{TO1}\ TO2\ CT\ [(ID)]$

*Write verification*

$TR9(S) = \overline{TO1}\ TO2\ WV\ [(ID)]$

*Send sequence state*

$TR10(S) = \overline{TO2}\ TO3\ SE\ [(ID)]$

*Idle sequence state*

$TR11(S) = \overline{TO4}\ TO5\ [(ID)]$

*Receive sequence state*

TR12 is set with the first occurrence of receive time out.

$$TR12(S) = TO2\ \overline{TO3}\ \overline{RC}$$

The first time out returns the system to idle.

$$ID(S) = TO2\ \overline{TO3}\ \overline{RC}\ \overline{TR13}$$

TR13 remembers the fact that one receive time out took place. TR13 allows the first one to set the system to idle and inhibit the successful receive time out from returning the system to idle.

$$TR13(S)=TR12\ ID$$

Next receive time out (without a successful translation) sets TR14—this leaves the translator in the same state and the trouble recorder is summoned.

$$TR14(S)=TR13\ TO2\ \overline{TO3}\ \overline{RC}$$

TR12, TR13 are RS with a translation without RC time out.

$$TR12\ TR13(RS)=PR1\ RC$$

*Bad parity*

Receiving information with improper parity sets TR15.

$$TR15(S)=(AS-BP)\ (RC)$$

Successive successful translation resets TR15.

$$TR15(RS)=PR1\ RC$$

Successive receiving of bad parity sets the TR16.

$$TR16(S)=TR15\ (AS-BP)\ (RC)$$

This signal transfers load to the duplicate translator and summons the trouble recorder.

*Manual transfer*

TR3 is set manually to transfer load—register-sender group to the duplicate translator.

*Duplicate translator—Load transfer*

The translator load consists of 20 register-sender groups. During normal operation each translator carries 10 register sender groups. Translator A carries odd register senders. Translator B carries even register senders.

During malfunction in one translator the duplicate carries the full load serving 20 register-sender groups. The system of this translator does not return to idle but waits for trouble recorder.

If a malfunction should occur in the other translator while one is already out of service the system of this translator will return to idle.

Register transfer (RT) flip-flop controls the transferring of loads. RT is reset by trouble (TR) causing the other translator to take over the load.

*Translator malfunction*

TR17—Write amplifier or write pulse generator operates not in write command interval.

$$TR17(S)\ \overline{WA}\ (AP-CWP2)+(MW-SWR)\ (\overline{WA})$$

WA—8 microsecond interval in which recording
SWR—sensing write current through drum head coil
CWP2—pulse generated to write
TR18: power failure in duplicate translator
TR(S): power failure GND input (operates, or grounds)

Selection for recording and reading more than one segment.

During WR or WV operation TR19 means malfunction but no transfer to duplicate translator. During several translations process TR19 indicates malfunction and transfer condition (RT).

*TR19 and WA control*

EN1—energized segment I
EN2—energized segment II
EN3—energized segment III $$EN1\ EN2\ \overline{EN3}+EN1\ \overline{EN2}\ EN3+\overline{EN1}\ EN2\ EN3+EN1\ EN2\ EN3$$

$$\overline{EN1}\ \overline{EN3}+\overline{EN1}\ \overline{EN2}+\overline{EN2}\ \overline{EN3}$$

*Setup*

$$\overline{\overline{EN1}\ \overline{EN3}+\overline{EN1}\ \overline{EN2}+\overline{EN2}\ \overline{EN3}}$$

$$(EN1+EN3)\ (EN1+EN2)\ (EN2+EN3)$$

*Drum record and record verification*

If the drum counter is allowed to follow the binary count of 4096 bits per revolution the write and write verification segment selection must be changed in order to be able to use the 96 bits left over from an even thousand segment division.

| | | |
|---|---|---|
| 1000 | 5000 | 9000 |
| 2000 SEG I 3000 | 6000 SEG II 7000 | 10,000 SEG III 11,000 |
| 4000–4999 | 8000–8999 | 12,000–12,999 |
| SEG I′ | SEG II′ | SEG III′ |
| 5000–5096 | 9000–9096 | 1000–1096 |

To find coincidence with the addresses in Seg. I′, Seg. II′, Seg. III′ one must have special instructions that prime segment writing is required. Instruction 6 will be used for this purpose. The "prime" segment selection is as follows:

$$SEG\ I'=IN6\ SEG\ II$$
$$SEG\ II'=IN6\ SEG\ III$$
$$SEG\ III'=IN6\ SEG\ I$$

Segment selection is accomplished by decoding the thousand digit stored in access register (transceiver) flip-flops AA21, 22, 23, 24, are being decoded.

The level from the decoded gates are setting flip-flops SR1, SR2, SR3 in write verification and SW1, SW2, SW3 in write operation.

$$SR1+SW1=(TH=1)+(TH=2)+(TH=3)+(TH=4)+[(TH=5)+(TH=6)+(TH=7)+(TH=8)]\ IN6$$

$$SR2+SW2=(TH=5)+(TH=6)+(TH=7)+(TH=8)+[(TH=9)+(TH=10)+(TH=11)+(TH=12)]\ IN6$$

$$SR3+SW3=(TH=9)+(TH=10)+(TH=11)+(TH=12)+[(TH=1)+(TH=2)+(TH=3)+(TH=4)]\ IN6$$

The selection of SR1, SR2, SR3 is AND function with WV.

The selection of SW1, SW2, SW3 is AND function with WR.

The detail design is shown.

WD—write delay is needed to prevent gates A, B, C to inhibit the segment selection flip-flop before the flip-flop is set by the level from gates 1, 2, 3.

$$WD\ \text{set}=(WR+WV)\ CPA$$

$$WD\ \text{reset}=(WR\ \overline{WV}\ WT1)\ CPB+IDRP$$

MALFUNCTION AND UTILIZATION OF DUPLICATE TRANSLATOR

TR1: Counter First Malfunction (AP–AL) (AP–PD3) (AP–CPB)
TR2: Two consecutive malfunctions of the counter (AP–AL) (AP–PD3) (CL–TR1) (AP–CPB)
} Counter Check TR3: Manual Transfer of Input Leads from one Translator to its Duplicate
Set: ($\overline{IC}$–$\overline{CLTT}$) (AP–CPA)
Reset: (IC–TRPK) (AP–CPB)

*Time table for translations*

TR4: DN translation
(CL–DN) (CL–TO3) ($\overline{CL}$–$\overline{TO4}$) ($\overline{CL}$–$\overline{ID}$) (AP–CPB)
TR5: Pretranslation (Code Translation)
(CL–PT) (CL–TO4) ($\overline{CL}$–$\overline{TO5}$) ($\overline{CL}$–$\overline{ID}$) (AP–CPB)
TR6: Drum Recording
(CL–WR) (LL–TO4) ($\overline{CL}$–$\overline{TO5}$) ($\overline{CL}$–$\overline{ID}$) (AP–CPB)
TR7: LN Translation
(CL–LN) (CL–TD1) (CL–TO5) ($\overline{CL}$–$\overline{UT}$) ($\overline{CL}$–$\overline{ID}$) (AP–CPB)
TR8: Code Translations $[(CL\text{-}CT1)+(CL\text{-}CT2)+(CL\text{-}CT3)+(CL\text{-}CT4)+(CL\text{-}CT5)+(CL\text{-}CT6)+(CL\text{-}CT7)+(CL\text{-}CT8)]$ $[(\overline{CL\text{-}TO1})\ (CL\text{-}TO2)\ (\overline{CL\text{-}ID})\ (AP\text{-}CPB)]$ TR9: Recording Vertification $(CL\text{-}WV)\ (\overline{CL\text{-}TO1})\ (CL\text{-}TO2)\ (\overline{CL\text{-}ID})\ (AP\text{-}CPB)$ TR10: Send Sequence State $(CL\text{-}SE)\ (\overline{CL\text{-}TO2})\ (CL\text{-}TO3)\ (\overline{CL\text{-}ID})\ (AP\text{-}CPB)$ TR11: Idle Sequence State $(\overline{CL\text{-}ID})\ (\overline{CL\text{-}TO4})\ (CL\text{-}TO5)\ (AP\text{-}CPB)$ TR12: Receive Incomplete Data First Time (Assumed R–S Group Malfunction)

Set: $(\overline{CL\text{-}RC})\ (\overline{CL\text{-}TO3})\ (CL\text{-}TO2)\ (\overline{CL\text{-}ID})\ (AP\text{-}CPB)$ Reset: (CL–RC) (CL–PR1) (AP–CPA)

TR13: Idle Condition After First Malfunction in Receive

Set: (CL–TR12) (CL–ID) (AP–CPB)

Reset: See TR12

TR14: Second Malfunction (successive) in Receiving Data (Working now with different R–S group we assume the malfunction is due to translator)

$(CL\text{-}TR13)\ (CL\text{-}TO2)\ (\overline{CL\text{-}TO3})\ (CL\text{-}RC)\ (\overline{CL\text{-}ID})\ (AP\text{-}CPB)$ TR15: Incorrect Parity Received (for first time) Resend Requested Set: $(AS\text{-}BP)\ (CL\text{-}RC)\ (\overline{CL\text{-}SE})\ (AP\text{-}CPB)$ Reset: See TR12

TR16: Definite Malfunction Incorrect Parity Received Twice in Succession

TR17: Drum Recording Safeguard Recording Pulse Occurred Out of Sequence or Write Circuits Energized Out of Sequence $$(CL-WA)\ (AP-CWP2)+(MW-SWR)\ (CL-WA)\ (AP-CPB)$$

TR18: Power Malfunction in the (other) duplicate translator. (This translator transfers the leads to its own inputs) *(PF) (AP—CPB)*

TR19: More than one segment is selected for playback or recording $$[(MW-SCEN1)\ (MW-SCEN2)\ (\overline{MW-SCEN3})+(MW-SCEN1)\ (\overline{MW-SCEN2})\ (MW-SCEN3)+(\overline{MW-SCEN1})\ (MW-SCEN2)\ (MW-SCEN3)+(MW-SCEN1)\ (MW-SCEN2)\ (MW-SCEN3)]\ (AP-CPB)$$

RT—Register Sender Groups shared by translator are transferred to the duplicate translator maintaining full operation:

$$[(CL-TR2)+(CL-TR4)+(CL-TR5)+(CL-TR7)+(CL-TR8)+(CL-TR10)+(CL-TR11)+(CL-TR14)+(CL-TR16)+(CL-TR17)+(CL-TR19)+(CR-CTRB)]\ [DUPLICATE\ TRANS\ RT]\ (AP-CPB)$$

*CTBR*—call for trouble recorder $$(\overline{CL-RT})+(CL-TR6)+(CL-TR9)+(CL-TR19)$$

What is claimed is:

1. An automatic telephone system including register-senders, a common translator, and a translator allotter, said translator including: a first plurality of incoming register means operated upon receipt of a plurality of digits to register said digits, a record means having recorded therein a plurality of sets of coded call routing and control data items, readout means adapted to read said recorded data from said record means, counter means external to said record means arranged to indicate the address of said record means corresponding to said readout means, coincidence detecting means, comparison buffer register means, transfer buffer register means, counter gating means, process control means, means connecting said incoming register to said coincidence means, a first means in said process control means operated upon receipt of said digits to enable said counter gating means to pass said counter count to said comparison buffer register means and simultaneously enable said readout means to continuously read out said recorded data, first gating circuit means connecting said transfer buffer register means to said readout means, said transfer buffer register means operable via said first gating circuit means by said readout means to register said record data in synchronism with said counter count presented to said coincidence means, said coincidence means thereby operated to compare said data from said incoming register and said counter count, coincidence signal means in said coincidence means operated upon parity between said two sets of data to signal said process control means, control means in said process control means operated responsive to said coincidence signal to operate said first circuit means to operate said transfer buffer register to register said appropriate coded call routing and control data items from said readout means, said transfer buffer register thereafter operated to transfer said information to said incoming register, other means thereafter operated to send said coded call routing and control data from said incoming register to said register-sender.

2. An automatic telephone system including register-senders, a common translator and a translator allotter, said translator including: an incoming register means operated upon receipt of a plurality of digits to register said digits, a constantly revolving magnetic drum having storage elements arranged in circumferential tracks and axial slots, said drum having recorded thereon a plurality of sets of coded call routing and control data items, readout means adapted to read said recorded data from the drum, counter means external to the drum and synchronized by a track of the drum to indicate the position of the slots of the drum, comparison means, comparison buffer register means, transfer buffer register means, counter gating means, process control means, means connecting said incoming register to said comparison means, a first means in said process control means operated upon receipt of said digits to enable said counter gating means to pass said counter count to said comparison buffer register means and simultaneously enable said readout means to continuously read out said recorded data, said comparison means thereby operated to compare said data from said incoming register and said counter count, first gating circuit means connecting said transfer buffer register means to said readout means, said transfer buffer register means operable via said first gating circuit means by said readout means to register said recorded data in synchronism with said counter count presented to said comparison means, parity signal means in said comparison means operated upon parity between said two sets of data to signal said process control means, means responsive to an item in said incoming register designating a code translation to gate a type item from the readout means to the process control means, which type item for a given value designates that the corresponding output from the counting means is to be recognized, control means in said process control means operated responsive to coincidence of said parity signal and of said type item having said given value to operate said first circuit means to operate said transfer register to register said appropriate coded call routing and control data items from said readout means, said transfer buffer register thereafter operated to transfer said information to said incoming register, other means thereafter operated to send said coded call routing and control data from said incoming register to said register-sender.

3. Apparatus according to claim 2 in which said record means is a constantly revolving magnetic drum, each set of said recorded items are recorded in a plurality of four bit code items in an axial row along the surface of said drum, and each of said sets of said recorded items is recorded in sequence along the circumference, said drum including 4000 of said axial rows of said circumferential surface.

4. Apparatus according to claim 2 in which said record means is a constantly revolving magnetic durm, each set of said recorded items are recorded in ten four bit code items in an axial row along the surface of said drum, and each of said sets of said recorded items is recorded in sequence along the circumference, said drum including three segments of 4000 of said axial rows on said circumferential surface said rows in a first of said segments numbered from 1000 to 4999, said rows in the second of said segments numbered from 5000 to 8999 and said rows in the third of said segments numbered from 9000 to 12999.

5. Apparatus according to claim 4 including intercept control means operated upon non-receipt of said signal from said parity signal means to forward a fixed routing to said transfer register, for transfer to said incoming register and routing of the call to an intercept trunk.

6. Apparatus according to claim 4 wherein said counter counts from 1000 to 12,999, and said process control means includes first coincidence control means operated to enable said first means in said process control means only during the count of said counter from 1000 to 1999 after receipt of said digits.

7. An automatic telephone system including register-senders, a common translator and a translator allotter, said translator including: an incoming register means operated upon receipt of a plurality of digits to register said digits, a constantly revolving magnetic drum having storage elements arranged in circumferential tracks and axial slots, said drum having recorded thereon a plurality of sets of coded call routing and control data items, readout means adapted to read said recorded data from the drum, counter means external to the drum and synchronized by readout of a truck of the drum to indicate the position of the slots of the drum, comparison means, comparison buffer register means, transfer buffer register means, counter gating means, process control means, means connecting said incoming register to said comparison means, a first means in said process control means operated upon receipt of said digits to enable said counter gating means to pass said counter count to said comparison buffer register means and simultaneously enable said readout means to continuously read out said recorded data, said comparison means thereby operated to compare said data from said incoming register and said counter count, first gating circuit means connecting said transfer buffer register means to said readout means, said transfer buffer register means operable via said first gating circuit means by said readout means to register said recorded data in synchronism with said counter count presented to said comparison means, parity signal means in said comparison means operated upon parity between said two sets of data to signal said process control means, means responsive to an item in said incoming register designating a code translation to gate a type item from the readout means to the process control means, which type item for a given value designates that the corresponding output from the counting means is to be recognized.

8. Apparatus according to claim 7 in which said record means is a constantly revolving magnetic drum, each set of said recorded items are recorded in ten four bit code items in an axial row along the surface of said drum, and each of said sets of said recorded items is recorded in sequence along the circumference, said drum including three segments of 4000 of said axial rows on said circumferential surface, said rows in a first of said segments numbered from 1000 to 4999, said rows in the second of said segments numbered from 5000 to 8999 and said rows in the third of said segments numbered from 9000 to 12,-999, and said counter counts from 1000 to 12,999, and said process control means includes first coincidence control means operated to enable said first means in said process control means only during the count of said counter from 1000 to 1999 after receipt of said digits.

9. Apparatus according to claim 8 and including code verification means operated upon receipt of said signal from said parity signal means and of said type item to indicate that the received digits constitute a valid code.

10. Apparatus according to claim 9 and including final route indicating means and second coincidence control means, said second coincidence control means operated in response to said code verification means to again enable said first means in said process control means during the count of said counter from 9000 to 10999, said final route indicating means operated upon receipt of said signal from said parity signal means to indicate that a complete routing may be returned to said register-sender.

11. Apparatus according to claim 10 and including third coincidence control means operated upon said counter count reaching the count of 11,000 without having received a signal from said parity signal means to enable said first means in said process control means during the count of said counter from 11,000 to 12,999.

12. Apparatus according to claim 11 and including special service indicating means operated upon receipt of a signal from said parity signal means during the count of said counter from 11,000 to 12,999 to operate said first gating means.

13. Apparatus according to claim 11 and including another control means operated upon failure to receive a signal from said parity signal means during the count of said counter from 11,000 to 12,999 to operate other circuit means to insert process digits into said transfer register.

14. Apparatus according to claim 13 and including sequence time out means operated for each operation of said translator to time said operations and trouble indicating means operated by the simultaneous occurrence of a completed time out by said time out means and the operating state of said translator to indicate a particular fault.

No references cited.

KATHLEEN H. CLAFFY, *Primary Examiner.*

WILLIAM C. COOPER, *Examiner.*